United States Patent
McKinney et al.

(10) Patent No.: US 12,429,162 B2
(45) Date of Patent: *Sep. 30, 2025

(54) MOUNTING SYSTEM FOR ELEVATING PLATFORM

(71) Applicant: Altec Industries, Inc., Birmingham, AL (US)

(72) Inventors: Ryan J. McKinney, Parkville, MO (US); Kyle E. Hoffmann, Saint Joseph, MO (US); Jace Hegg, Saint Joseph, MO (US)

(73) Assignee: Altec Industries, Inc., Birmingham, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/754,656

(22) Filed: Jun. 26, 2024

(65) Prior Publication Data

US 2024/0344655 A1 Oct. 17, 2024

Related U.S. Application Data

(63) Continuation of application No. 18/233,034, filed on Aug. 11, 2023, now Pat. No. 12,044,353, which is a continuation of application No. 17/720,898, filed on Apr. 14, 2022, now Pat. No. 11,725,776, which is a continuation of application No. 17/084,130, filed on Oct. 29, 2020, now Pat. No. 11,306,867, which is a continuation of application No. 16/417,059, filed on May 20, 2019, now Pat. No. 10,823,327, which is a
(Continued)

(51) Int. Cl.
*F16M 13/02* (2006.01)
*B66F 11/04* (2006.01)
*H01B 17/24* (2006.01)

(52) U.S. Cl.
CPC ........... *F16M 13/02* (2013.01); *B66F 11/044* (2013.01); *H01B 17/24* (2013.01)

(58) Field of Classification Search
CPC ........ F16M 13/02; H01B 17/24; B66F 11/044
USPC ......................................................... 248/235
See application file for complete search history.

(56) References Cited

U.S. PATENT DOCUMENTS

| | | |
|---|---|---|
| 459,844 A | 9/1891 | Thomas |
| D157,942 S | 4/1950 | Collin |
| 3,005,512 A | 10/1961 | Vogan |

(Continued)

FOREIGN PATENT DOCUMENTS

CA 3006379 A1 6/2017

OTHER PUBLICATIONS

U.S. Appl. No. 16/935,886 Notice of Allowance issued Sep. 4, 2024.
(Continued)

*Primary Examiner* — Todd M Epps
(74) *Attorney, Agent, or Firm* — Erise IP, P.A.

(57) ABSTRACT

Mounting plates for elevating platforms, including a mounting apparatus with interior and exterior reinforcement components elongated vertically. The interior reinforcement piece includes an embedded bolt that extends from the interior reinforcement piece, through a wall of the platform, and through the exterior reinforcement component. The interior and exterior reinforcement components have a stepped construction to convert peel stress to shear stress.

20 Claims, 67 Drawing Sheets

Related U.S. Application Data continuation-in-part of application No. 15/619,210, filed on Jun. 9, 2017, now Pat. No. 10,549,974.

(60) Provisional application No. 62/348,542, filed on Jun. 10, 2016.

(56) References Cited

U.S. PATENT DOCUMENTS

| | | | |
|---|---|---|---|
| 3,169,602 A | 2/1965 | Myers | |
| 3,295,633 A | 1/1967 | Milner, Jr. | |
| 3,357,719 A | 12/1967 | McCrea | |
| 3,396,814 A | 8/1968 | Garnett | |
| 3,399,746 A | 9/1968 | Lee | |
| 3,414,079 A | 12/1968 | Wacht et al. | |
| 3,477,679 A | 11/1969 | Lovitz | |
| 3,561,563 A | 2/1971 | Harsh | |
| 3,590,950 A | 7/1971 | Wilson | |
| 3,625,305 A | 12/1971 | Mueller et al. | |
| 3,695,390 A | 10/1972 | Leigh | |
| 3,767,007 A | 10/1973 | Garnett | |
| 3,809,180 A | 5/1974 | Grove | |
| 3,825,095 A | 7/1974 | Clark | |
| 3,833,090 A | 9/1974 | Georgianna | |
| 3,902,568 A | 9/1975 | Erickson | |
| 3,937,340 A | 2/1976 | Grove | |
| 3,974,615 A | 8/1976 | Ditcher | |
| 4,274,614 A | 6/1981 | Worrallo | |
| 4,450,936 A | 5/1984 | Strom | |
| 4,534,529 A | 8/1985 | Dorner | |
| 4,558,758 A | 12/1985 | Littman et al. | |
| 4,569,533 A | 2/1986 | Gronert et al. | |
| 4,605,098 A | 8/1986 | Leuty | |
| 4,620,609 A | 11/1986 | Elsten | |
| 4,753,447 A | 6/1988 | Hall | |
| 4,754,841 A | 7/1988 | Koffski | |
| 4,763,755 A | 8/1988 | Murray | |
| 4,858,723 A | 8/1989 | Holmes et al. | |
| 4,911,264 A | 3/1990 | McCafferty | |
| 5,611,410 A * | 3/1997 | Baillargeon | B66F 11/044 182/2.1 |
| 5,722,505 A | 3/1998 | Grabner et al. | |
| 5,727,645 A | 3/1998 | Woodling | |
| 5,941,045 A | 8/1999 | Plehanoff et al. | |
| 5,944,138 A | 8/1999 | Vollmer et al. | |
| 6,076,937 A | 6/2000 | Wood et al. | |
| 6,269,906 B1 | 8/2001 | Dockter et al. | |
| 6,378,822 B1 | 4/2002 | Franks | |
| 6,470,999 B1 * | 10/2002 | Schanzle | B66F 11/044 182/2.1 |
| 6,484,982 B1 | 11/2002 | Barry et al. | |
| 6,491,272 B1 | 12/2002 | Franks | |
| 6,811,043 B2 | 11/2004 | Perkins et al. | |
| 7,066,298 B1 | 6/2006 | Mackinnon | |
| 7,108,101 B1 | 9/2006 | Westhoff et al. | |
| 7,210,657 B2 | 5/2007 | Plate et al. | |
| 7,258,045 B2 | 8/2007 | Smith | |
| 7,306,280 B1 | 12/2007 | Kraimer | |
| 7,490,801 B2 | 2/2009 | Plate et al. | |
| 7,677,829 B2 | 3/2010 | Westhoff et al. | |
| 7,748,496 B2 | 7/2010 | Higgins et al. | |
| D625,484 S | 10/2010 | Savard | |
| 8,016,074 B2 | 9/2011 | Black et al. | |
| 8,056,739 B2 | 11/2011 | Hopkins | |
| 8,091,907 B1 | 1/2012 | Barnett | |
| D655,597 S | 3/2012 | Matzek et al. | |
| 8,365,484 B2 | 2/2013 | Foley | |
| 8,443,936 B1 | 5/2013 | Raymond | |
| 8,550,211 B2 | 10/2013 | Higgins et al. | |
| 8,550,212 B2 * | 10/2013 | Higgins | B66F 11/044 182/2.4 |
| 8,739,928 B2 | 6/2014 | Schneider | |
| 8,899,380 B2 | 12/2014 | Chard | |
| 9,120,645 B2 | 9/2015 | Penn et al. | |
| 9,492,693 B2 | 11/2016 | Byrd | |
| 9,776,845 B2 | 10/2017 | Minke | |
| 9,782,891 B2 | 10/2017 | Blake et al. | |
| 9,851,048 B2 | 12/2017 | Higgins | |
| 10,124,999 B2 | 11/2018 | Puszkiewicz et al. | |
| 10,532,919 B2 | 1/2020 | Hufnagl et al. | |
| 10,549,974 B2 * | 2/2020 | McKinney | B66F 11/044 |
| 10,823,327 B2 * | 11/2020 | McKinney | B66F 11/044 |
| 10,968,090 B2 | 4/2021 | McKinney et al. | |
| 11,130,663 B2 | 9/2021 | Linsmeier et al. | |
| 11,306,867 B2 * | 4/2022 | McKinney | B66F 11/044 |
| 11,725,776 B2 * | 8/2023 | McKinney | B66F 11/044 248/235 |
| 12,044,353 B2 * | 7/2024 | McKinney | F16M 13/02 |
| 2002/0066620 A1 | 6/2002 | Lindsey et al. | |
| 2006/0175127 A1 | 8/2006 | Higgins | |
| 2009/0101435 A1 | 4/2009 | Higgins | |
| 2011/0138735 A1 | 6/2011 | Foley | |
| 2012/0241250 A1 | 9/2012 | Eakin et al. | |
| 2014/0138183 A1 | 5/2014 | Chard | |
| 2014/0246270 A1 | 9/2014 | Parot et al. | |
| 2016/0161046 A1 | 6/2016 | Miles et al. | |
| 2016/0368738 A1 | 12/2016 | Minke | |
| 2017/0369296 A1 * | 12/2017 | McKinney | B66F 11/044 |
| 2018/0337674 A1 * | 11/2018 | Rasmussen | G05G 25/00 |

OTHER PUBLICATIONS

U.S. Appl. No. 18/224,918 Notice of Allowance issued Sep. 11, 2024.

U.S. Appl. No. 17/077,547 Final Office Action issued Oct. 8, 2024.

U.S. Appl. No. 17/217,430 Non-Final Office Action issued Oct. 10, 2024.

U.S. Appl. No. 16/935,886 Non-Final Office Action issued Mar. 29, 2024.

U.S. Appl. No. 17/081,530 Notice of Allowance issued Jul. 31, 2024.

U.S. Appl. No. 18/224,918, Non-Final Office Action issued May 5, 2025.

U.S. Appl. No. 17/217,430 Non-Final Office Action issued Apr. 22, 2025.

* cited by examiner

PRIOR ART
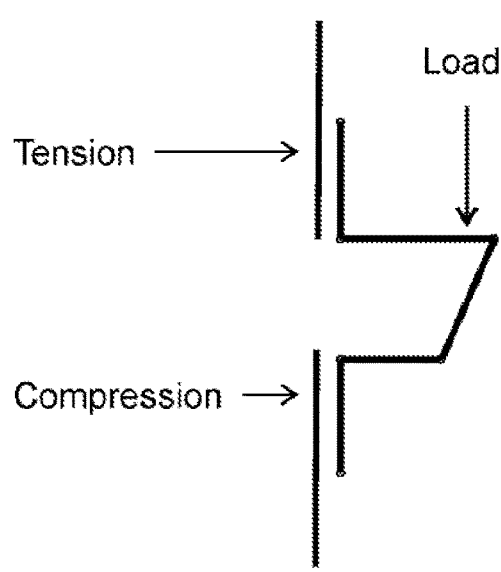
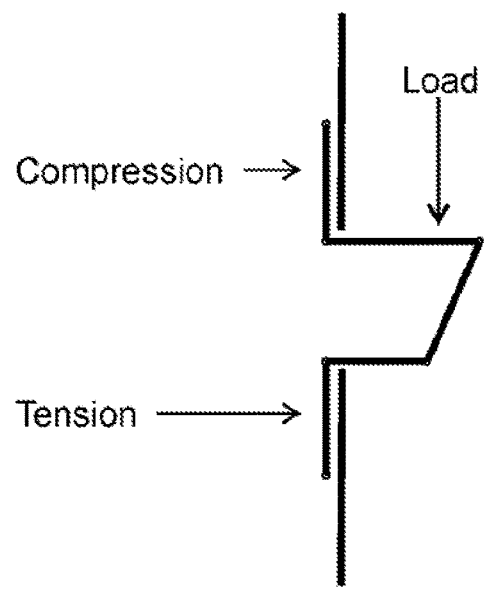
FIG. 3A
FIG. 3B

220

230

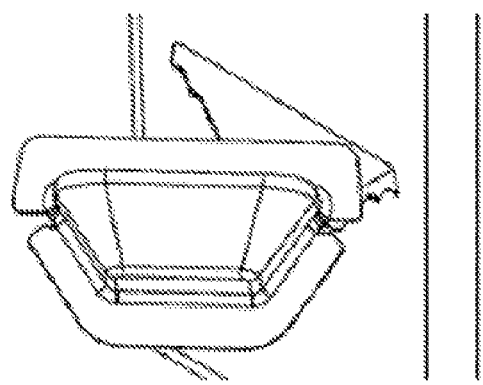
FIG. 9A: Move step into place
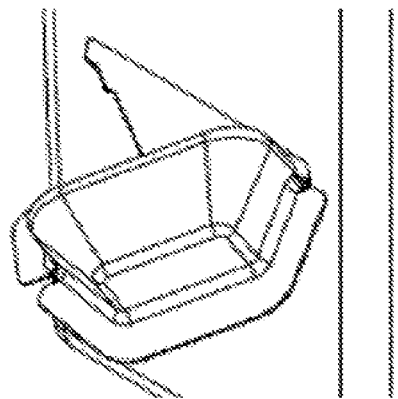
FIG. 9B: Insert step notch into cutout notch
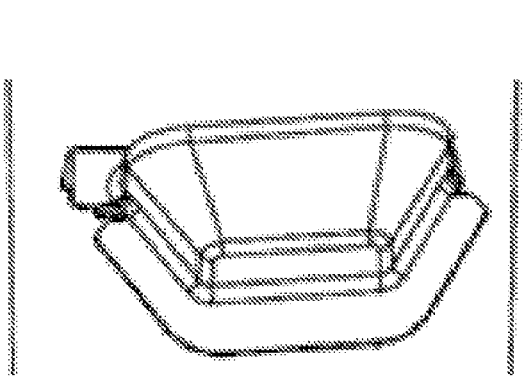
FIG. 9C: Rotate step to insert other half of flange
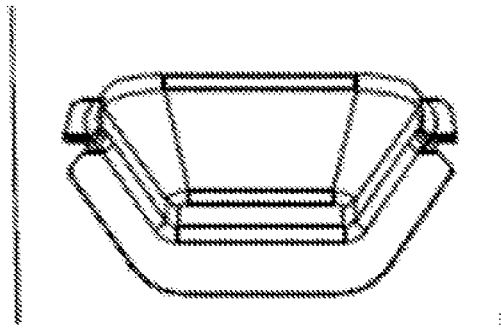
FIG. 9D: Center step in opening
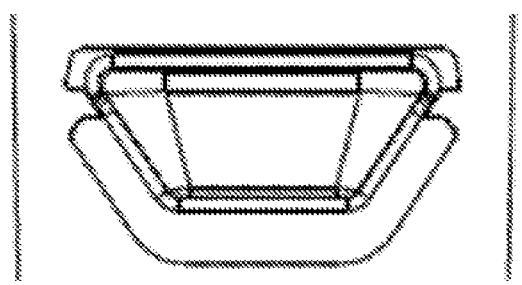
FIG. 9E: Lower step until it locks in place Cut slots in platform Inside flange seals all around opening when bonded Glue on outer rib Valve mounting plate

420

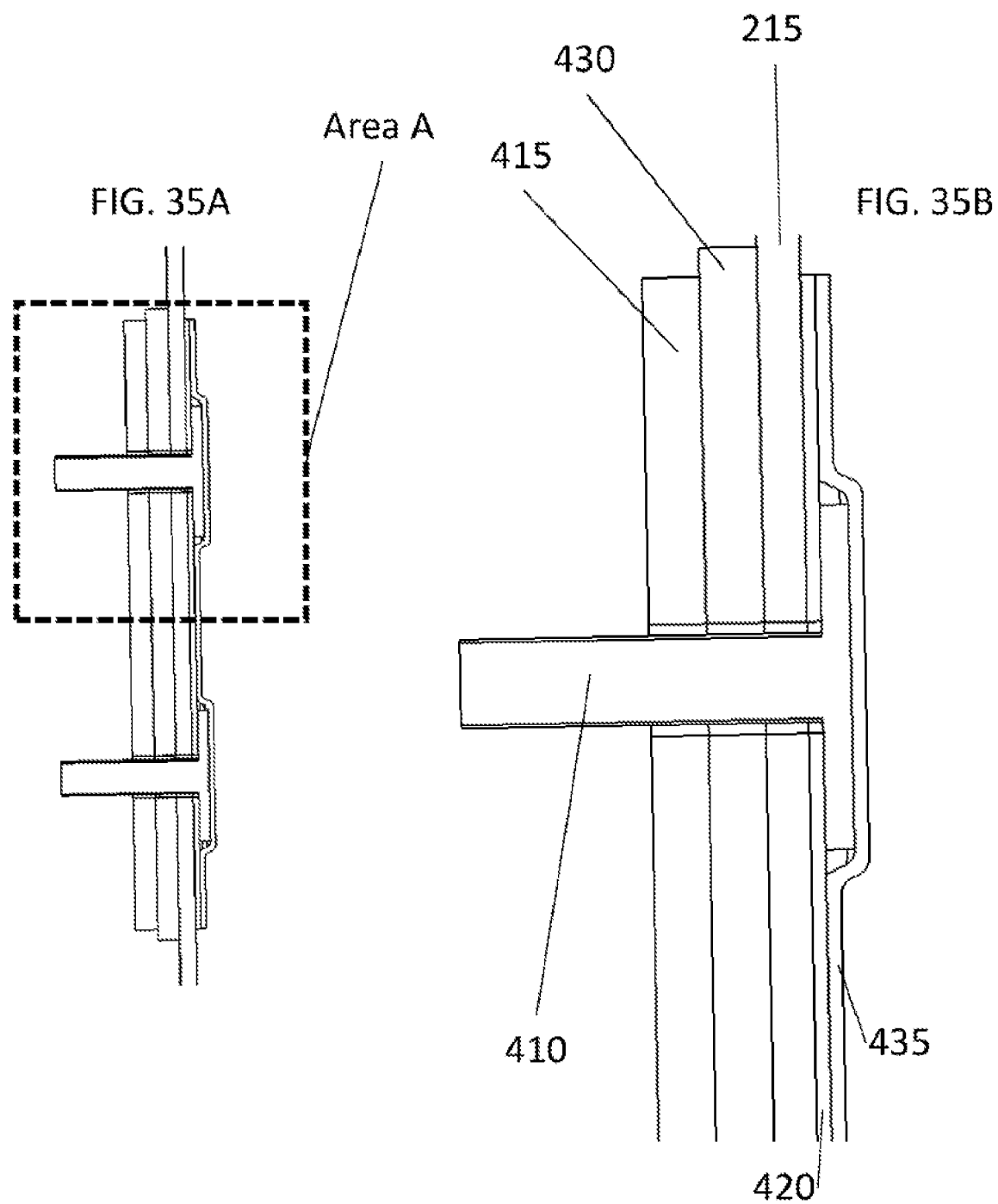

440

415

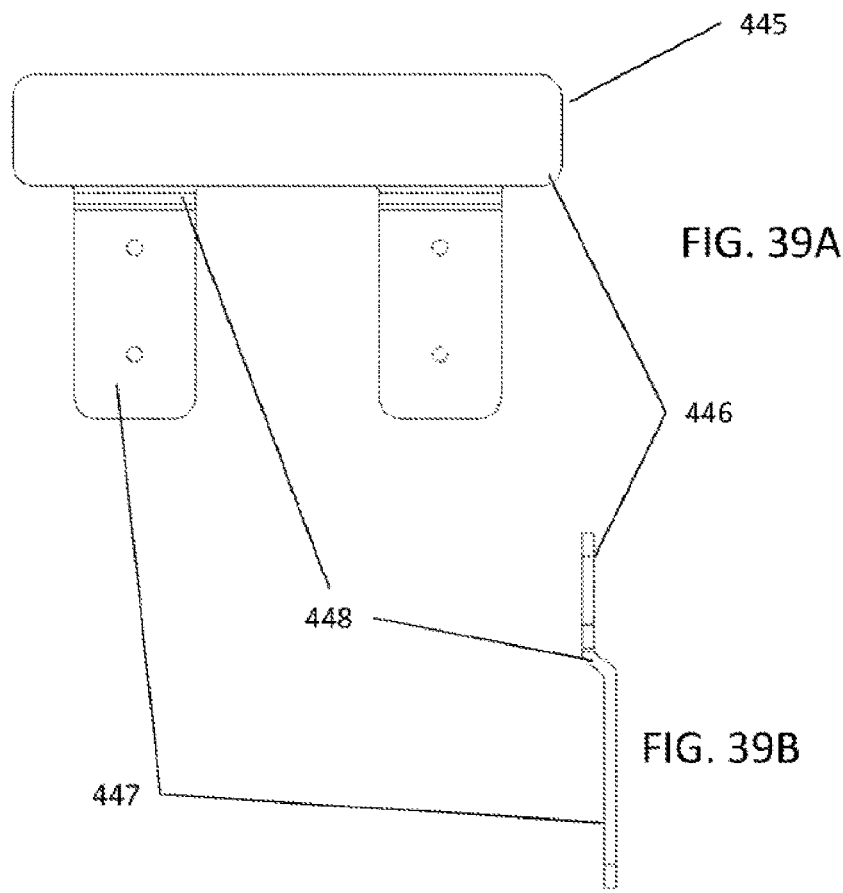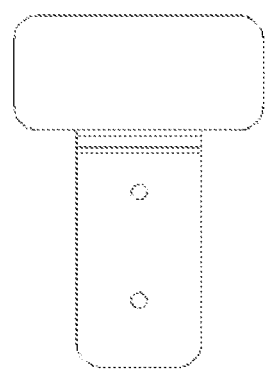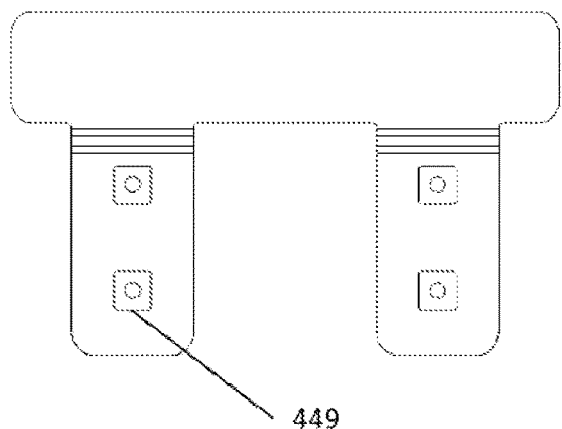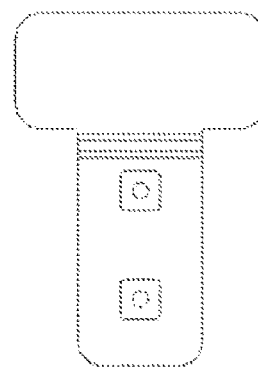

PRIOR ART

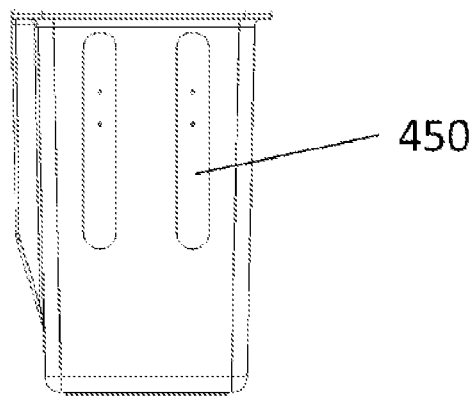 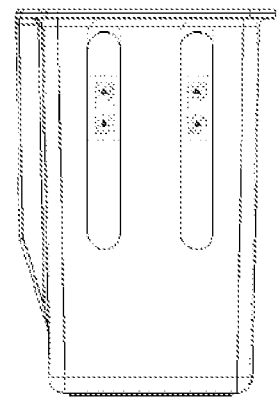
FIG. 44A                    FIG. 44B
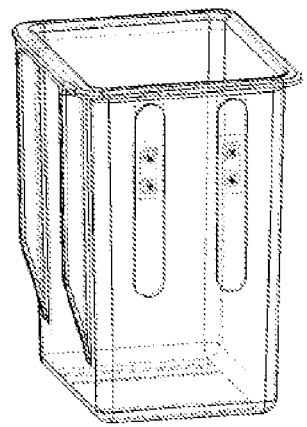 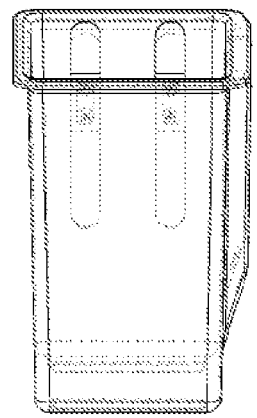
FIG. 44C                    FIG. 44D

455 —

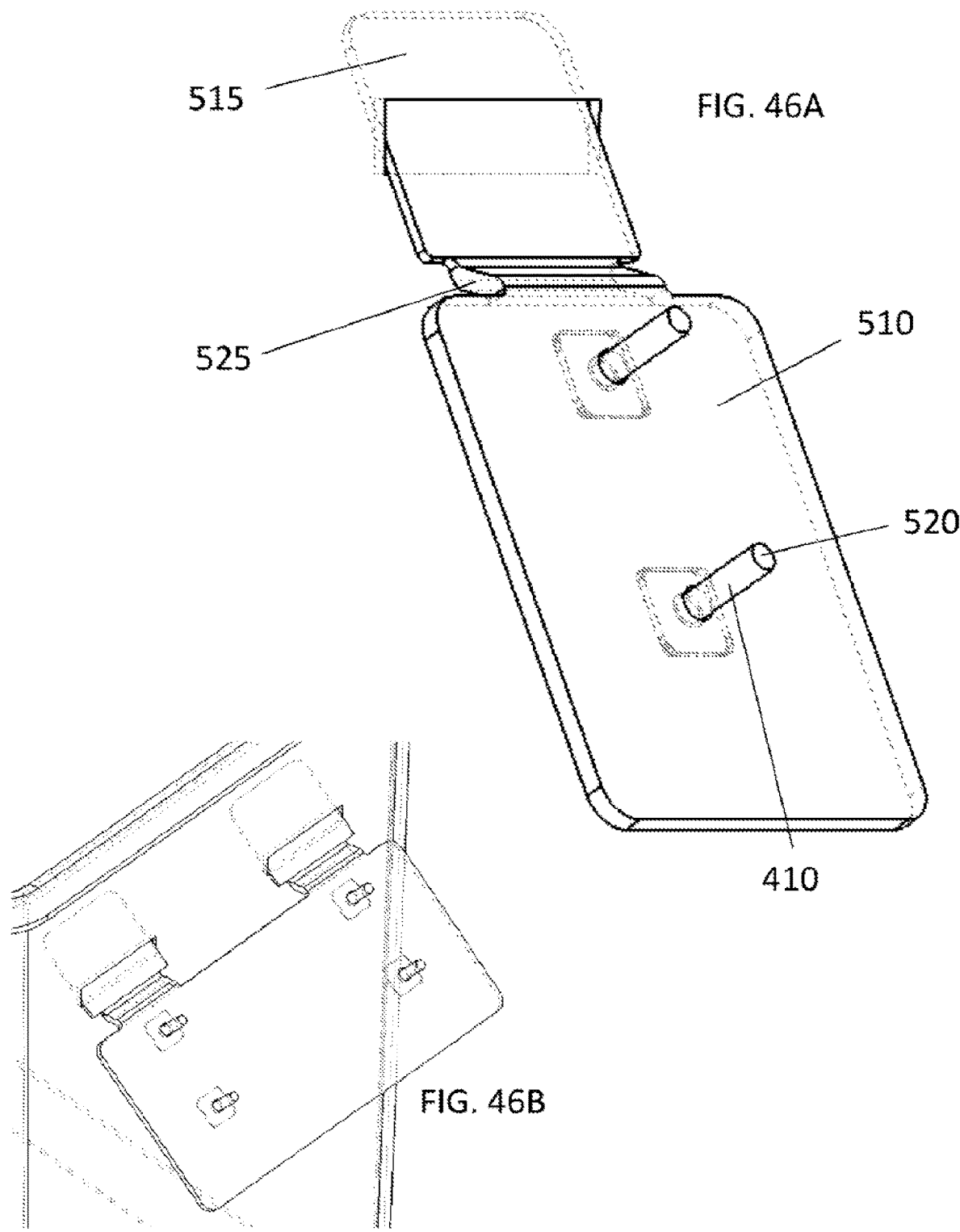

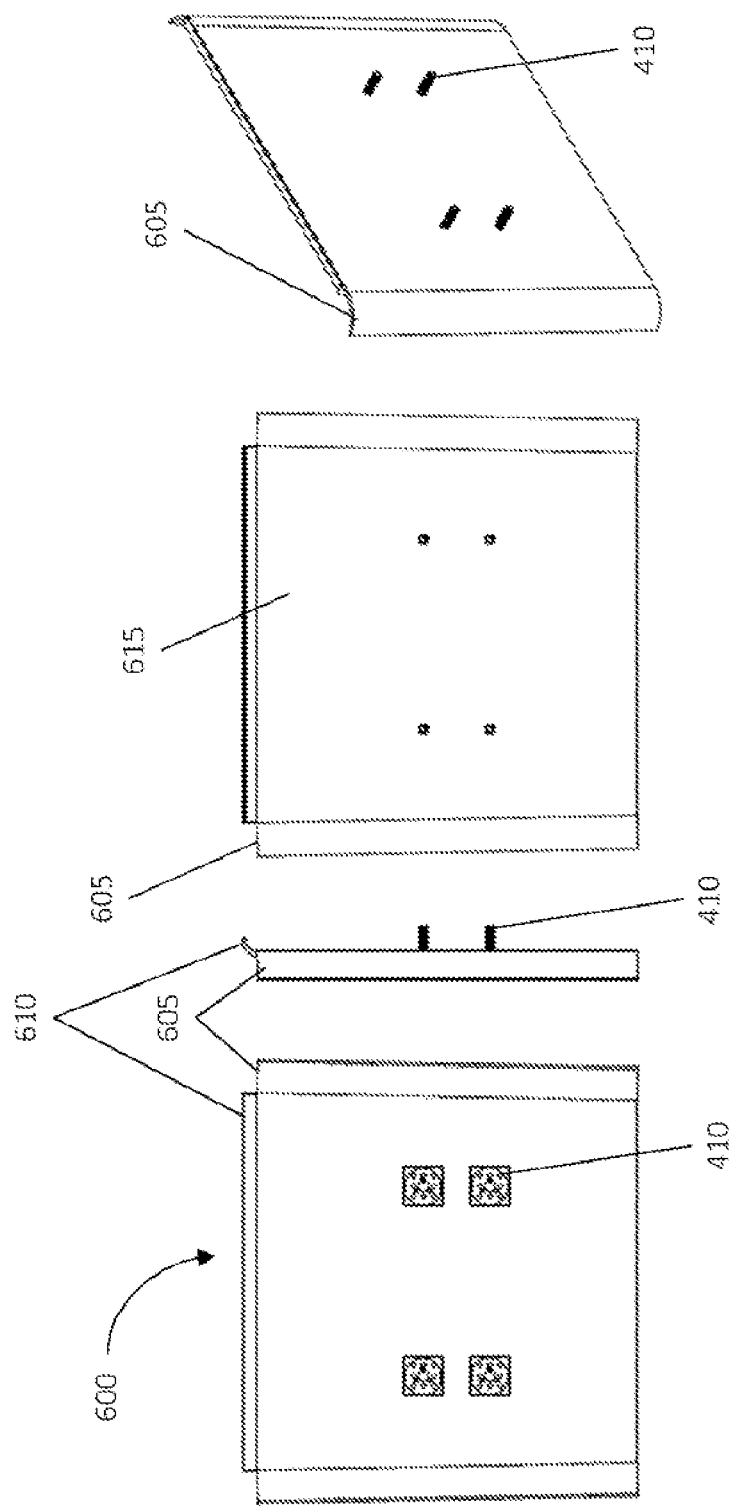

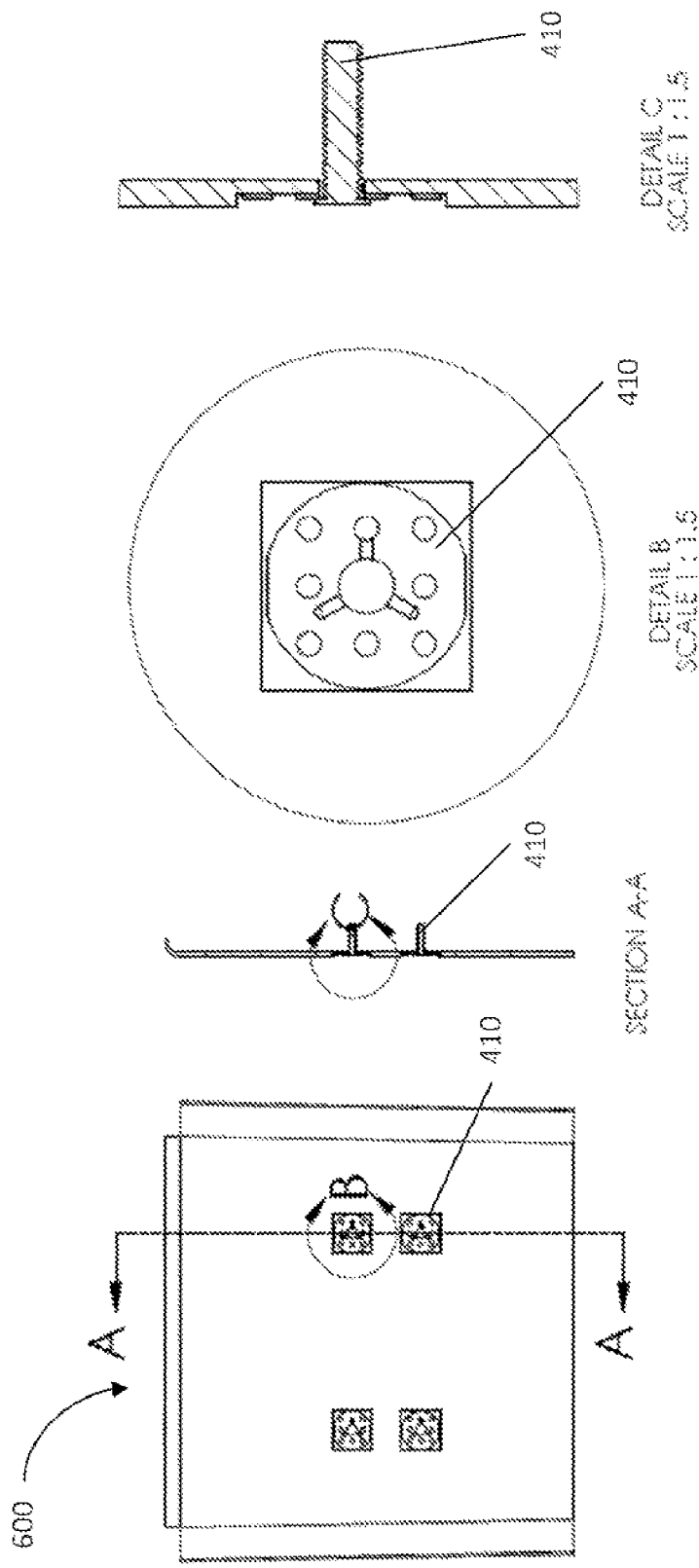

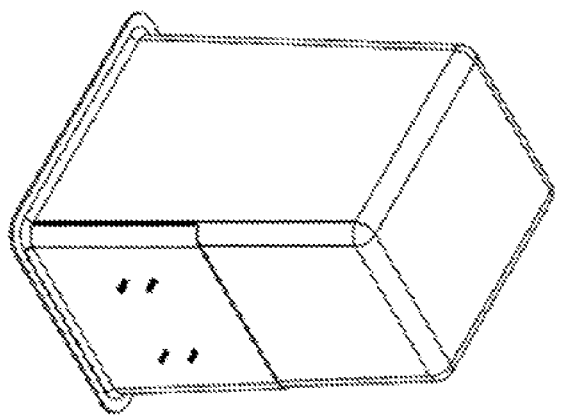
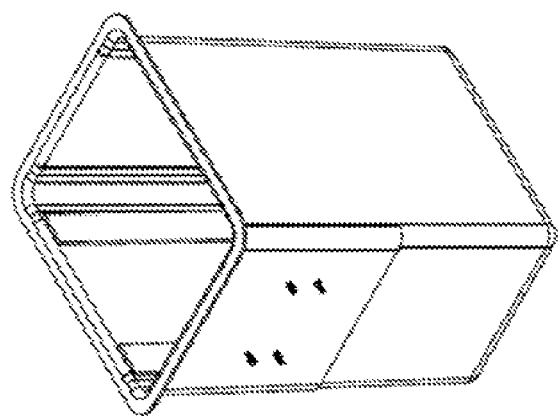
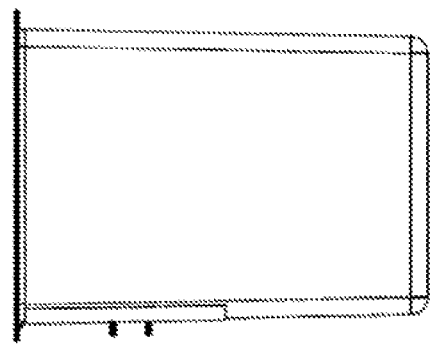
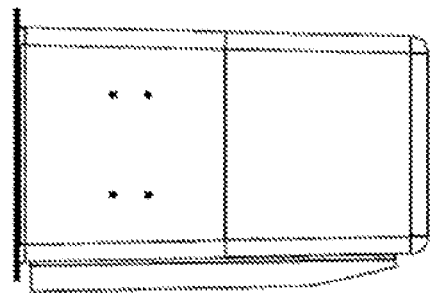
FIG. 52D
FIG. 52C
FIG. 52B
FIG. 52A

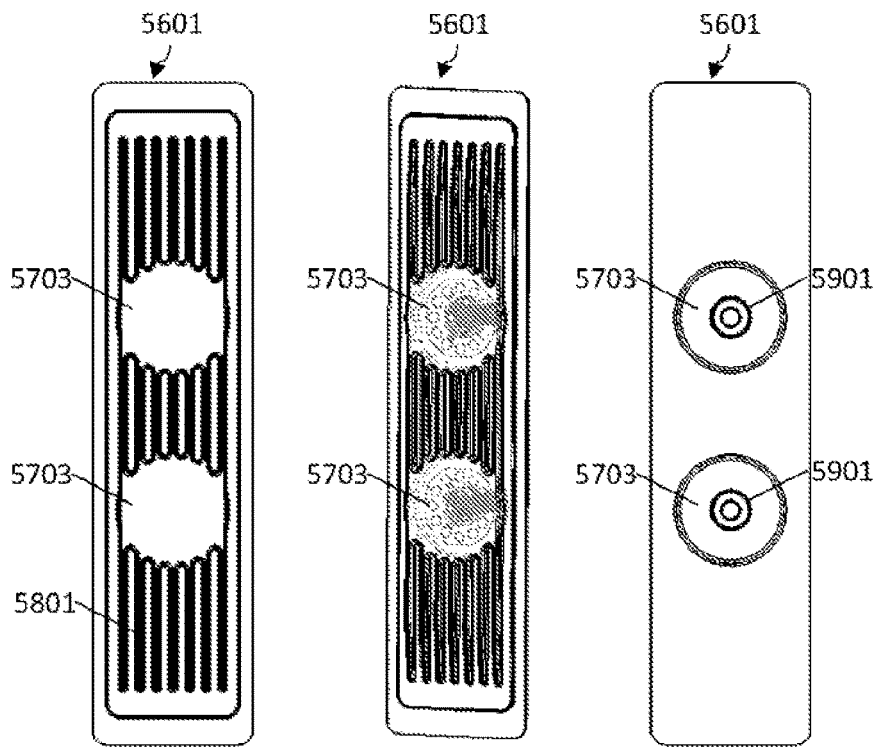
FIG. 58A     FIG. 58B     FIG. 58C
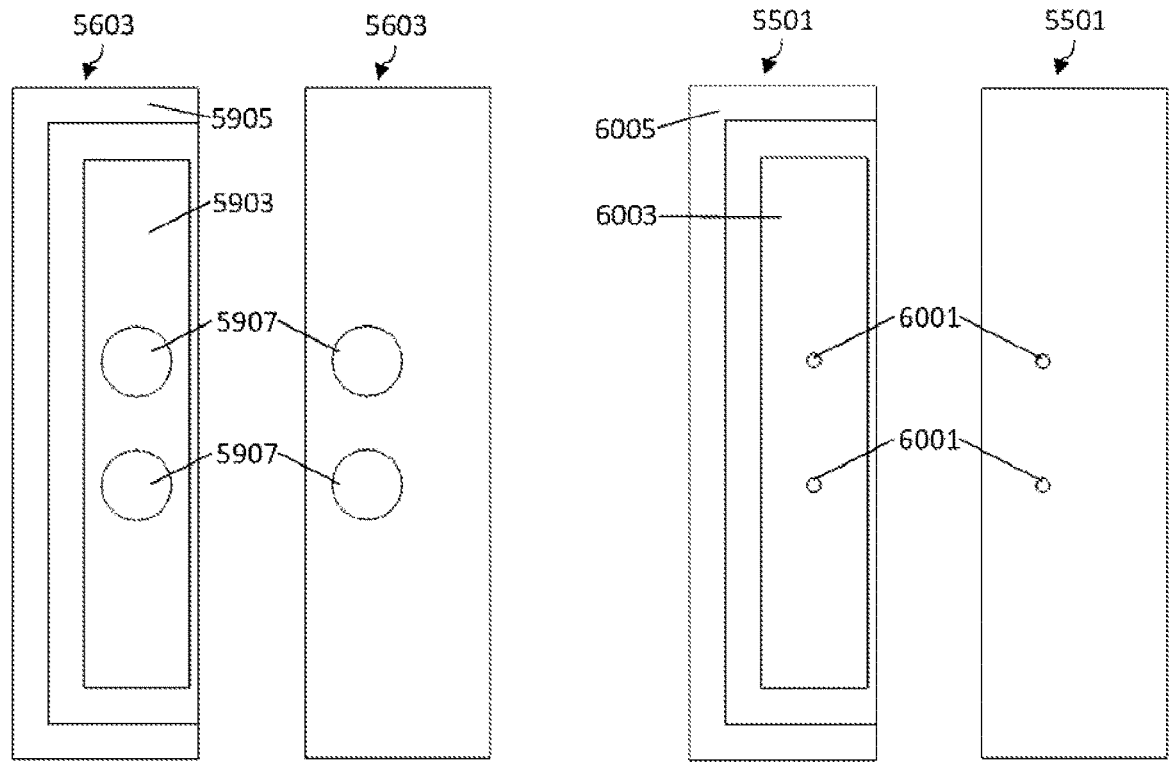

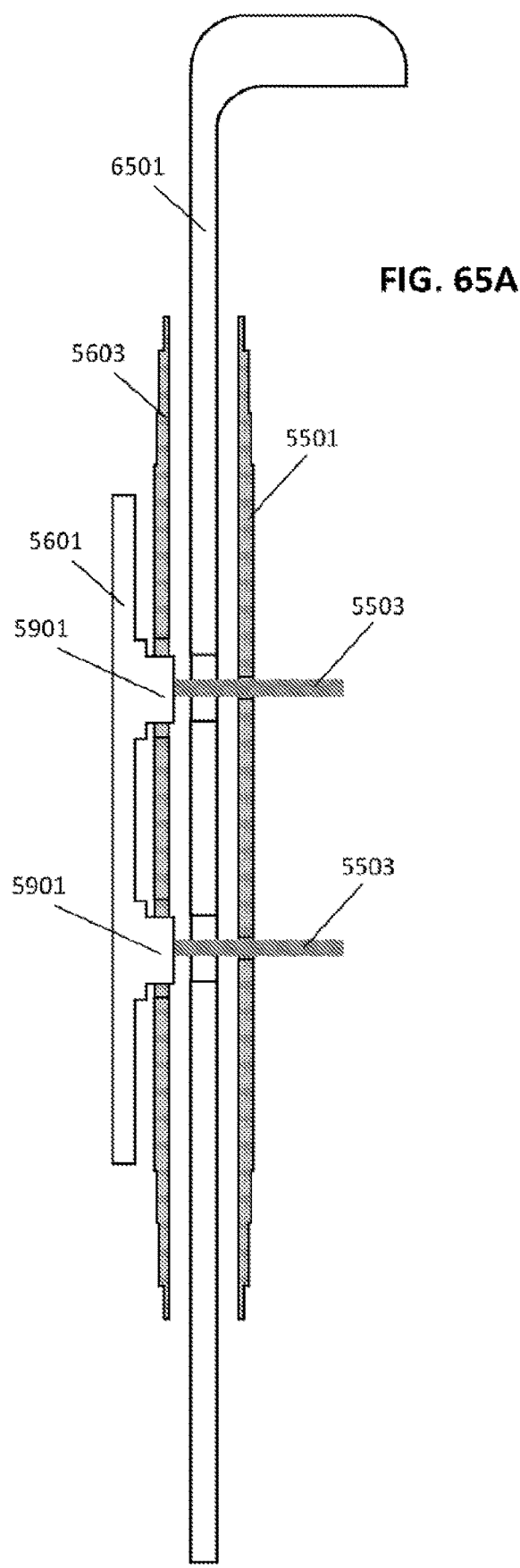
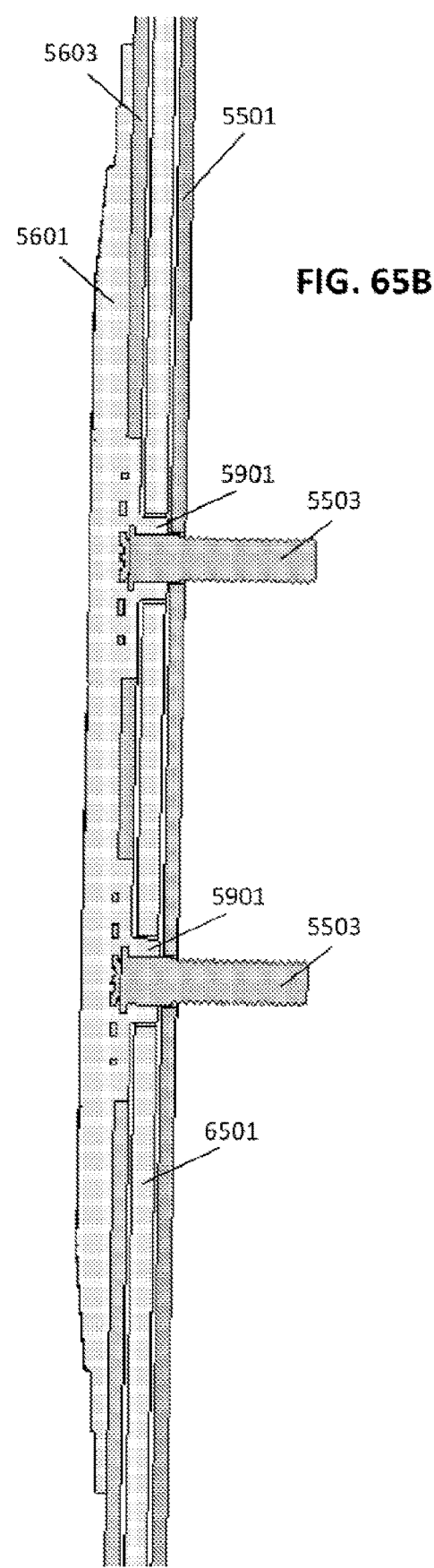
FIG. 65A
FIG. 65B

MOUNTING SYSTEM FOR ELEVATING PLATFORM

CROSS REFERENCES TO RELATED APPLICATIONS

This application is related to and claims priority from the following US patent applications. This application is a continuation of U.S. application Ser. No. 18/233,034, filed Aug. 11, 2023, which is a continuation of U.S. application Ser. No. 17/720,898, filed Apr. 14, 2022, now U.S. Pat. No. 11,725,776, which is a continuation of Ser. No. 17/084,130, filed Oct. 29, 2020, now U.S. Pat. No. 11,306,867, which is a continuation of U.S. application Ser. No. 16/417,059, filed May 20, 2019, now U.S. Pat. No. 10,823,327, which is a continuation-in-part of U.S. application Ser. No. 15/619,210, filed Jun. 9, 2017, now U.S. Pat. No. 10,549,974, which claims priority to U.S. Provisional Patent Application No. 62/348,542, filed Jun. 10, 2016, each of which is incorporated herein by reference in its entirety.

BACKGROUND OF THE INVENTION

1. Field of the Invention

The present invention relates to elevating platforms, and more specifically to elevating platforms used with utility trucks.

2. Description of the Prior Art

It is generally known in the prior art to provide elevating platform with steps, ribs valve mounting plates and some transparency.

Prior art patent documents include the following:

U.S. Pat. No. 3,917,026, Aerial platform utility enclosure assembly, filed Jan. 16, 1975, allegedly describes a modular three-part preformed lightweight synthetic resin panel assembly comprising an aerial platform utility enclosure designed to be installed upon the outer structural surfaces of the frame members of an otherwise unenclosed aerial platform cage, wherein each respective panel member of the utility enclosure has an outwardly extending integrally molded tool and equipment storage compartment, with one such compartment being further provided with interiorly affixed laterally positioned rib panels to support transparent plastic accessory and parts drawers, wherein also the utility enclosure design is such that, when installed, there is no reduction in the available preexisting aerial platform operator/worker occupancy space.

U.S. Pat. No. 5,611,410, Aerial platform enclosure apparatus, filed Jul. 11, 1995, allegedly describes an aerial platform utility enclosure designed to be easily installed upon an unenclosed aerial platform bucket. The enclosure protects the worker from environmental elements without reducing visibility out of the bucket because a polycarbonate plastic such as LEXAN is used to cover the entire enclosure. Upper and lower structural components of the enclosure are constructed out of a non-conductive material. The lower structural component is firmly attached to the bucket while rotation of the upper structure and the protective cover in a full circle allows the worker to have greater access to his surroundings without having to reposition the bucket.

U.S. Pat. No. 6,470,999, Ergonomic insert for aerial bucket, filed Oct. 2, 2000, allegedly describes an ergonomic insert that reduces the risk of low-back injury to workers in aerial buckets. A combination of an ergonomic insert, an aerial bucket and means for stabilizing said ergonomic insert within the aerial bucket is also disclosed. Finally, a method for using such an ergonomic insert is also disclosed. The ergonomic insert comprises a nominally non-deformable material having foot-receiving surfaces and capable of bearing a worker's weight. Various means for supporting the ergonomic insert in a vertical position are disclosed. The method for using the ergonomic insert comprises placing the ergonomic insert into the aerial bucket from above. The ergonomic insert is positioned between the worker and the work to be performed. The worker then places a foot on one of the foot receiving surfaces prior to or while performing the work.

U.S. Pat. No. 4,883,145, Ergonomic aerial basket, filed Jan. 25, 1989, allegedly describes a simple apparatus that reduces the risk of low-back injury to workers in elevated, partially enclosed, aerial baskets. The preferred embodiment basically comprises a circular well within the floor of the basket that is surrounded by a raised footrest platform adapted to receive on foot of the worker. Between the footrest platform and a base of the well is a cylindrical wall that prohibits forward movement under the footrest platform. In operations, when the worker has to perform manual handling tasks outboard of the basket, one foot is raised out of the well and extended forward onto the footrest platform, while the other foot remains below and behind the raised foot, on the base of the well. The worker has thereby adopted a forward leaning posture instead of a forward bending posture. Consequently, the worker retains the optimal curvature of the spine, while achieving a biomechanical advantage that reduces the work demand on the lower back.

U.S. Pat. No. 4,763,758, Scuff pad with step, filed Dec. 22, 1986, allegedly describes a scuff pad with step which resides interiorly of an aerial lift bucket, or bucket liner if provided, at the bottom thereof and which includes a base portion and an upwardly extending portion extending upwardly of the base portion of a predetermined distance, the base portion has a top surface for being engaged by the shoes of said person upon standing in said bucket or liner to prevent scuffing, and the upwardly extending portion has a top surface providing a step which facilitates climbing out of said bucket or liner by the workman.

U.S. Pat. No. 6,491,272, Step assembly with a removable step for hollow poles and the like, filed Aug. 9, 2001, allegedly describes a pole step assembly with a removable step for hollow poles and the like. The step assembly includes a mounting subassembly with a mounting stud and a mounting plate with inter-engaging flat surfaces that limit relative rotational movement of the mounting stud and mounting plate about the axis of the subassembly. A clamp is provided to limit radial movement of the subassembly relative to the pole. The mounting stud of the subassembly optionally also may include a handle portion that captivates the components of the subassembly and facilitates ease of installation of the subassembly. The handle also may break away and be removed after installation of the subassembly. The step is mounted to the subassembly and may include flat surfaces that inter-engage with further flat surfaces on the mounting plate to limit rotation of the step about its longitudinal axis.

U.S. Pat. No. 3,561,563, Portable post step, filed Aug. 14, 1969, allegedly describes an integral rigid catwalk metal sheet bent along a transverse fold line to provide a post engaging portion and a step portion, the post engaging portion having a laterally inwardly extending notch for engaging the post. The post is engaged by opposing edges of the notch wherein one of the edges is the inner edge portion of the step portion. The step is placed on the post from the side and the weight of the step portion causes the unit to pivot downwardly bringing the opposing edges of the notch into engagement with the post thereby locking it in place. The post engaging portion forms an obtuse angle with the step portion and the step portion is normally positioned in a horizontal plane. A series of vertically spaced apart steps may be placed on a post and extend alternately from the post at angles of 90* to each other. Oppositely facing concave portions may be formed in the opposing edge portions for matingly engaging the rounded peripheral edge of a round post.

U.S. Pat. No. 4,763,755, Bucket release assembly for aerial device, filed Jun. 3, 1987, allegedly describes a release assembly for an aerial device for pivotally releasing a worker's bucket from an upright orientation to a horizontal orientation. The assembly consists of protrusions from the worker's bucket and a rotatable latch plate for selectively engaging and disengaging the protrusions.

U.S. Pat. No. 5,722,505, Man platform for an aerial boom, filed Jun. 8, 1995, allegedly describes a man-lifting platform for mounting on an aerial boom comprising a frame adapted to be pivotally connected to the distal end of the aerial boom. The frame has a pair of sleeves on opposite sides thereof and a pair of rods in the sleeves. The rods are secured to the man-lifting platform and generally parallel fashion. A power cylinder is connected between the frame and the man-lifting platform whereby the man-lifting platform may be moved the length of the rods by actuation of the cylinder.

U.S. Pat. No. 5,944,138, Leveling system for aerial platforms, filed Sep. 3, 1997, allegedly describes a system for leveling a personnel carrying platform mounted on the end of an elongated vehicle mounted boom. A pendulum controlled hydraulic valve controls the application of fluid pressure to a pair of cylinders equipped on their ends with a series of links extending along a drum connected to the platform mounting pin. When the platform deviates from a level position, one of the cylinders is retracted to turn the platform mounting pin in a direction to correct the deviation. An interlock valve disables the platform leveling system unless the boom is being moved. A manual override valve allows the platform to be tilted for storage or other reasons.

U.S. Pat. No. 8,550,211, Aerial work assembly using composite materials, filed Sep. 23, 2008, allegedly describes an aerial work assembly including components having composite materials including a fabric-reinforced resin for providing electrically non-conductive assembly, by insulating and/or isolating conductive components.

U.S. Pat. No. 8,550,212, Aerial work assembly using composite materials, filed Apr. 16, 2010, allegedly describes an aerial work platform assembly, comprising a platform shaft retaining assembly; a mounting bracket connected to the platform shaft retaining assembly; and a platform connected to the mounting bracket; wherein the platform shaft retaining assembly, mounting bracket, and platform are constructed from the same or differing composite materials comprising a fabric-reinforced resin. Optionally, the fabric-reinforced resin includes a preform fabric having a conformable three-dimensional weave, and the resin is a dielectric resin selected from either epoxy, epoxy vinyl ester, vinyl ester, polyester, or phenolic.

U.S. Pat. No. 4,334,594, Aerial device, filed Sep. 27, 1979, allegedly describes an articulated aerial device which includes a workman's basket suspended from a movable beam. The basket is attached to the movable beam by an attaching means which selectively permits the basket to rotate for permitting easy access to an injured workman therein.

US Publication 20090101435, Aerial work assembly using composite materials, filed Sep. 23, 2008, allegedly describes an aerial work assembly including components having composite materials including a fabric-reinforced resin for providing electrically non-conductive assembly, by insulating and/or isolating conductive components.

US Publication 20100193286, Aerial Work Assembly Using Composite Materials, filed Apr. 16, 2010, allegedly describes an aerial work platform assembly, comprising a platform shaft retaining assembly; a mounting bracket connected to the platform shaft retaining assembly; and a platform connected to the mounting bracket; wherein the platform shaft retaining assembly, mounting bracket, and platform are constructed from the same or differing composite materials comprising a fabric-reinforced resin. Optionally, the fabric-reinforced resin includes a perform fabric having a conformable three-dimensional weave, and the resin is a dielectric resin selected from either epoxy, epoxy vinyl ester, vinyl ester, polyester, or phenolic.

US Publication 20130306404, Aerial work assembly using composite materials, filed Jul. 24, 2013, allegedly describes an aerial work assembly including components having composite materials including a fabric-reinforced resin for providing electrically non-conductive assembly, by insulating and/or isolating conductive components.

US Publication 20150075906, System for restraining a worker at a utility platform of an aerial device, filed Nov. 25, 2014, allegedly describes a restraint system for restraining a worker to a platform of an aerial device comprises a restraint liner and a platform strap. The restraint liner includes four sidewalls, a floor, a lip, an interior anchor, and an exterior anchor. The floor may be coupled to one end of the four sidewalls, while the lip may be coupled to the opposing end of the four sidewalls and may extend therefrom. The interior anchor may be positioned on an interior surface of a first sidewall and operable to couple to a liner strap coupled to a worker. The exterior anchor may be positioned on an exterior surface of the first sidewall. The platform strap may be coupled to the exterior anchor and operable to couple to the platform.

US Publication 20090045011, Self-powered lift apparatus, filed Aug. 8, 2008, allegedly describes a self-powered lift apparatus includes a support base, a hitch member, a mast, a movable lift boom, and a power unit. Optionally, the lift apparatus may also include at least one movable stabilizer or support leg. The hitch member is coupled to the support base and is adapted to be received by a hitch receiver on a vehicle. The hitch receiver on the vehicle may provide any one of a hitch socket, a three-point hitch, or a universal mount on a skid-steer vehicle. The lift apparatus is powerable solely by the power unit mounted at the lift apparatus and is operable to move the movable lift boom to lift a person or another implement, without reliance on any power supplied from the vehicle. Optionally, the lift apparatus is at least partially supported in a cargo bed of the vehicle.

US Publication 20140138183, System for restraining a worker at a utility platform of an aerial device, filed Nov. 20, 2012, allegedly describes a restraint system for restraining a worker to a platform of an aerial device comprising a restraint liner and a platform strap. The restraint liner includes four sidewalls, a floor, a lip, an interior anchor, and an exterior anchor. The floor may be coupled to one end of the four sidewalls, while the lip may be coupled to the opposing end of the four sidewalls and may extend therefrom. The interior anchor may be positioned on an interior surface of a first sidewall and operable to couple to a liner strap coupled to a worker. The exterior anchor may be positioned on an exterior surface of the first sidewall. The platform strap may be coupled to the exterior anchor and operable to couple to the platform.

US Publication 20120241250, Aerial Work Platforms and Aerial Work Platform Assemblies Comprised of Polymerized Cycloolefin Monomers, filed Mar. 26, 2012, allegedly describes an aerial work platform assembly that includes: a) a platform shaft retaining assembly; b) a mounting bracket connected to the platform shaft retaining assembly; and c) a platform connected to the mounting bracket. The platform shaft retaining assembly includes two concentric apertures for installation of a pivot shaft therein; the mounting bracket having an upper gusset member and a center gusset member that are bonded together and that include horizontal portions to which the pivot shaft is bonded; upper and lower platform pins; a valve bracket; a platform bracket; and upper platform pins that provide for pivoting on a lower platform pin and tilting down of the platform thereby. At least one of the platform shaft retaining assembly, the mounting bracket, the platform, the upper and lower platform pins, and the valve bracket are molded from at least one monomer having at least one norbornene functionality, such as polydicyclopentadiene.

US Publication 20060175127, Aerial work platform assembly using composite materials, filed Feb. 10, 2005, allegedly describes an aerial work platform assembly, comprising a platform shaft retaining assembly; a mounting bracket connected to the platform shaft retaining assembly; and a platform connected to the mounting bracket; wherein the platform shaft retaining assembly, mounting bracket, and platform are constructed from the same or differing composite materials comprising a fabric-reinforced resin. Optionally, the fabric-reinforced resin includes a preform fabric having a conformable three-dimensional weave, and the resin is a dielectric resin selected from either epoxy, epoxy vinyl ester, vinyl ester, polyester, or phenolic.

SUMMARY OF THE INVENTION

The present invention relates to a mounting system for elevating platforms.

It is an object of this invention to provide a mounting system for controls for elevating platforms. Thus, in one embodiment the present invention is directed to a vertically elongated mounting plate with rounded corners. The invention is further directed to a mounting plate inserted through slots in the platform wall. The invention is still further directed to a mounting plate with top and side tabs that wrap around the platform to transform tension stress into shear stress.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 3A is a side cross-sectional view of a prior art platform step design.

FIG. 3B is a side cross-sectional view of another prior art platform step.

FIGS. 9A-E provide various perspective views of a method for assembling a step in the sidewall according to the present invention. FIG. 9A shows the step being moved into place in the cutout. FIG. 9B shows the step notch being inserted into the cutout notch. FIG. 9C shows the step being rotated to insert the other half of the flange. FIG. 9D shows the step being centered in the cutout. FIG. 9E shows the step lowered into place to lock into the cutout.

FIG. 11B is a bottom-front perspective view of the rib. FIG. 11C is a front view. FIG. 11D is a rear perspective view.

FIG. 12A shows a double-L design formed from two individual L-shaped portions. FIG. 12B shows a pultruded double L design with a stem that is double the thickness of the arms. FIG. 12C shows another pultruded double L design with a stem that is the same thickness as the arms. FIG. 12D is a double-L design installed in a platform.

FIG. 14A shows a front perspective view of a first rib. FIG. 14 B shows a front perspective view of a second rib that is paired with the first rib. FIG. 14C shows the rib in a transparent platform; the rib on the right is partially installed and the rib on the left is fully installed.

FIG. 17A is an exterior perspective view of a platform with one rib installed in the platform. FIG. 17B is the view of FIG. 17A with a semi-transparent platform.

FIG. 17C is an exterior side view of a pair of ribs installed in the platform. FIG. 17D is the view of FIG. 17C with a semi-transparent platform. FIG. 17E is an exterior perspective view of a pair of ribs installed in the platform. FIG. 17F is the view of FIG. 17E with a semi-transparent platform. FIG. 17G is a top perspective view of the platform showing an interior of a pair of ribs installed. FIG. 17H is the view of FIG. 17G with a semi-transparent platform. FIG. 17I is an exterior perspective view of a platform with two different types of ribs.

FIG. 27A is a front perspective view of the rib of FIGS. 25-26 installed in a platform with a lanyard bracket attached. FIG. 27B is an opposite front perspective view FIG. 27A. FIG. 27C is a side perspective view of FIG. 27A.

FIG. 28A is a front perspective view of the rib of FIGS. 25-26 installed in a platform with a lanyard bracket attached. FIG. 28B is a partial top perspective view of the rib of FIGS. 25-26 installed in a platform with a lanyard bracket attached.

FIG. 30A is a bottom front perspective view. FIG. 30B is a left side view. FIG. 30C is a rear view.

FIG. 30D is a bottom view. FIG. 30E is front view.

FIG. 32A is a front view. FIG. 32B is a front perspective view. FIG. 32C is a bottom front perspective view.

FIG. 35A is a cross-sectional view of a mounting plate according to the present invention.

FIG. 35B is a magnified view of area A of FIG. 35A.

FIG. 38A is shows the double mounting plate partially inserted in a semi-transparent platform.

FIG. 38C is shows the single mounting plate partially inserted in a semi-transparent platform.

FIG. 39A is a front view of the plate of FIGS. 38A and B.
FIG. 39B is a side view of the plate of FIGS. 38A and B.
FIG. 39C is a rear view of the plate of FIGS. 38A and B.
FIG. 39D is a front view of the plate of FIGS. 38C and D.
FIG. 39E is a rear view of the plate of FIGS. 38C and D.

FIG. 41A is a top perspective view. FIG. 41B is a side view. FIG. 41C is a bottom perspective view.

FIGS. 44A-K are various views of a vertically elongated rectangular mounting plate system installed in a platform according to the present invention. FIG. 44A is a front view of the plate installed in a platform. FIG. 44B is a front view of the plate installed in a semi-transparent platform. FIG.

44C is a front perspective view of the plate installed in a semi-transparent platform. FIG. 44D is a rear perspective view of the plate installed in a semi-transparent platform. FIG. 44E is a rear perspective view of the plate installed in a platform. FIG. 44F is a top perspective view of the plate installed in a semi-transparent platform. FIG. 44G is another top perspective view of the plate installed in a platform. FIG. 44H is a side view of the plate installed in a semi-transparent platform. FIG. 44I is a cross-sectional side view of the plate installed in a semi-transparent platform. FIG. 44J is a close-up view of the cross-section side view of FIG. 44I. FIG. 44K is another close-up view of the cross-section side view of FIG. 44I.

FIG. 46A is a perspective exterior view of a single-upper-section mounting plate according to the present invention partially installed in a transparent platform.

FIG. 46B is a perspective exterior view of a double-upper-section mounting plate according to the present invention partially installed in a transparent platform.

FIG. 50A is a rear view of a mounting plate with tabs according to the present invention.

FIG. 50B is a side view of the mounting plate of FIG. 50A.

FIG. 50C is a front view of the mounting plate of FIG. 50A.

FIG. 50D is a perspective view of the mounting plate of FIG. 50A.

FIGS. 51A-D show detailed views of the embedded big-head studs in the mounting plate of FIGS. 50A-D. FIG. 51A is a rear view. FIG. 51B is a cross-sectional side view. FIG. 51C is a close-up view of the head of a stud inserted in a plate. FIG. 51D is a close-up, cross-sectional side view of a stud and surrounding plate.

FIGS. 52A-D show the embodiment of FIGS. 50A-D mounted on a platform. FIG. 52A is a front view; FIG. 52B is a side view, FIG. 52C is a top perspective view, and FIG. 52D is a bottom perspective view.

FIG. 53A is a side perspective view. FIG. 53B is a front view. FIG. 53C is a side view. FIG. 53D is a rear view. FIG. 53E is a cross-sectional side view. FIG. 53F is a close-up rear view of a stud inserted in the plate.

FIG. 54A is a front view. FIG. 54B is a side view. FIG. 54C is a bottom perspective view.

FIG. 58A illustrates a front view of a first internal plate of an anti-peel stress mounting apparatus according to one embodiment of the present invention.

FIG. 58B illustrates a front perspective view of a first internal plate of an anti-peel stress mounting apparatus and encapsulated bolts according to one embodiment of the present invention.

FIG. 58C illustrates a rear view of a first internal plate of an anti-peel stress mounting apparatus according to one embodiment of the present invention.

FIG. 59A illustrates a front view of a second internal plate of an anti-peel stress mounting apparatus according to one embodiment of the present invention.

FIG. 59B illustrates a rear view of a second internal plate of an anti-peel stress mounting apparatus according to one embodiment of the present invention.

FIG. 60A illustrates a front view of an external plate of an anti-peel stress mounting apparatus according to one embodiment of the present invention.

FIG. 60B illustrates a rear view of an external plate of an anti-peel stress mounting apparatus according to one embodiment of the present invention.

FIG. 65A illustrates a partially exploded, cutaway side view of an anti-peel stress mounting apparatus according to one embodiment of the present invention.

FIG. 65B illustrates a detail, cutaway side view of an anti-peel stress mounting apparatus according to one embodiment of the present invention.

DETAILED DESCRIPTION

Clear Platform

Figure 1:
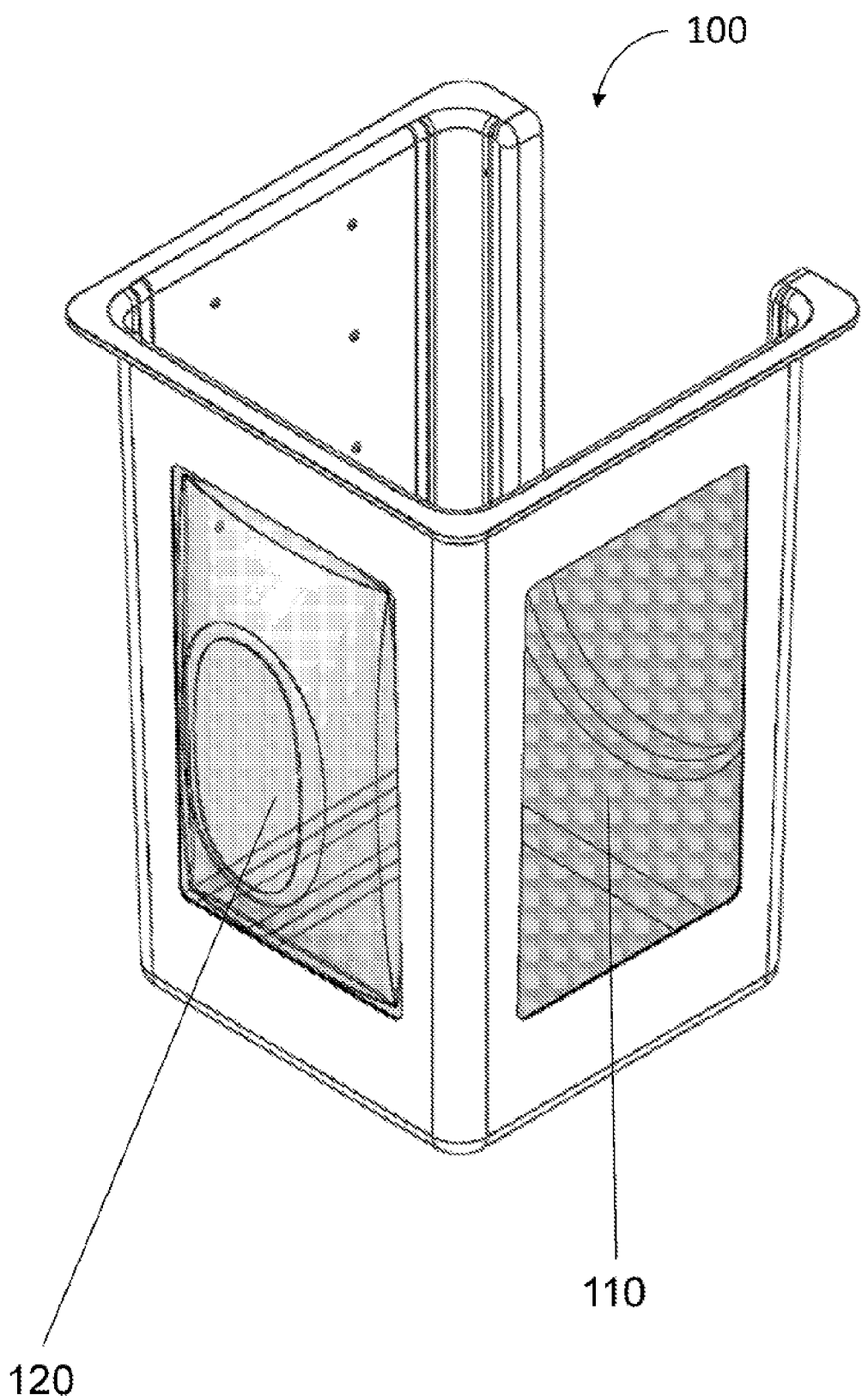
FIG. 1 provides a perspective view of an elevating platform with transparent sidewalls according to the present invention.

Typical prior art platforms are opaque and an operator cannot see through them. If the platform is being used in a tight space or the operator needs to see what is just outside the platform, the clear platform increases the operator's visibility of his surroundings. When a platform is opaque there is an increased probability of the operator striking an object with the platform because of reduced visibility.

Referring now to the drawings in general, the illustrations are for the purpose of describing a preferred embodiment of the invention and are not intended to limit the invention thereto.

The invention is directed to elevating platforms with walls, panels, knee spaces, floors, doors and combinations thereof made of clear or transparent and/or translucent materials to provide high visibility to the operator. The platform is constructed using optically clear or translucent materials, either in strategic locations or having an entirely clear platform, thereby giving the operator enhanced visibility around the platform, resulting in better performance. The present invention also increases operator safety and extends the life of platforms by making it easier for the operator to avoid running the platform into objects.

Figure 2:
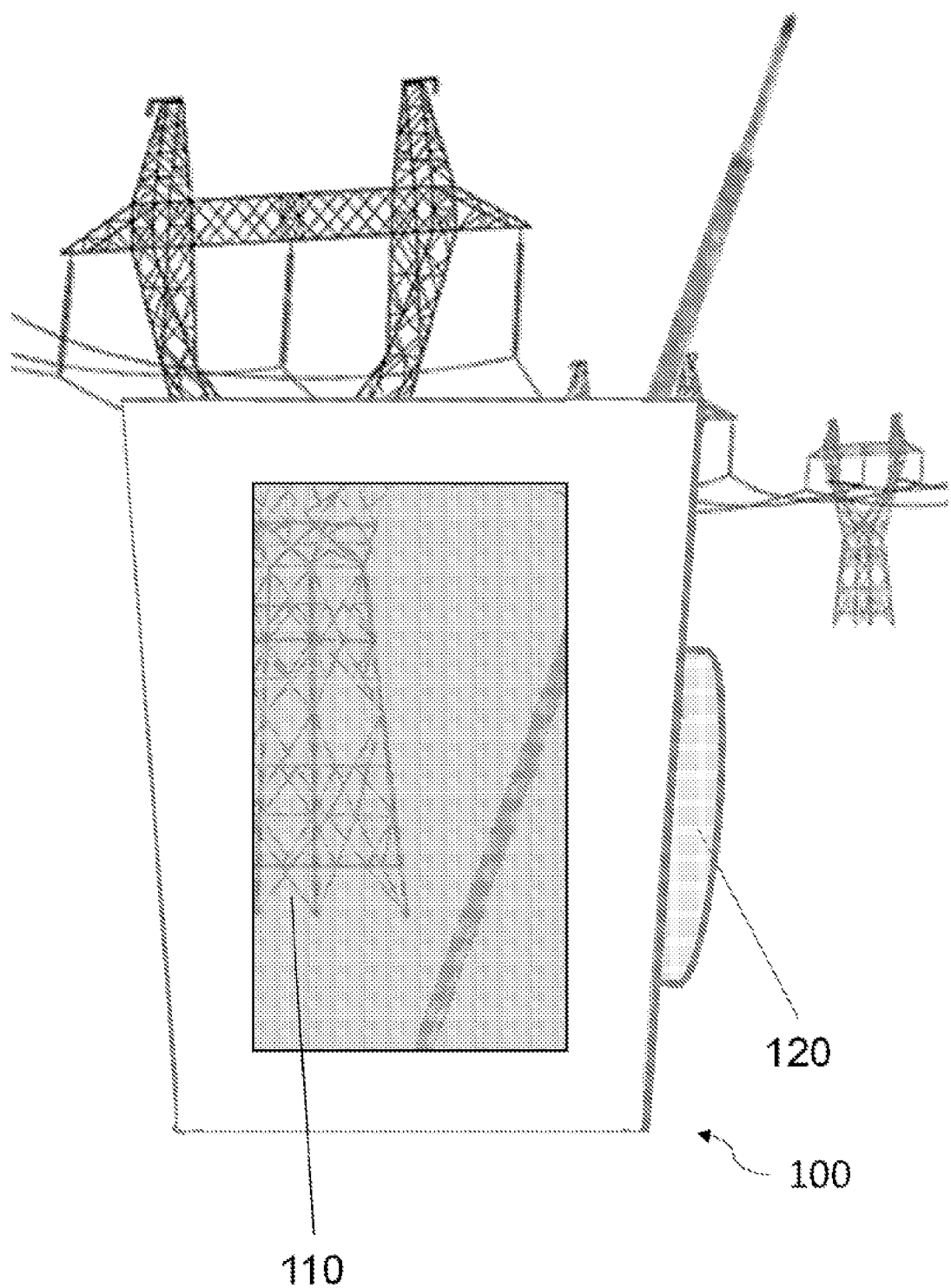
FIG. 2 provides a side view of an elevating platform made of transparent materials according to the present invention.

The present invention provides for different combinations of materials to achieve the enhanced visibility. Some example configurations are as follows: Using a standard, opaque fiberglass platform, generally described as 100 in FIG. 1, sections of one or more walls are cut out and a clear, transparent panel 110 or panels are attached. The clear replacement section is a planar shape or an outwardly bulbous shape 120 which provides space for the knees of a squatting operator. In another configuration, the platform door is constructed of clear material. In yet another configuration, the platform is constructed in the typical fashion, but a resin system with a reflectance and refractive index similar to glass is used, yielding an entirely clear platform with similar image displacement as glass (FIG. 2).

The clear materials are attached to a typical fiberglass platform by adhesive bonding, mechanical fastening, and combinations thereof. If the fiberglass platform is made to be clear, a resin is chosen to match the reflectance and refractive index of the glass, resulting in a composite laminate that is optically clear and with similar image displacement as glass. The clear material has a refractive index of between about 1.3 and 1.7, a reflectance between about 70 and 100, negligible scattering and negligible absorbance.

For translucent designs, the translucent material is preferably between about 30% and about 70% light transmission. More preferably, the % light transmission is about 40-60%. In another embodiment, the % light transmission is about 50%. An example preferred embodiment is white polycarbonate with a % light transmission of between about 30% and about 70%. The make and model of an example preferred white translucent polycarbonate is Sabic Lexan XL102UV.

Alternatively, a fiber reinforced thermoset resin with a clear gel coat may be used to produce an entirely translucent platform structure. Translucent components such as panels, knee spaces, and doors could then be attached to the translucent platform structure. These translucent components may be made from Polycarbonate, Acrylic, Nylon, Polypropylene, fiber reinforced thermosets, and unreinforced thermosets.

Alternatively, polycarbonate, acrylic, nylon, polypropylene, fiber-reinforced thermosets, and unreinforced thermosets may be used to produce an entirely translucent platform.

In another alternative embodiment, a platform structure is made with fiberglass, an optically clear thermoset resin, and a translucent gel coat to allow light transmission but maintain privacy.

Alternatively, a reinforced thermoplastic such as Vectorply EPP-W 1500 or Vectorply EPP-W 2200 may be used to create an entire platform or platform components such as a panel, knee space, or door. The Vectorply products are a fiberglass reinforced polypropylene and they become translucent after they are processed during manufacturing of platforms and platform components.

In a preferred embodiment, the resins are acrylic-modified resins such as POLYLITE 32030-00 and 32030-10, manufactured by REICHHOLD, Research Triangle Park, NC, USA. In one embodiment, the acrylic-modified resins include polyester resins. Preferably, the acrylic-modified resins are low-viscosity resins, low-reactivity resins, and UV-stabilized resins. Any clear or translucent thermoplastic or thermoset, impact-resistant polymer, such as polycarbonate, can be used without departing from the scope of the invention.

The invention is thus directed to an elevating platform with at least one wall; and further including at least one panel, at least one knee space, and/or at least one door. The at least one wall, the at least one panel, the at least one knee space, and/or the at least one door is formed of a clear or translucent material, thereby providing an elevating platform which provides for greater visibility to an operator. In another embodiment, the elevating platform includes at least one clear or translucent section in the at least one wall, wherein the remainder of the at least one wall is constructed out of a different material than the at least one clear or translucent section. The at least one clear or translucent section is attached to the elevating platform by adhesive bonding and/or mechanical fastening. The at least one clear or translucent section is a planar shape or a knee space formed by an outwardly bulbous shape using clear or translucent material. The knee space provides space for at least one knee of a squatting operator. In another embodiment, the entire elevating platform is constructed using fiberglass and a clear or translucent resin system such that the elevating platform is entirely clear or translucent. The clear resin system has a refractive index between about 1.3 and about 1.7. The translucent resin system has a % light transmission of between about 30% and about 70%. The clear or translucent material is fiber-reinforced thermosets, unreinforced thermosets, fiber-reinforced thermoplastics, and/or unreinforced thermoplastics. The translucent resin system is preferably white polycarbonate.

Platform Step

The present invention is further directed to a step for use in elevating platforms. Steps are located on the sidewall of a platform, and the operator uses them as an aid to get into and out of the platform. Typical prior art steps have a flange all around the step that is bonded to the outside of the platform wall (FIG. 3A). When a load is applied to the step (e.g. an operator stands on it), the bondline on the upper portion of the step flange is in tension (step is trying to pull away from the platform wall). The bondline on the lower portion of the step flange is in compression (trying to push into the platform wall). Failures typically initiate on the portion of the bondline that is in tension, and not on the portion of the bondline in compression.

In an alternative prior art embodiment (FIG. 3B), a cutout is made in the platform wall, and a step is inserted through it from the inside. The flange of the step is bonded to the inside of the platform wall. In this embodiment, the top bondline is in compression and the bottom bondline is in tension (the step is being pushed into the platform).

Both of these embodiments rely on the strength of the adhesive, rather than on the structural strength of the components.

Figure 4:
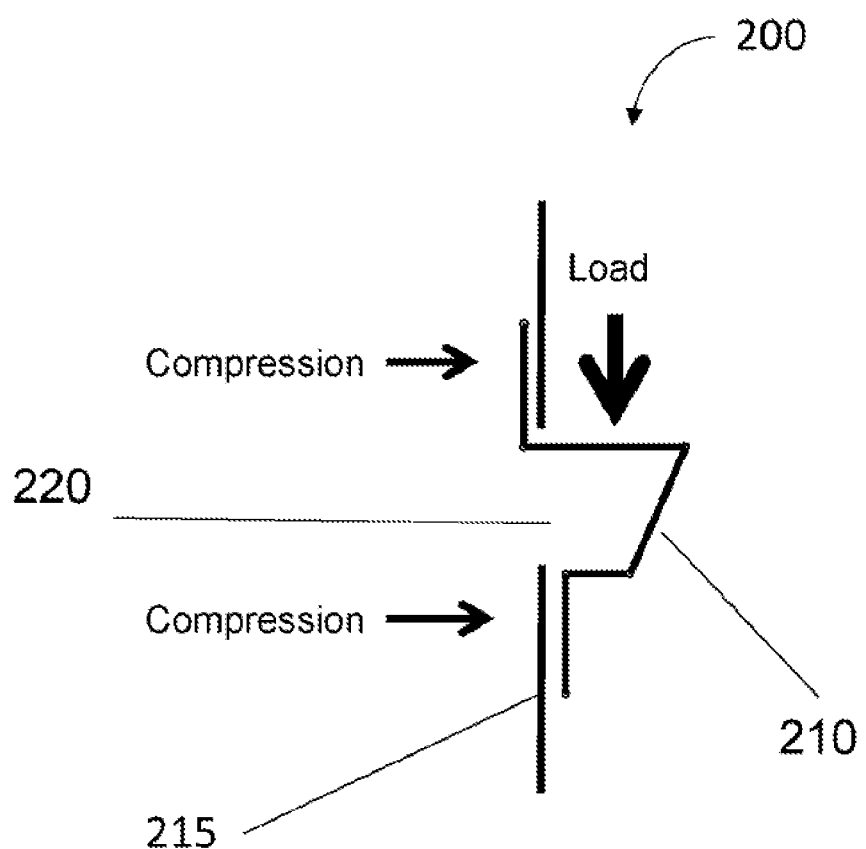
FIG. 4 provides a side cross-sectional view of a platform step design according to the present invention.
Figure 5:
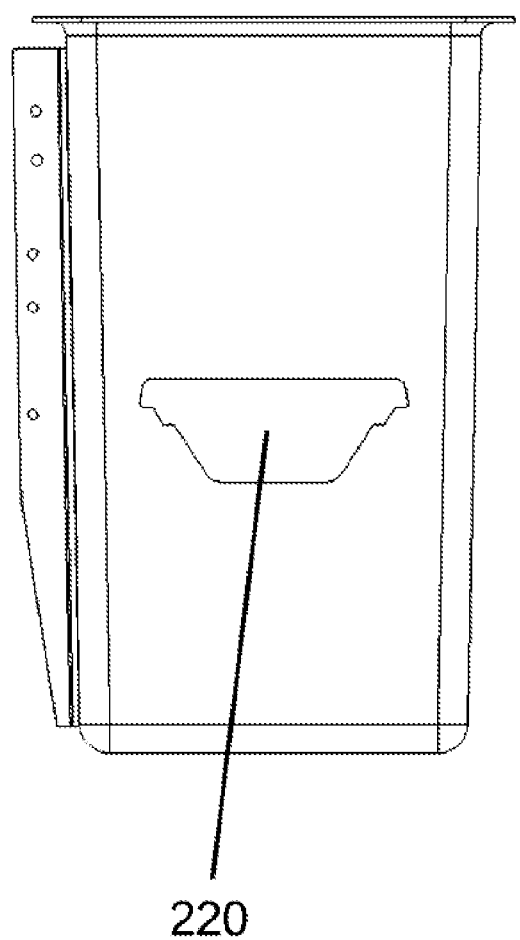
FIG. 5 provides a side view of a platform with a step cut-out according to the present invention.
Figure 6:
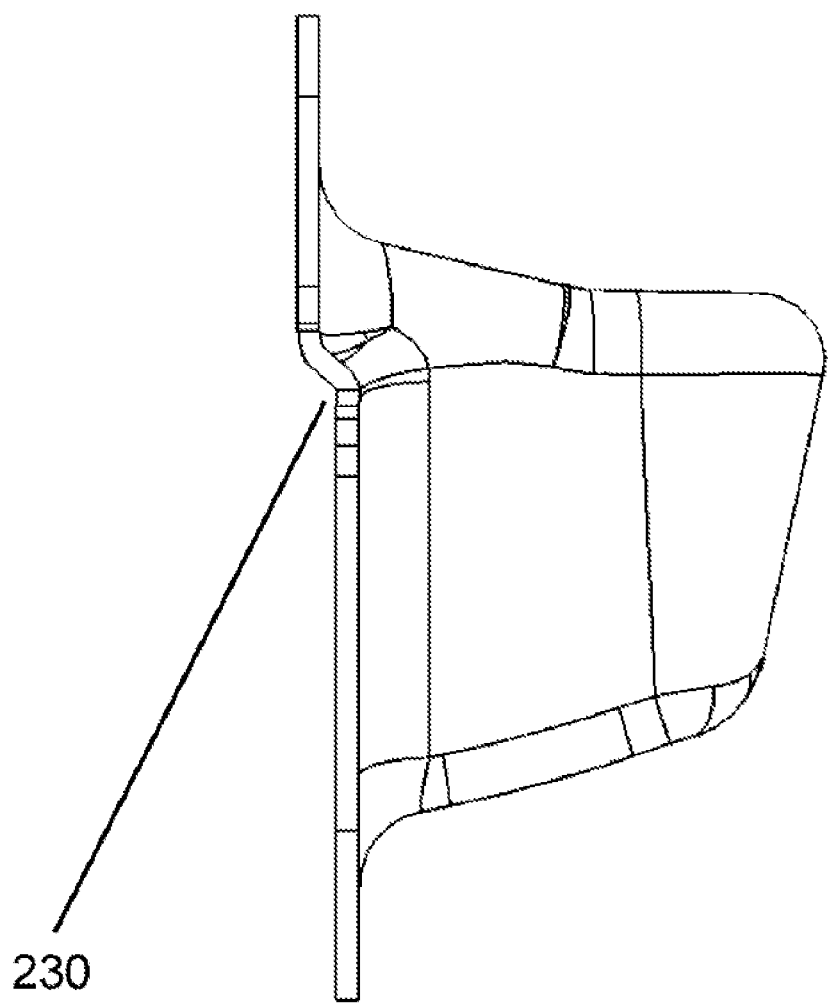
FIG. 6 provides a side view of a step according to the present invention.
Figure 7:
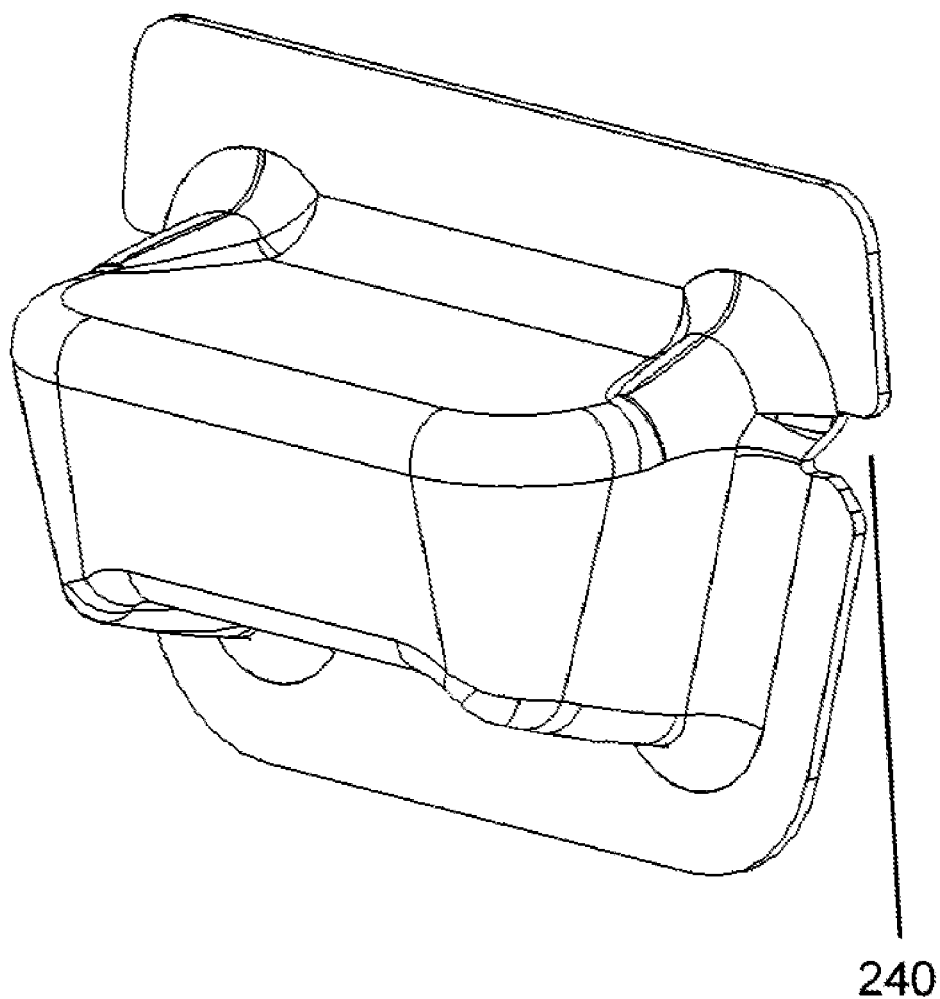
FIG. 7 provides a front perspective view of a step according to the present invention.
Figure 8:
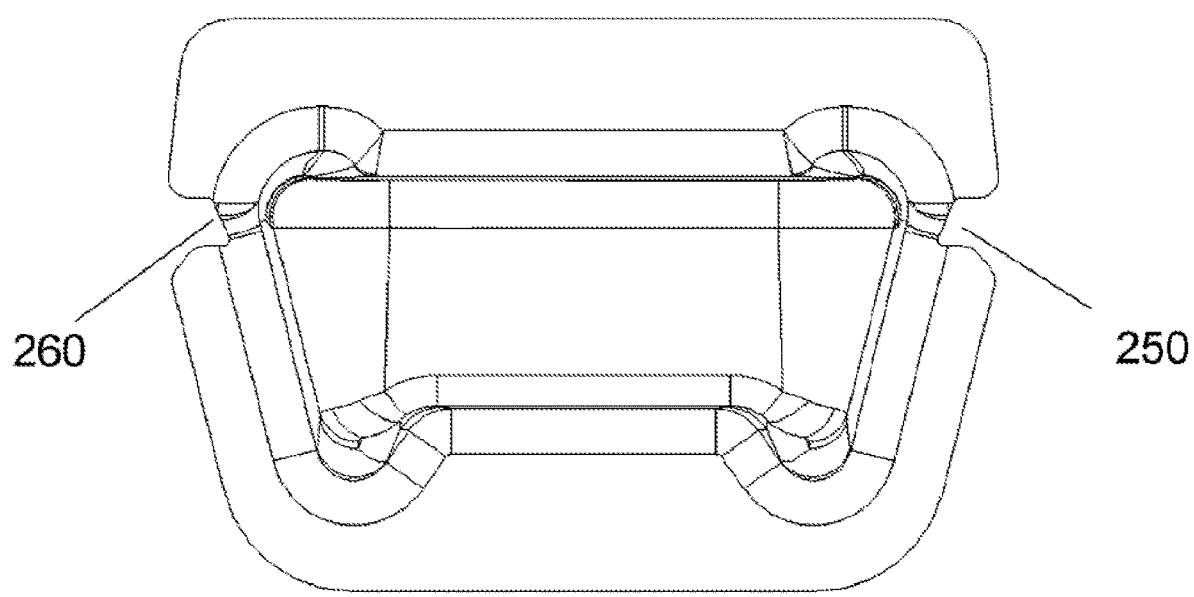
FIG. 8 provides a front view of a step according to the present invention.

The present invention eliminates the weakness of the prior art by having both the top and bottom bondlines in compression. As shown in FIG. 4, the present invention provides for a specifically designed platform cutout 220 in the sidewall 215 of the platform that the step fits into. The system, generally shown as 200 in FIG. 4, includes a step 210 that is specifically designed and configured to lock into the cutout 220 (FIG. 5). The step includes at least one transition 230 (FIG. 6) and at least one notch 240 (FIG. 7). The notch and opposite margin are designed such that when the step is inserted into the cutout with the bottom of the notch touching the sidewall, the opposite top flange 250 (FIG. 8) clears the cutout and is moved into the platform by pivoting the step around the notch. The step transition 230 is designed and configured such that the top and bottom flanges fully contact the inner and outer sidewall, respectively. This contact serves to provide more surface contact area between the step and the sidewall. This design provides that the upper portion of the flange compresses against the inside of the platform wall and the lower portion of the flange compresses against the outside of the platform wall, thus causing both portions to be under compression, rather than tension. Thus, all loads on the step are compressive loads.

Preferably, a second notch 260 is provided on the margin opposite the first notch, such that when the step is centered, a portion of the second side margin extends over the sidewall, covering it. This coverage provides for a seal of the cutout. Some platform assemblies that include a platform step are used with insulating liners and other platform assemblies that include a platform step are not used with insulating liners. According to ANSI A92.2—2015 Section 4.9.5.1, platforms for use with insulating liners shall not have drain holes or access openings. Therefore the platform step cutout must be sealed if the platform is going to be used with an insulating liner. The platform step is fixed to platforms the same way if the platform is or is not going to be used with an insulating liner, therefore the step cutout must always be sealed.

To mount the step in the cutout (FIGS. 9A-E), the step is first moved into place (FIG. 9A). A step notch is inserted into the cutout notch (FIG. 9B). The step is then rotated to completely insert the top flange into the cutout (FIG. 9C). The step is centered in the cutout opening (FIG. 9D). The step is then lowered until it locks into place (FIG. 9E).

Different designs and configurations can be used without departing from the scope of the invention.

In another embodiment, the invention is thus directed to a step for an elevating platform with a sidewall, the step includes a top flange, a bottom flange, and a transition. The top flange and the bottom flange are joined by the transition; and the step is configured to insert into a cutout in the platform sidewall. The bottom flange is configured to contact an outer surface of the platform sidewall when the top flange contacts an inner surface of the sidewall. In one embodiment, the step includes a first step notch in a first side of the transition, configured such that when the first step notch is inserted into a first cutout notch of the cutout in the platform sidewall, the top flange of the platform step is operable to be inserted into the cutout of the sidewall and the platform step is operable to be pivoted via the first step notch in the first cutout notch such that the top flange contacts the inner surface of the sidewall. Another embodiment includes a second step notch in a second side of the transition; the platform step operable to lock into the elevating platform by positioning the top flange such that the top flange contacts the inner surface of the sidewall, positioning the first step notch in the first cutout notch, and positioning the second step notch in a second cutout notch. The top flange is configured such that when the platform step is locked into the platform sidewall and adhered to the elevating platform with adhesive, the top flange of the platform step covers the cutout, thereby sealing it. The platform step is also configured such that when the platform step is locked into the platform sidewall, the top flange of the platform step compresses the inner surface of the sidewall and the bottom flange of the platform step compresses the outer surface of the sidewall, thus providing compressive bonds between the platform step and the sidewall.

In yet another embodiment, the invention is also directed to an elevating platform with a cutout to receive the top flange of the step as previously described. The elevating platform includes a first cutout notch configured such that when the first step notch is inserted into a first cutout notch of the cutout, the top flange of the platform step is operable to be inserted into the cutout of the sidewall and the platform step is operable to be pivoted via the first step notch in the cutout notch such that the top flange contacts an inner surface of the sidewall. The elevating platform and step are operable to lock together by positioning the top flange such that the top flange contacts the inner surface of the sidewall, positioning the step notch in the cutout notch, and positioning a second step notch in a second cutout notch. The top flange and the cutout are configured such that when the platform step is locked into the elevating platform and adhered to the elevating platform with adhesive, the top flange of the platform covers the cutout, thereby sealing it. The platform cutout and platform step are configured such that when the platform step is locked into the elevating platform, the top flange of the platform step compresses the inner surface of the sidewall and the bottom flange of the platform step compresses an outer surface of the sidewall, thus providing compressive bonds between the platform step and the sidewall. In one embodiment, the cutout includes a top cutout portion and a bottom cutout portion, wherein the top cutout portion is wider than the bottom cutout portion; and the platform step includes a first side notch and a second side notch. The top flange and the cutout are configured such that when the first side notch is in contact with the first sidewall at the bottom cutout portion, the top cutout portion is operable to receive the top flange. Then, the first side notch and the second side notch are operable to lock into the bottom cutout portion of the cutout, thereby locking the platform step into the elevating platform. The top flange and the cutout are configured such that when the platform step is locked into the elevating platform and adhered to the elevating platform with adhesive, the top flange of the platform step covers the cutout, thereby sealing it.

Platform Rib

Currently multiple platform sizes and shapes are manufactured via Light Resin Transfer Molding (LRTM) with molded-in ribs or via hand layup with molded-in ribs. There are several disadvantages associated with this construction. The molded-in ribs necessary to provide structural support are thick, which adds unnecessary weight to the platform. Quality issues related to molded-in ribs occur because this design is difficult to manufacture. For example, it is difficult to spray gel coat in a uniform thickness in the mold rib cavity. It is also difficult to consistently place fiberglass in the mold rib cavity. Some molded-in ribs have foam cores, and gel coat cracking can occur more easily in ribs with foam cores when compressive forces are applied such as when platform mounting studs are tightened.

Furthermore, platforms can't be stacked during shipping due to the molded-in ribs. The rib cavities in the platform mold suffer damage faster than other areas of the mold. The molded-in ribs are also required to have a slight draft so the platform can be de-molded. It is preferable if the ribs don't have a draft for mounting purposes.

A minimum of three large objects; plug, master tool, and tool are required to manufacture a platform with a single style of molded-in ribs. For example, the five different styles of 1-man platforms currently offered by Altec, Inc. require eight different plugs, master tools, and tools for a total of 24 large objects. These items take up a lot of storage space. They are also more likely to be neglected because there are so many of them to keep track of. If the 1-man platform was made with pultruded ribs according to the present invention and if it were consolidated to one platform height then it would only require 1 plug, 1 master tool, and 1 tool to produce all of the platform rib styles currently offered.

The present invention provides for a new elevating platform support system that does not use molded-in ribs, but rather uses externally-applied reinforcement ribs that address the problems described previously. The support system is inherently safer than existing external rib designs because it uses a mechanical interlock that prevents the ribs from separating from the platform if the adhesive between the platform and ribs fails. A critical feature of the mechanical interlock is that part of the rib is inside of the platform and part of the rib is outside of the platform, thus locking the rib into the platform.

Figure 10:
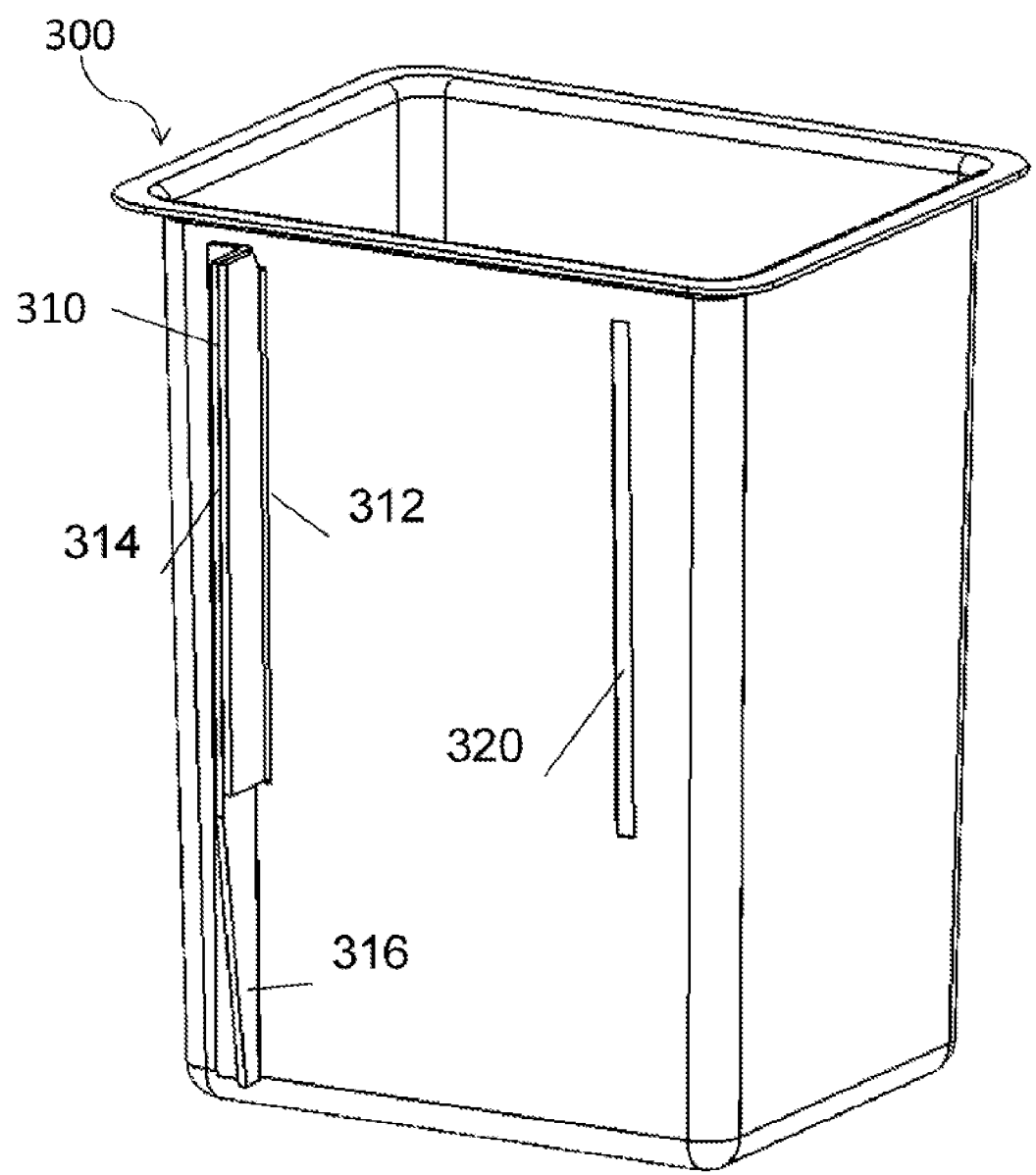
FIG. 10 shows a platform with a reinforcing rib according to the present invention.
Figure 11A:
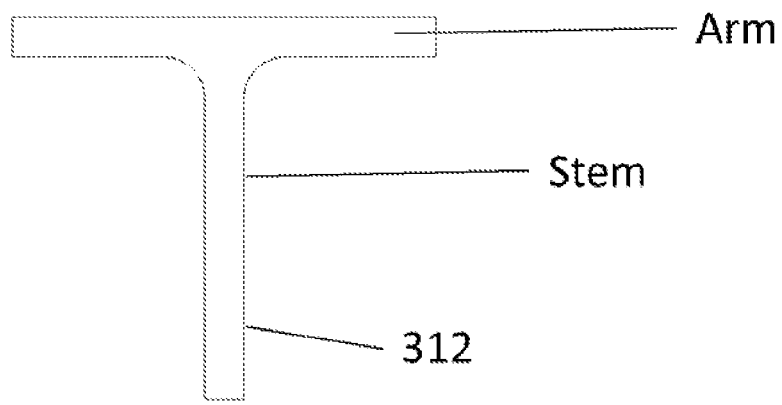
FIG. 11A shows a cross-sectional view of a T-shaped reinforcing rib design according to the present invention.
Figure 11B:
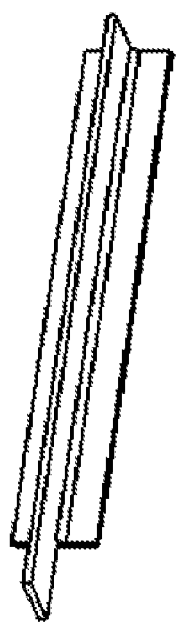
FIGS. 11B-D show various perspective views of the reinforcing rib of FIG. 11A.
Figure 11C:
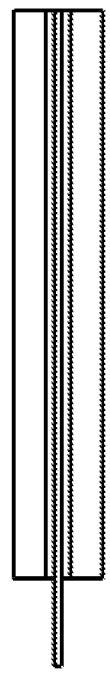
Figure 11D:
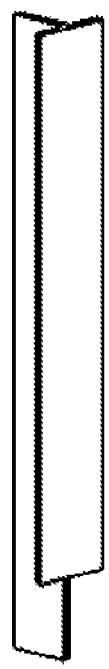

The platform support system, generally described as 300 in FIG. 10, includes reinforcement ribs 310 that are fitted into slots 320 in the platform basket sidewall 215. In a preferred embodiment, the ribs are T-shaped 312 (FIGS. 11A-D). FIG. 11A shows a cross-sectional view of a T-shaped rib according to the present invention.

The example embodiment shown in FIGS. 11A-D was constructed as follows: A 8"×4"×⅜" Series 500 I-beam manufactured by Strongwell (Bristol, Virginia, USA) was cut in half so two "T" shapes existed. The portion of the rib on the interior of the platform was approximately 26" long. The rib was cut so about 4" near the bottom of the rib would "hook" onto the outside of the platform. Two 0.75" wide slots about 26" long were cut in the platform sidewall and the T-shapes were bonded to the inside of the platform. The rib portion on the exterior of the platform was approximately 30" long.

Figure 12A:
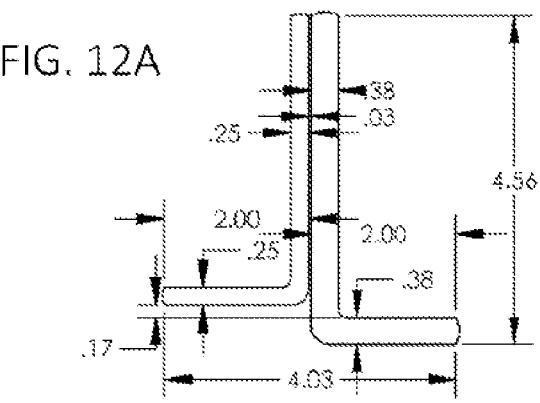
FIGS. 12A-D shows cross-sectional diagrams of another reinforcing rib design according to the present invention.
Figure 12B:
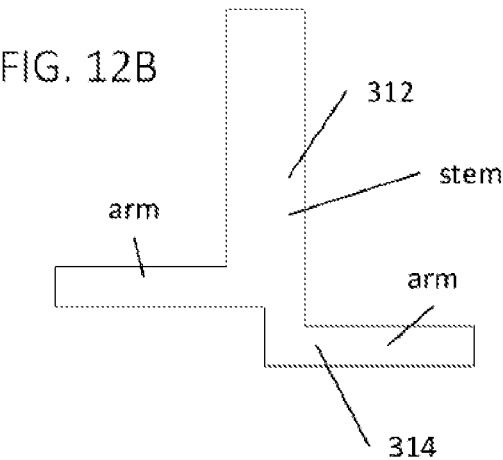
Figure 12C:
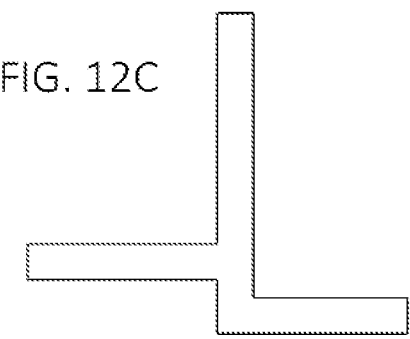
Figure 12D:
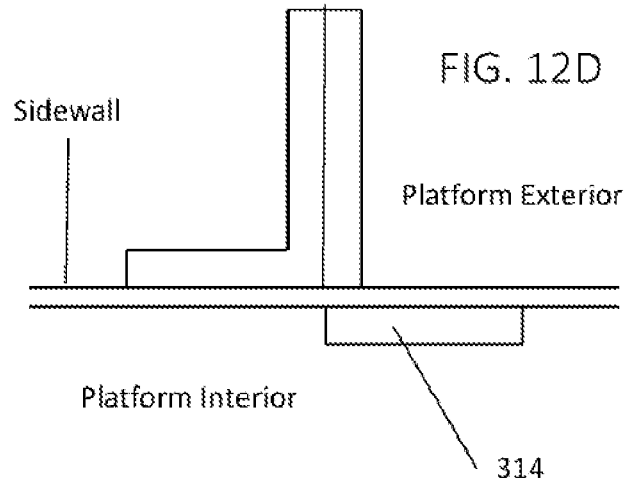
Figure 13A:
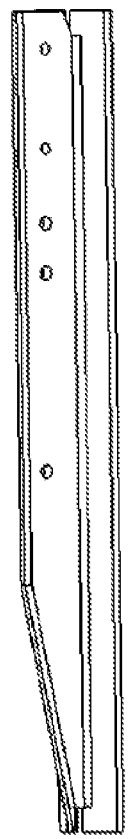
FIG. 13A shows a front side perspective view of the reinforcing rib of FIGS. 12A-D.
Figure 13B:
FIG. 13B shows a rear side perspective view of the reinforcing rib of FIG. 12A-D.

In another preferred embodiment, the ribs are an off-set double-L configuration 314, shown in cross-sectional view in FIGS. 12A-D. This latter configuration is formed by bonding two L-shaped ribs 314 (FIG. 12A, units in inches), or by pultrusion or a similar method (FIGS. 12B and C), whereby the thickness of each of the rib sections is varied to give a lighter rib with adequate strength. FIG. 12D shows a double-L rib installed in a platform. Perspective views of the ribs of FIG. 12A-D are shown in FIGS. 13A and B.

Figures 14A, 14B:
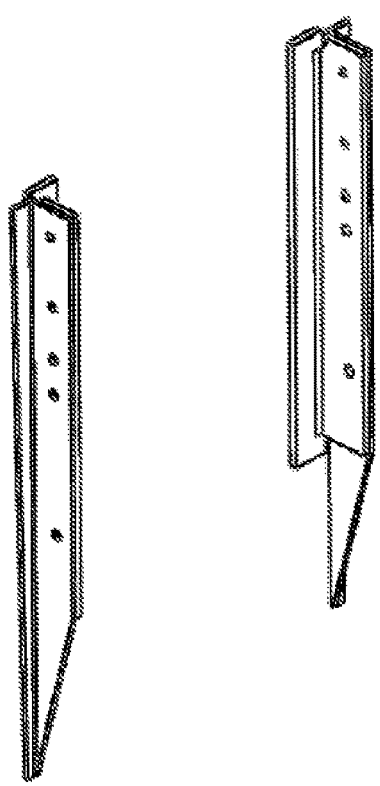
FIGS. 14A-C show another double-L design rib according to the present invention.
Figure 14C:
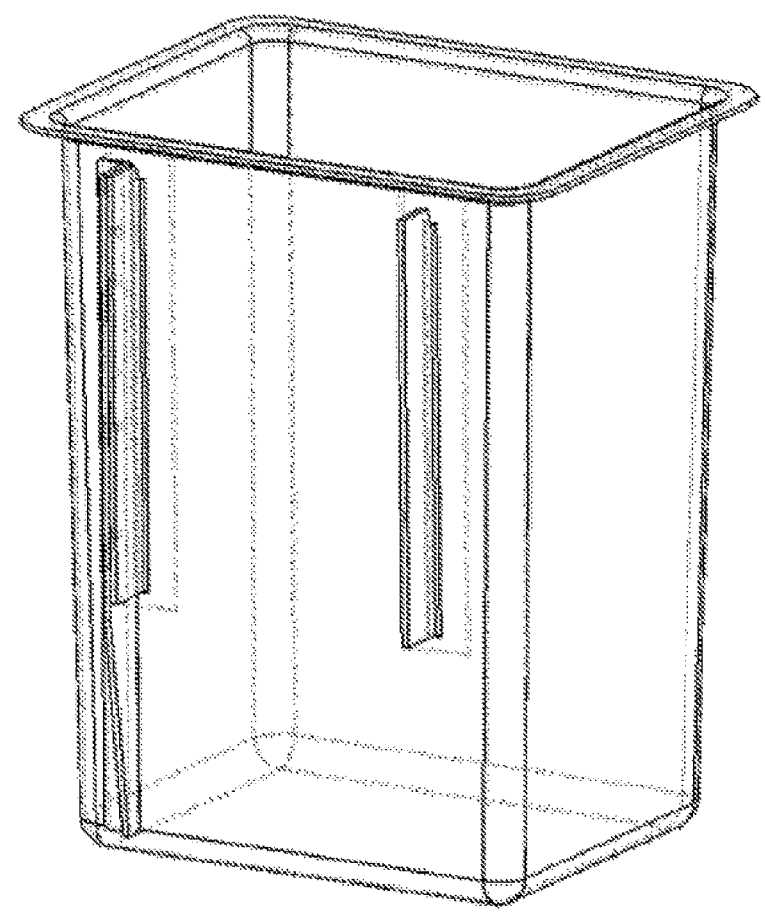

FIGS. 14A-C show another double-L design rib according to the present invention. FIGS. 14A and B show perspective views of the rib only. FIG. 14C shows the rib in a transparent platform; the rib on the right is partially installed and the rib on the left is fully installed. The exterior "L" shape preferably extends between about 1 and about 13 inches beyond the bottom of the slot to provide extra support.

Figure 15:
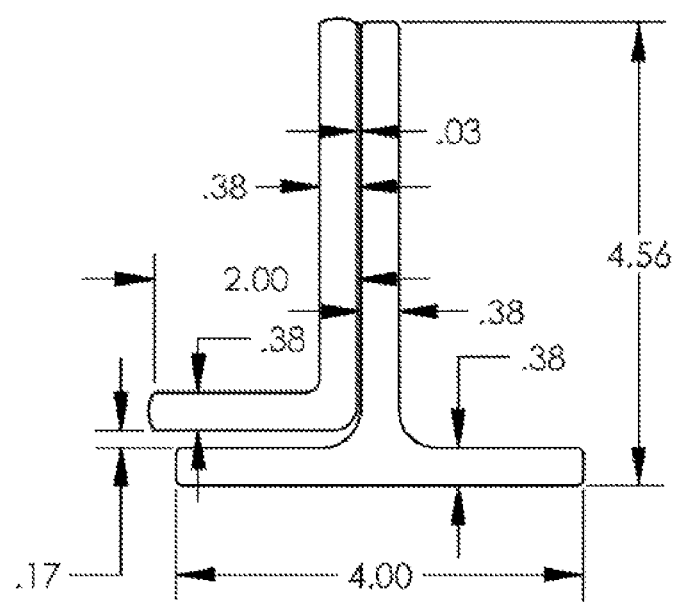
FIG. 15 shows a cross-sectional view of yet another reinforcing rib design according to the present invention.
Figure 16:
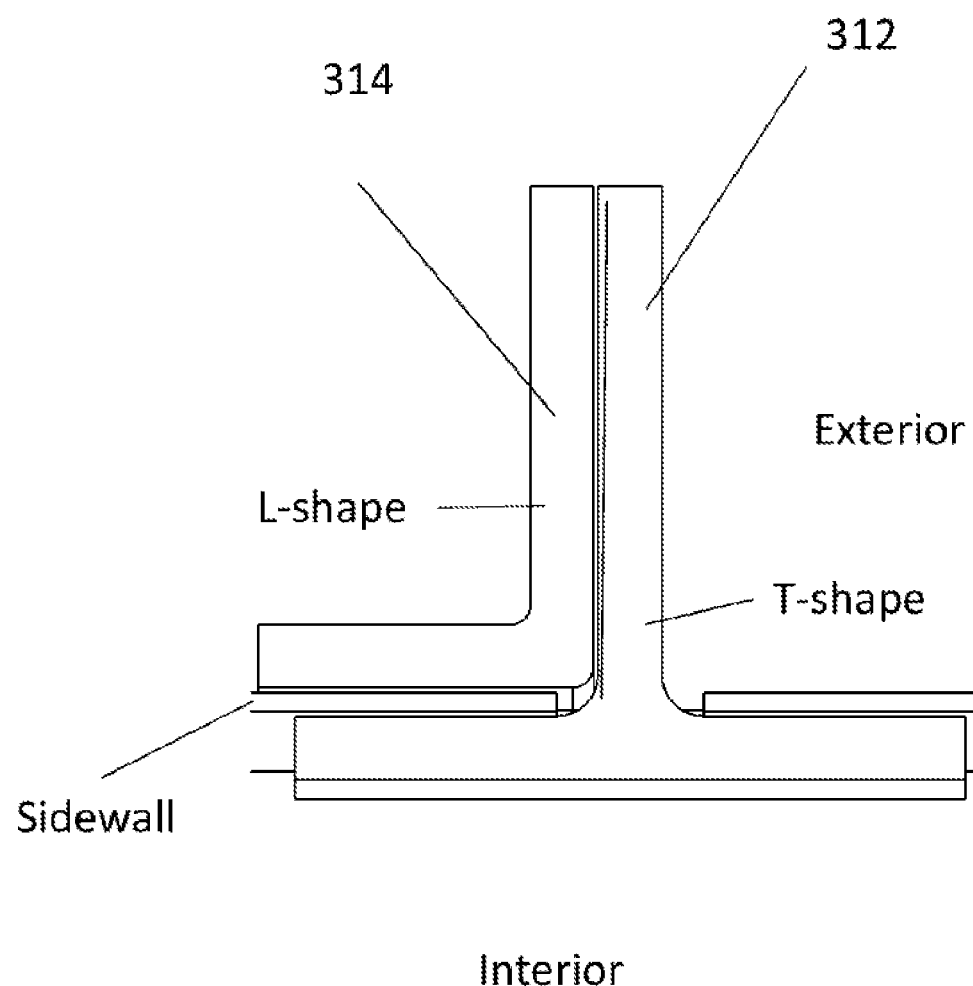
FIG. 16 shows a cross-sectional view of the reinforcing rib design of FIG. 15 installed in a platform sidewall.

In a preferred embodiment (FIGS. 15 and 16), a rib is formed from a T-shaped component 312 combined with an L-shaped component 314. T-shape and L-shape cross-sections are described as each having an arm and a stem. Herein an arm of a letter is defined as a horizontal stroke not connected on one or both ends and a stem is defined as a primary vertical stroke (see http://typedia.com/learn/only/anatomy-of-a-typeface/for a description of typeface anatomy).

The T-shaped component 312 is inserted through a slot in the platform wall from the interior of the platform, such that it is extending outward, whereupon the stem of the L-shaped component 314 is bonded to it on the exterior of the platform.

Figure 17A:
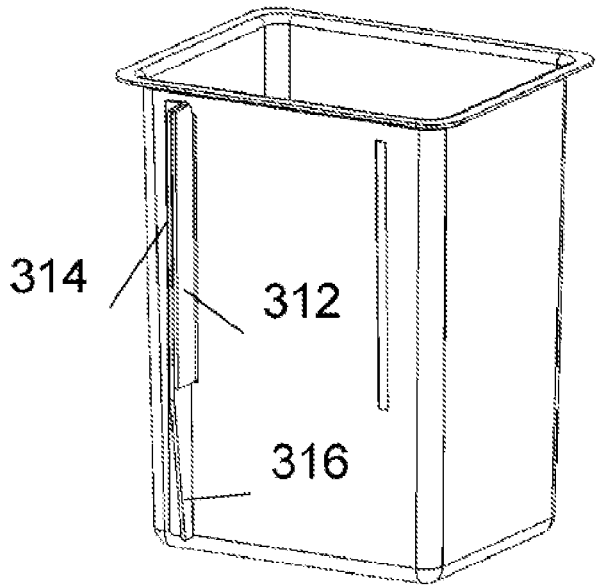
FIGS. 17A-I are various views of reinforcing ribs installed in a platform according to the present invention.
Figure 17:
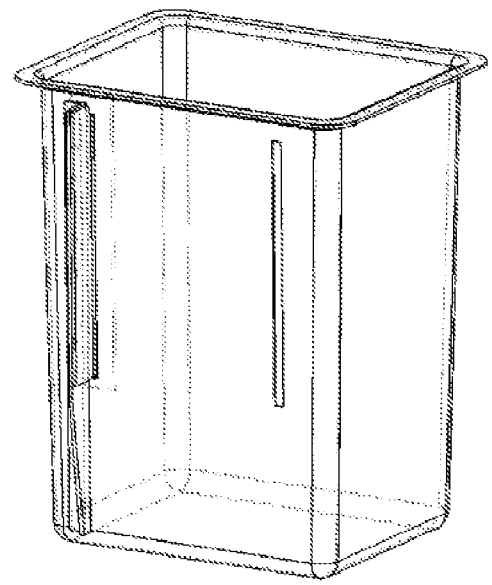
Figure 17C:
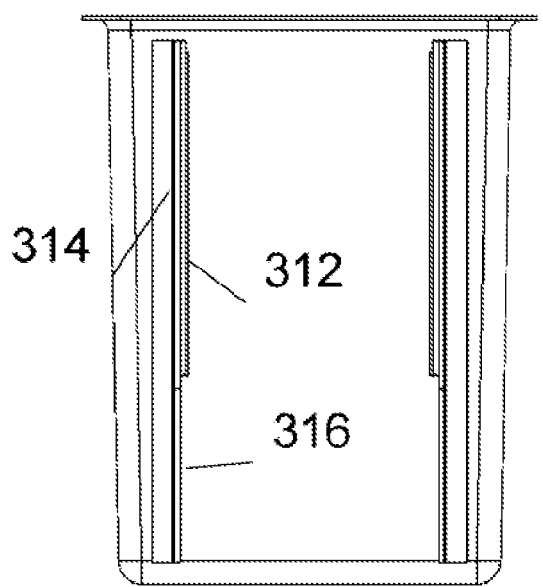
Figure 17D:
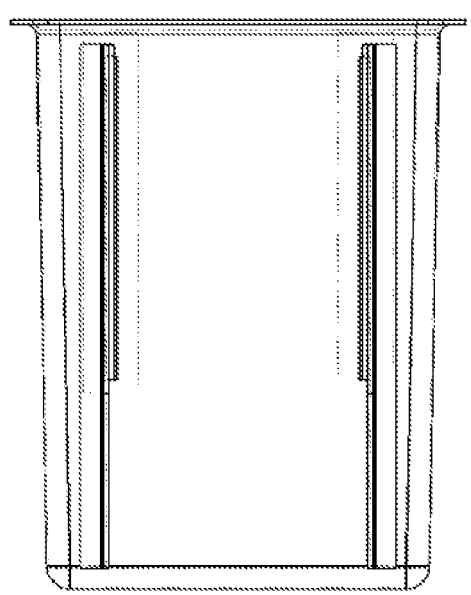
Figure 17E:
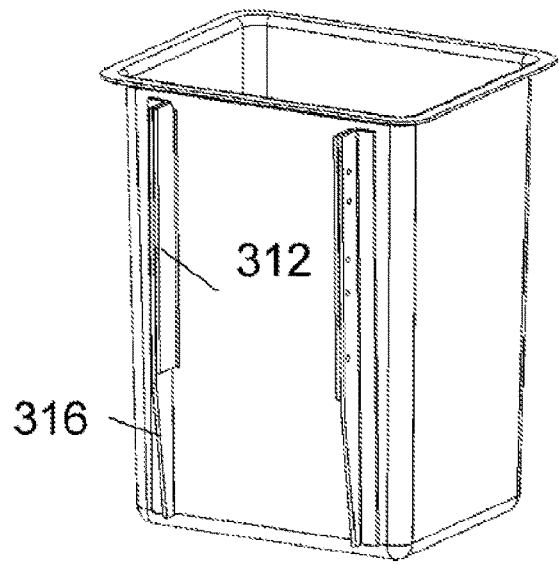
Figure 17F:
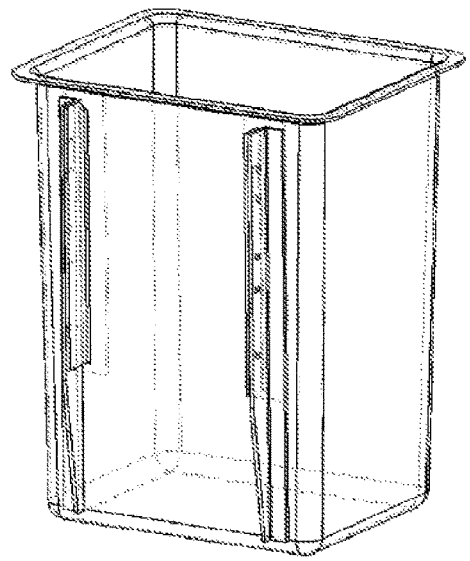
Figure 17G:
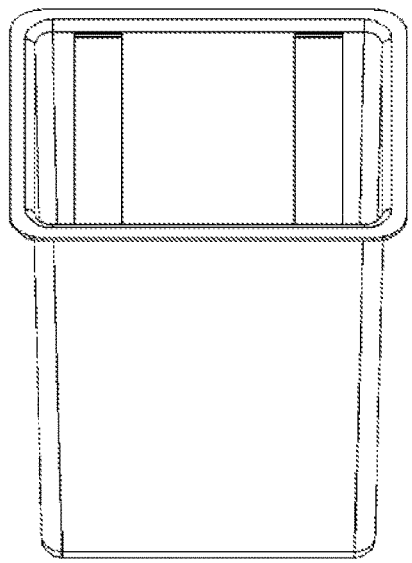
Figure 17H:
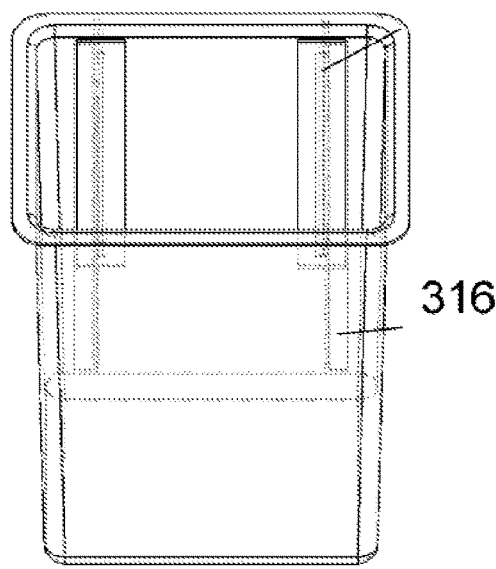
Figure 17I:
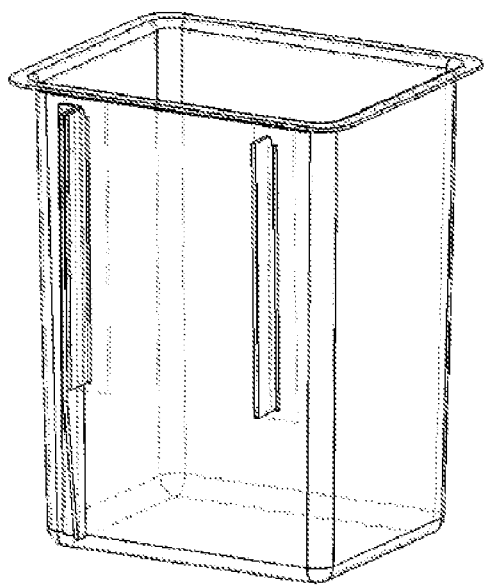

In another embodiment (FIGS. 17A-I), the L-shaped component 314 bonded on the exterior of the platform extends below the cutout in the platform wall that accepts the T-shaped component 312 from the inside of the platform. This extension 316 allows the platform to more effectively transfer compressive stress to the L-shaped component near the outside bottom of the platform. FIGS. 17A-I show various stages of construction of the embodiment. FIGS. 17A, C, E and G show views wherein the platform is solid. FIGS. 17 B, D, F, H and I show views wherein the platform is transparent.

The example embodiment shown in FIGS. 17A-I, 18A-C and 19A-C is constructed as follows:

An 8"×4"×⅜" Series 1500 SuperStructural I-beam manufactured by Creative Pultrusions (Alum Bank, Pennsylvania, USA) is cut in half so two "T" shapes existed. Two 0.88" wide slots are cut in the platform sidewall and the T shapes are bonded to the inside of the platform with a portion of the "T" protruding through the slots in the platform wall. The T-shaped component is 28" long and the portion that protrudes through the platform wall is 26.25" long. This design allows the top and bottom of the "T" to completely cover the slot cut in the platform wall to ensure a seal of the cutout. A 3"×3"×0.375" Series 1500 SuperStructural equal leg angle manufactured by Creative Pultrusions (Alum Bank, Pennsylvania, USA) is bonded to the exterior of the platform and to a portion of the T-shaped component that protrudes through the platform wall. The "L" shape is initially 36.5" long and is cut to taper near the bottom of the platform. The "L" shape preferably extends between about 1 and about 13 inches beyond the bottom of the slot. The "L" is further trimmed so that the portion in contact with the platform is only 2" wide instead of 3" wide as it is manufactured. In one embodiment, the portion of the "L" that contacts the platform is trimmed even further when required, such as when the rib is close to the side of the platform and there isn't enough area to bond a 2" wide portion. The reduced width provides adequate strength while reducing weight and the amount of adhesive required for bonding it to the platform wall. Additionally, a notch 317 is cut into the top of the stem of the T at the top of the T-shaped rib component for the following reasons:

Whenever material is removed from a component, for example by cutting a slot in it, the physical strength of that component is decreased by some amount. In an effort to minimize the strength reduction caused by the slots in the platform wall there was a desire to maintain as large of a distance as possible between the top of the slot and the platform flange.

It is desirable for the top of the "T" inside of the platform to completely cover the slot cut in the platform wall. In order to achieve this, the portion of the "T" inside of the platform must extend up past the slot cut in the platform wall. It is important that the upper portion of the "T" inside of the platform, that covers the top of the slot, doesn't extend up past the beginning of the radius where the platform wall transitions to the platform flange. This is important to minimize the interference of the portion of the rib inside of the platform with a platform liner that is inserted into the platform. Some platforms have mounting holes drilled in their ribs near the top of the rib only a few inches below the platform flange. Therefore, it is necessary for the top of the "T" rib on the outside of the platform to be no more than approximately 1.5" from the bottom of the platform flange.

Figure 18A:
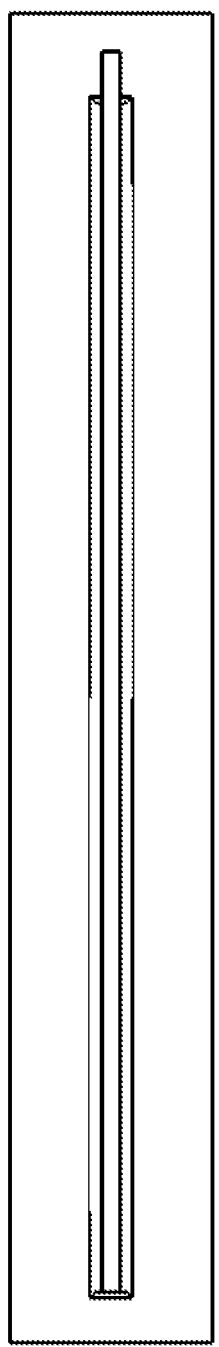
FIG. 18A is a front view of a T-shaped rib according to the present invention.
Figure 18B:
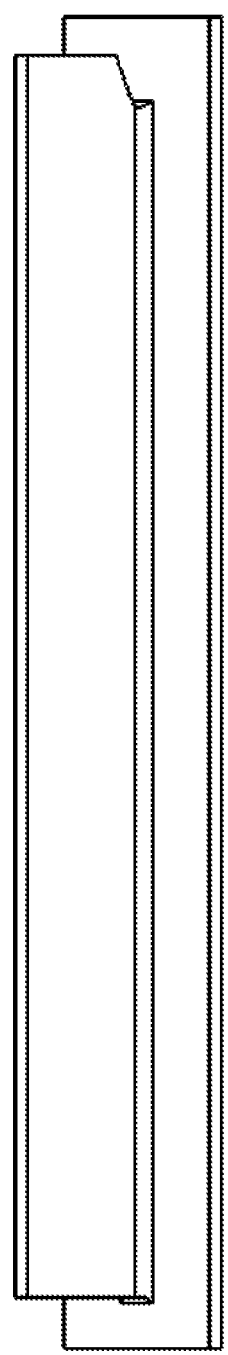
FIG. 18B is a front perspective view of the rib of FIG. 18A.
Figure 18C:
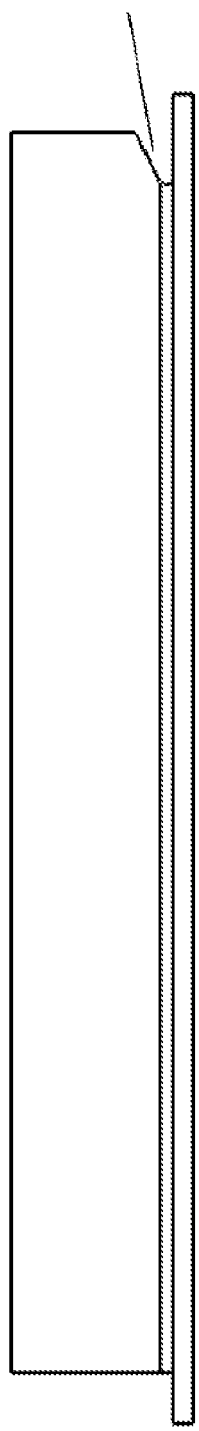
FIG. 18C is a side view of the rib of FIG. 18A.
Figure 19A:
FIG. 19A is a front view of an L-shaped rib according to the present invention.
Figure 19B:
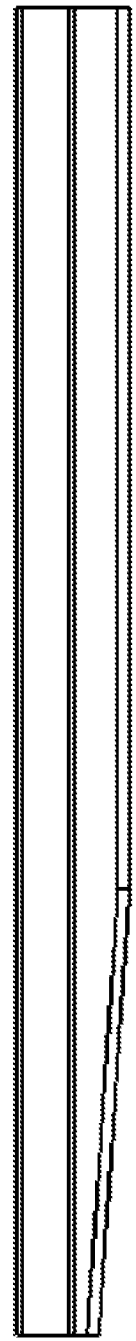
FIG. 19B is a front perspective view of the rib of FIG. 19A.
Figure 19C:
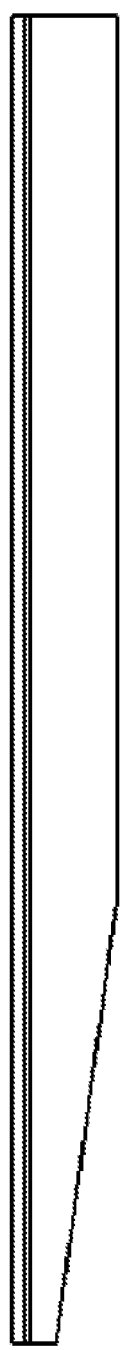
FIG. 19C is a side view of the rib of FIG. 19A.

FIGS. 18A-C show the "T" shape utilized in FIG. 17. In a preferred embodiment, the thickness of the various flat parts of the "T" shape are ⅜ inch. FIGS. 19A-C show the "L" shape utilized in FIG. 17. In a preferred embodiment, the "L" shape flat parts are ⅜ inch thick.

Figure 20A:
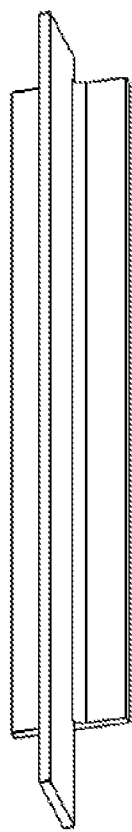
FIG. 20A is a front perspective view of another T-shaped rib according to the present invention.
Figure 20B:
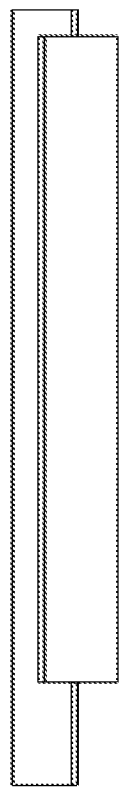
FIG. 20B is a rear perspective view of the rib of FIG. 20A.
Figure 20C:
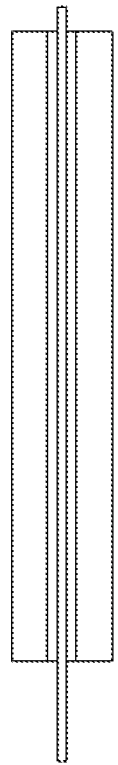
FIG. 20C is a front view of the rib of FIG. 20A.
Figure 21:
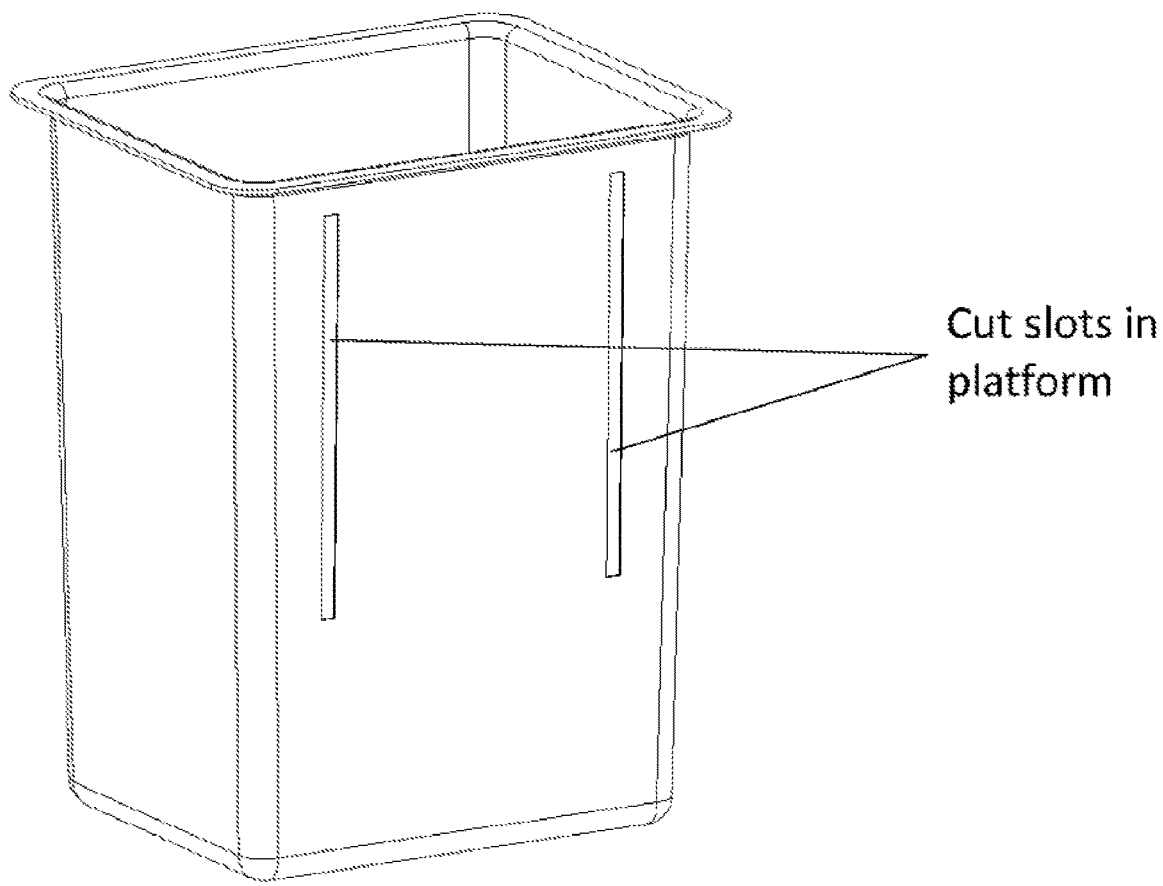
FIG. 21 is a perspective view of a platform with slots for receiving reinforcing ribs according to the present invention.

Another example embodiment, shown in FIGS. 20A-C, is similar to the previous embodiment, with the addition that the rib portion on the exterior of the platform also extends above the interior rib portion at both ends. In other words, the stem of the "T" extends beyond the arm of the "T" at both ends of the rib. In this manner the rib "hooks" onto both the top and the bottom exterior of the platform. The dimensions of the slot and rib are adjusted so that the exterior portion of the rib fits through the slot when the longer extension end is inserted through the slot and moved to its limit.

Another example embodiment has the arm extending vertically beyond the stem of the T at both ends of the rib. One benefit of this design is that the arm completely covers the slot in the platform wall.

In another embodiment, the T stem is notched at the top of the rib so that the stem extends vertically beyond the arm while the arm still covers the slot near the top of the platform.

Yet another embodiment is for a rib that has a stem that extends above the arm at the top of the rib and the arm extends below the stem at the bottom of the rib. This design allows the arm to completely cover the slot in the platform wall while reducing the tendency of the arm to separate from the platform wall near the top of the rib during loading scenarios such as "side push" which occurs when the side of a platform is accidentally pushed into a tree.

When the stem of the T-shaped portion extends vertically beyond the arm of the T at the top of the rib, this is beneficial during scenarios when a load is being applied to the bottom of the platform (like when the platform is accidentally slammed into the ground). In this scenario, the stem of the T above the arm of the T on the inside of the platform is in compressive contact with the platform wall and this prevents the arm of the T from separating from the inside wall of the platform due to a tension force (i.e., the rib being pushed into the platform near the top of the platform).

When the stem of the T-shaped portion extends vertically beyond the arm of the T at the bottom of the rib, this is beneficial during scenarios when a vertical load is being applied to the inside of the platform (like when an operator is standing in the platform.) In this scenario, the stem of the T below the arm of the T on the inside of the platform is in compressive contact with the platform wall and this prevents the arm of the T from separating from the inside wall of the platform due to a tension force (i.e., the rib being pushed into the platform near the bottom of the platform).

In general, when the stem of the T on the outside of the platform extends above or below the arm of the T on the inside of the platform, the stem is allowed to support more force than would otherwise be supported by the arm or by the adhesive. This occurs because the stem has a greater section modulus than the arm.

Figure 22:
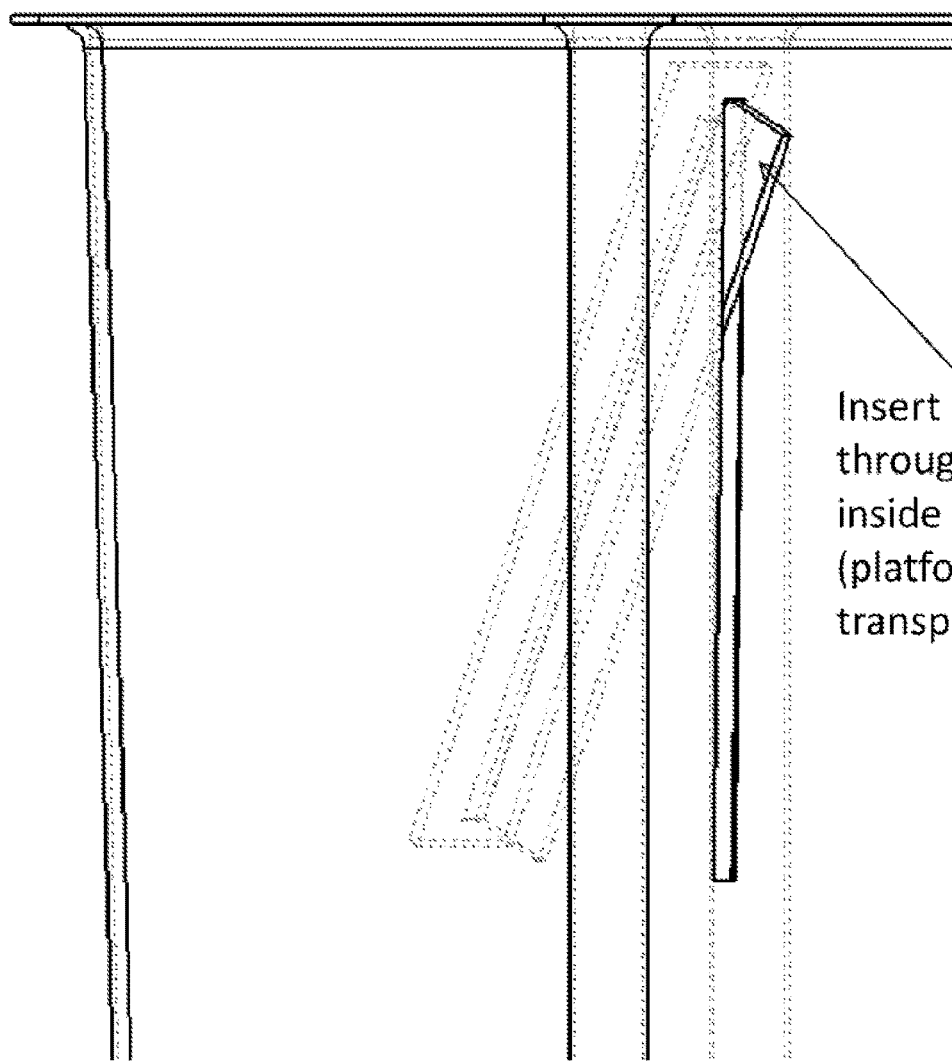
FIG. 22 is a perspective exterior view of a T-shaped rib being inserted into one of the slots of FIG. 21.
Figure 23:
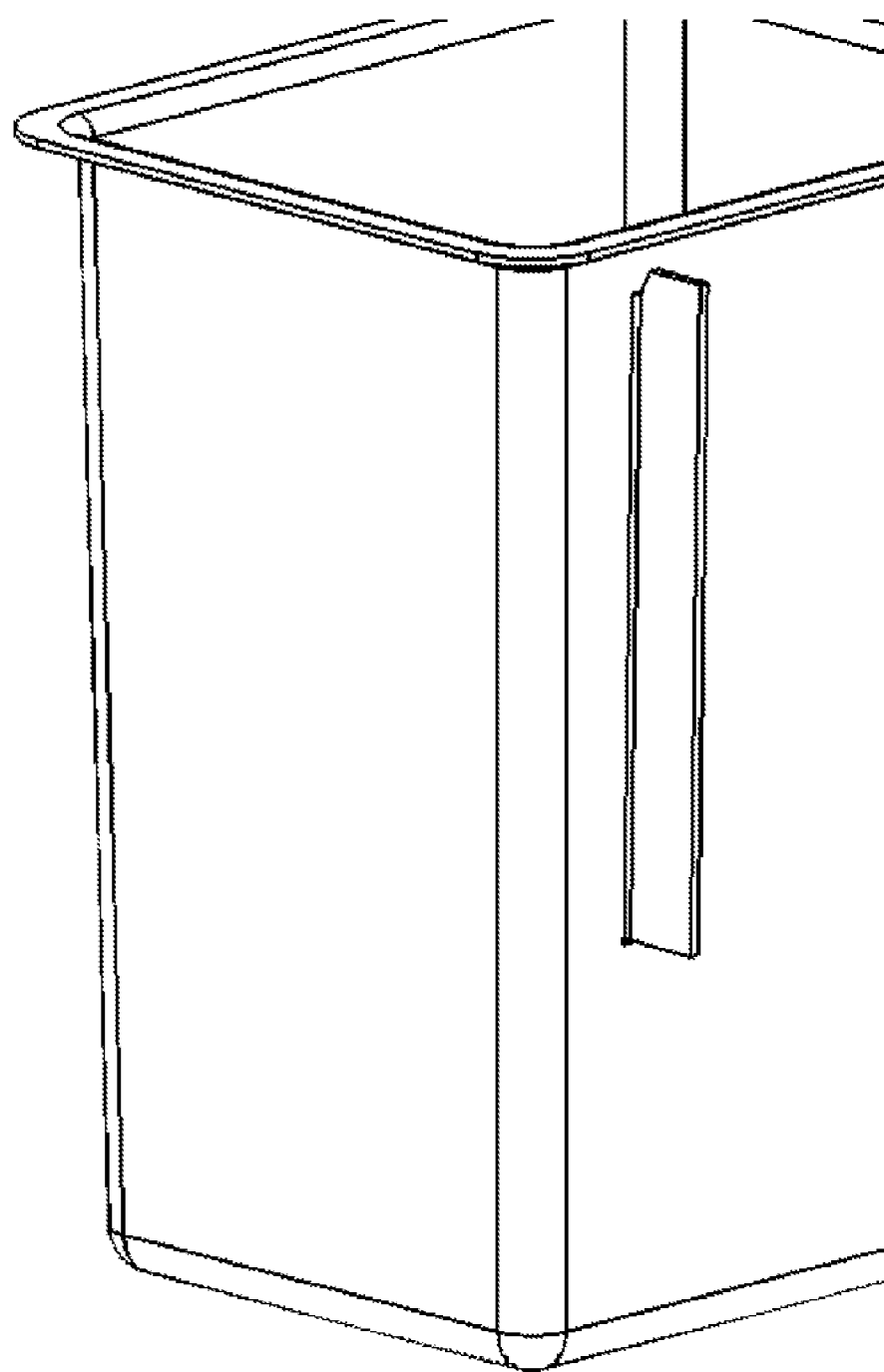
FIG. 23 is a perspective exterior view of the T-shaped rib of FIG. 22 in position in the slot.
Figure 24:
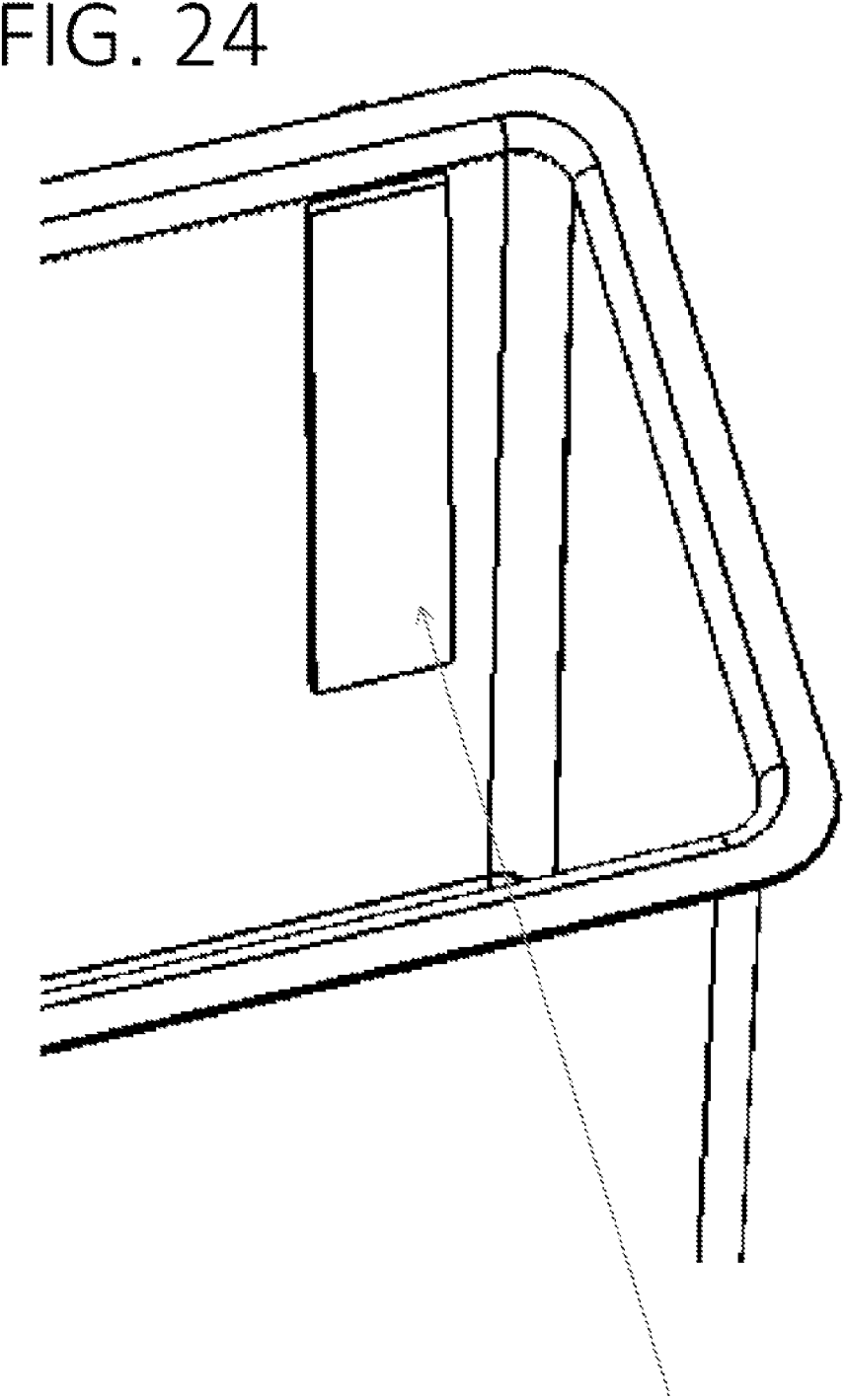
FIG. 24 is a perspective interior view of the rib of FIG. 22 in position in the slot.
Figure 25:
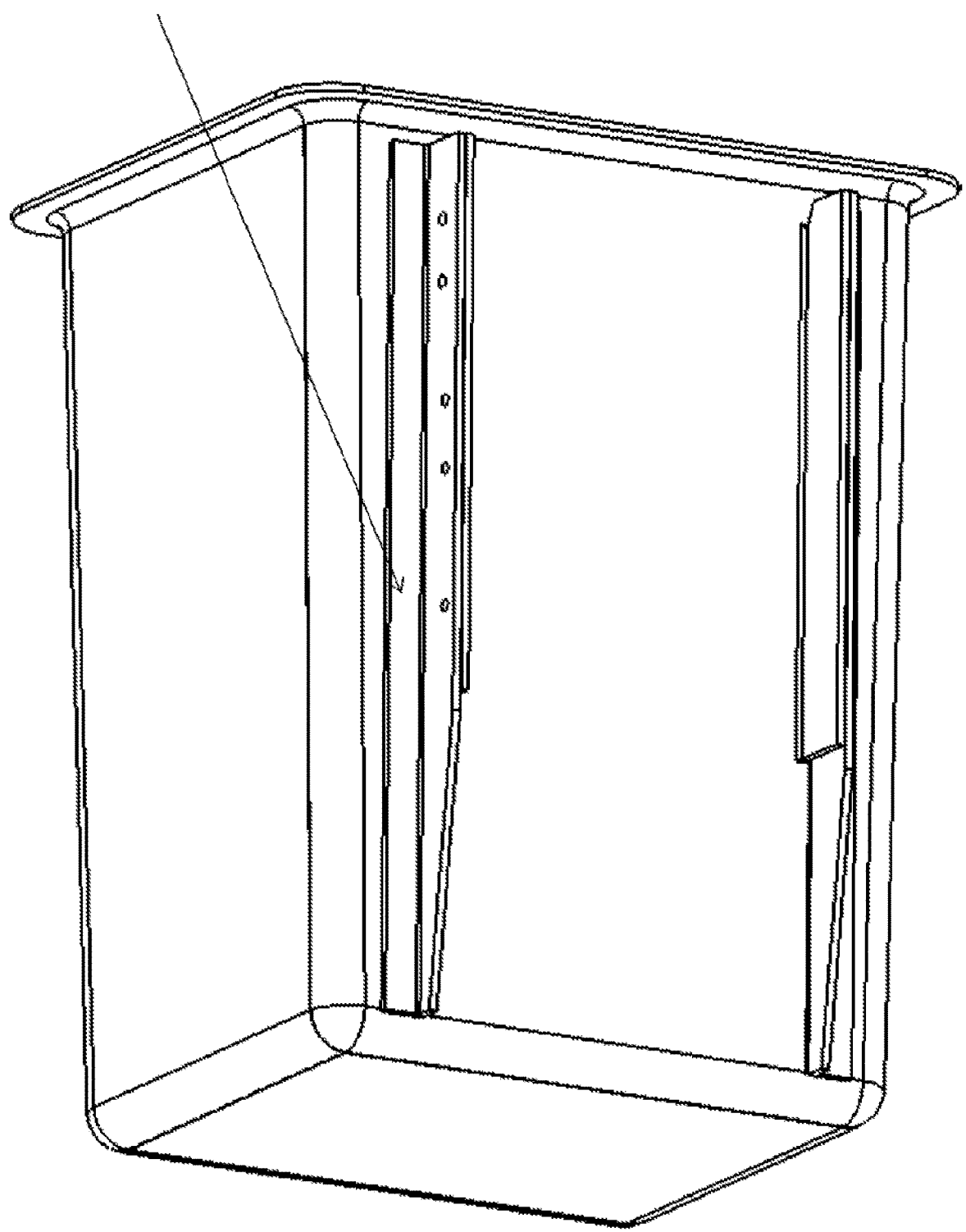
FIG. 25 is a perspective exterior view of the rib of FIG. 22 with an L-shaped rib applied.
Figure 26:
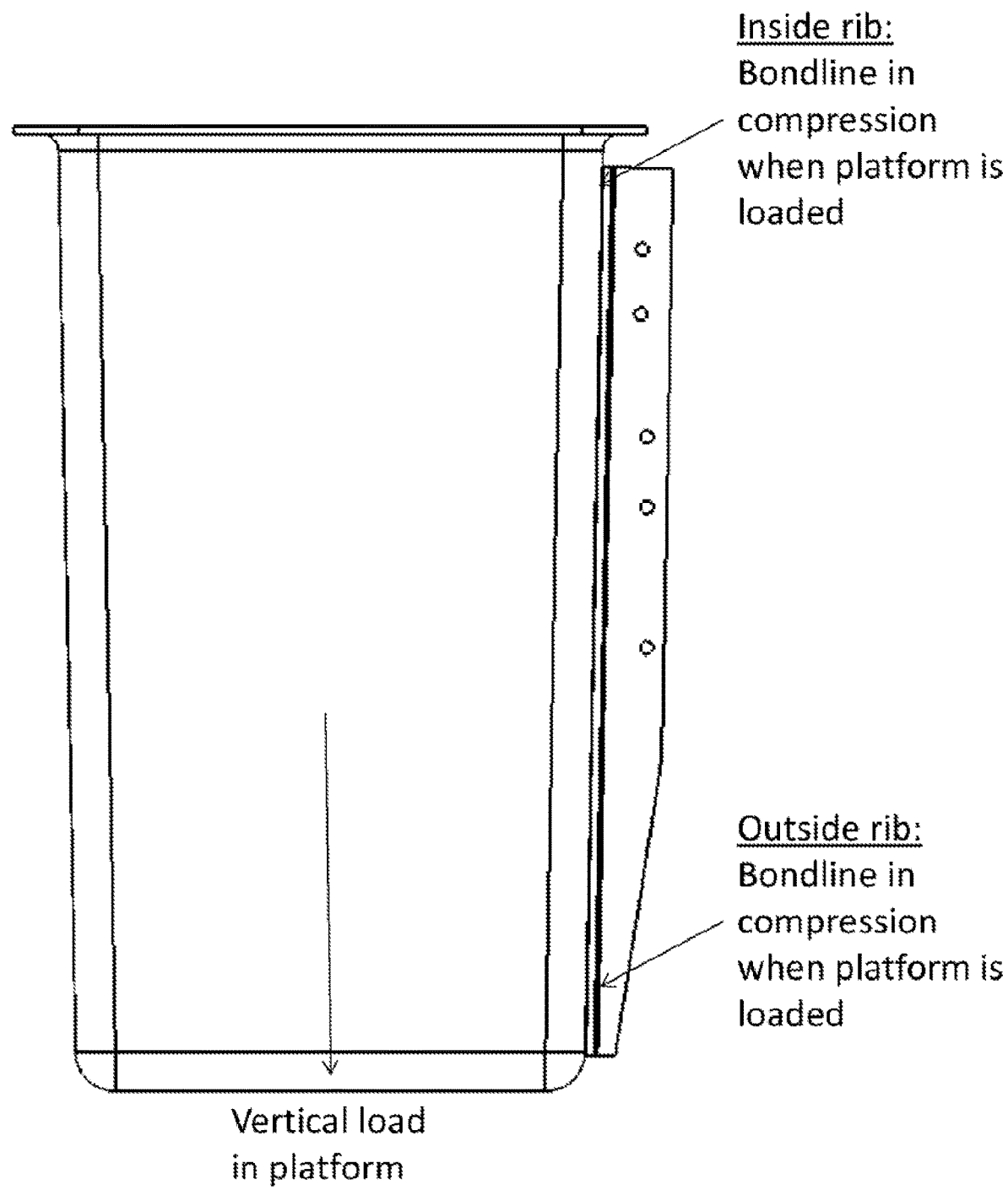
FIG. 26 is a side view of the rib of FIG. 25, with areas of compression noted.
Figures 27A, 27B, 27C:
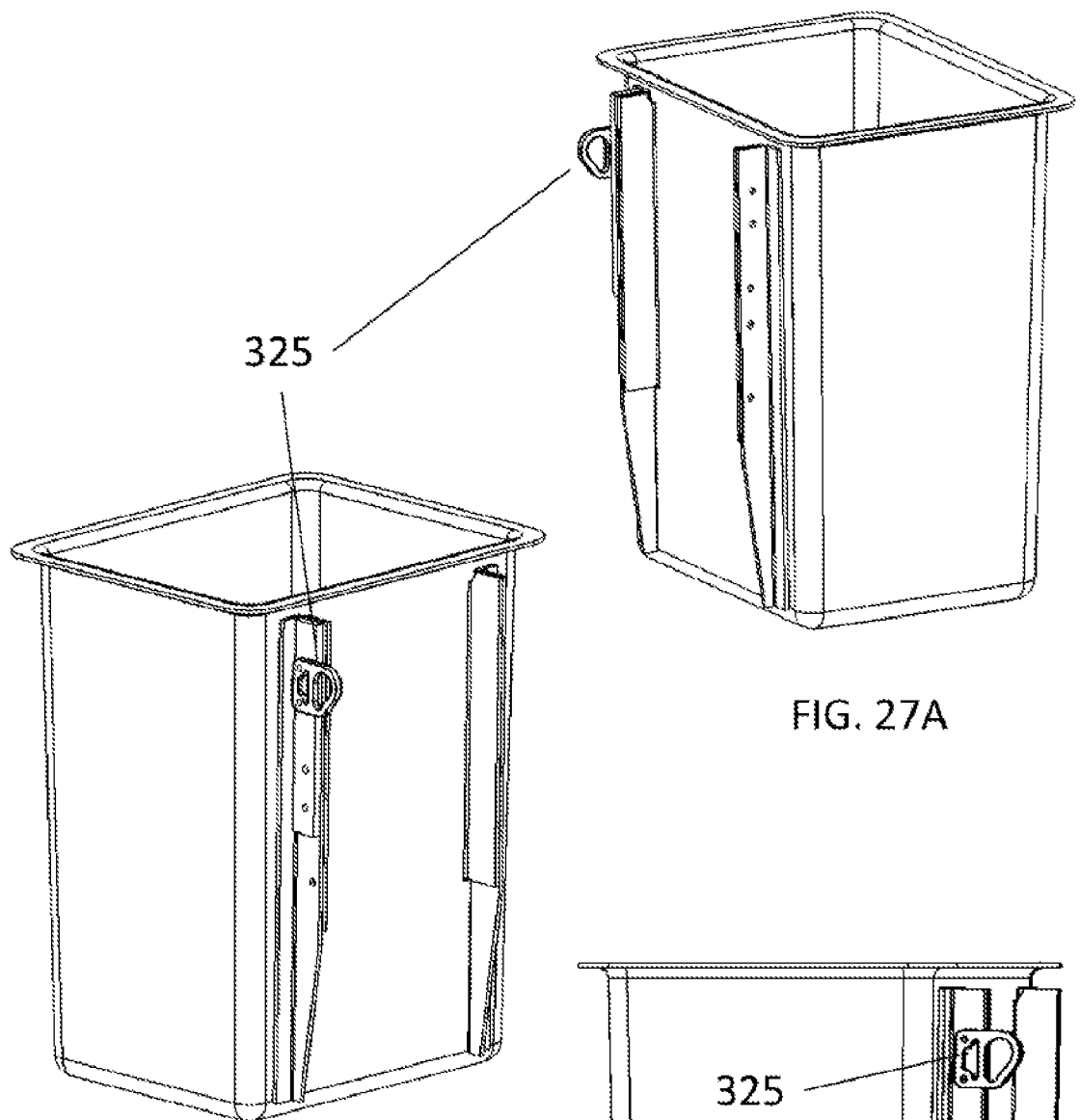
FIGS. 27A-C are perspective views of the rib of FIGS. 25-26 with a lanyard bracket attached.
Figure 28A:
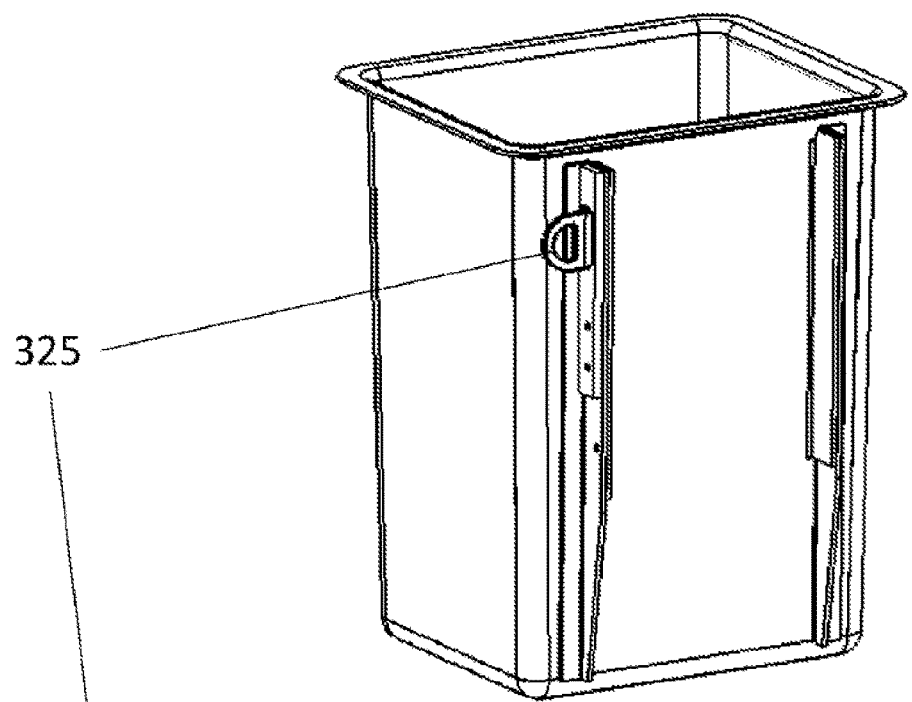
FIGS. 28A-B are perspective views of the rib of FIGS. 25-26 with another lanyard bracket attached.
Figure 28B:
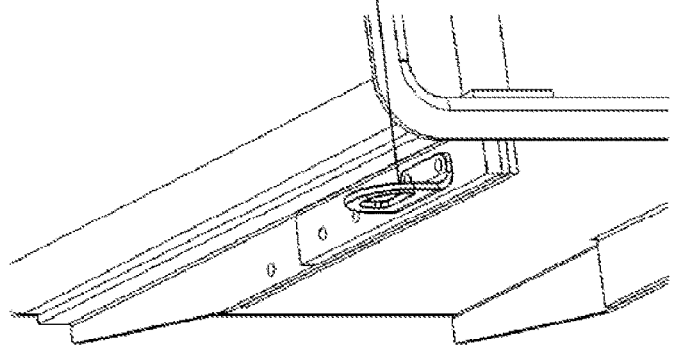

FIGS. 21-26 show the assembly steps of the embodiment of FIG. 17. Slots are cut into the platform (FIG. 21), whereupon the inner ribs are inserted through the slots (FIG. 22). The inner rib is glued to the platform (FIG. 23, exterior view; FIG. 24, interior view). The outer rib is next glued in place (FIG. 25). FIG. 26 shows the compression forces acting on the rib.

Figure 29:
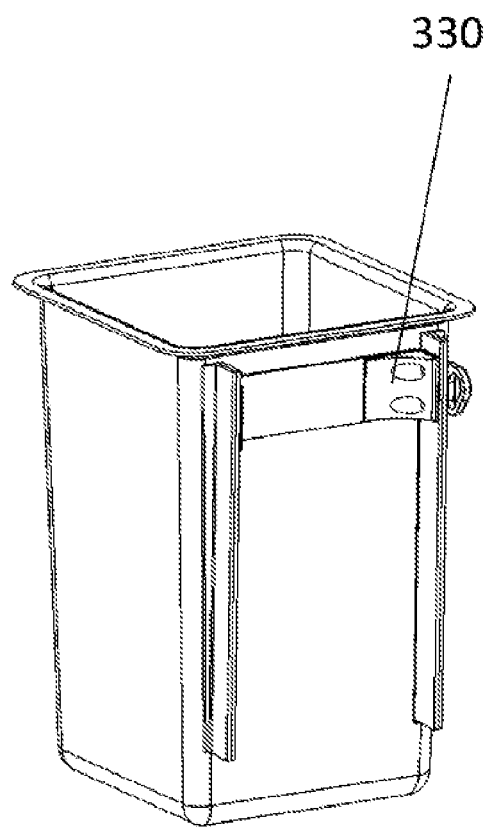
FIG. 29 shows the elevating platform of FIGS. 28A-B with a lanyard bracket support.
Figure 30B:
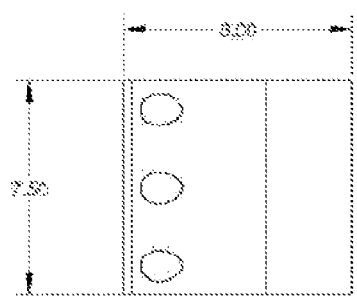
FIGS. 30A-E show different views of the lanyard bracket support of FIG. 29.
Figure 30A:
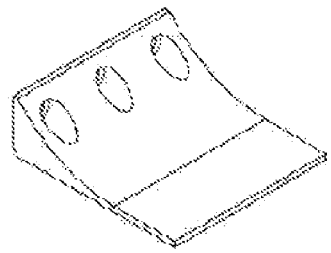
Figures 30C, 30D:
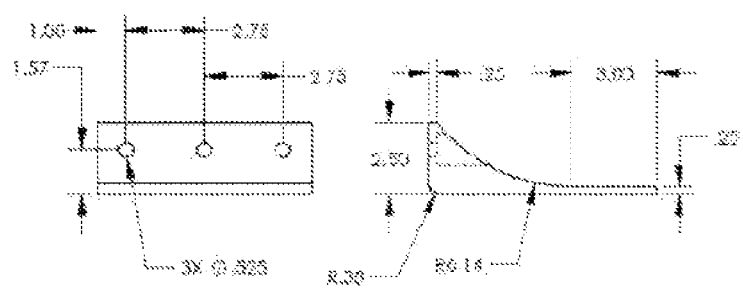
Figure 30E:
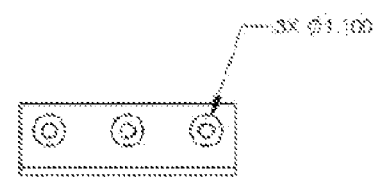

In another embodiment, a lanyard anchor bracket reinforcement section 325 is attached to rib (FIGS. 27A-C and FIGS. 28A-B). In one embodiment, the lanyard anchor bracket reinforcement section 325 is constructed out of an unreinforced thermoplastic. In exemplary embodiments, the lanyard anchor bracket reinforcement section is constructed of nylon and/or urethane. However, other materials including reinforced thermoplastics and thermoset are also used for the lanyard bracket. The lanyard anchor bracket reinforcement section ensures connection between the platform mounting bracket and the lanyard anchor bracket even if the platform rib breaks between these two structures. FIG. 29 shows the embodiment of FIG. 27 further including a brace 330 to reinforce the lanyard anchor bracket. FIGS. 30A-E show various views of the brace.

Figure 31:
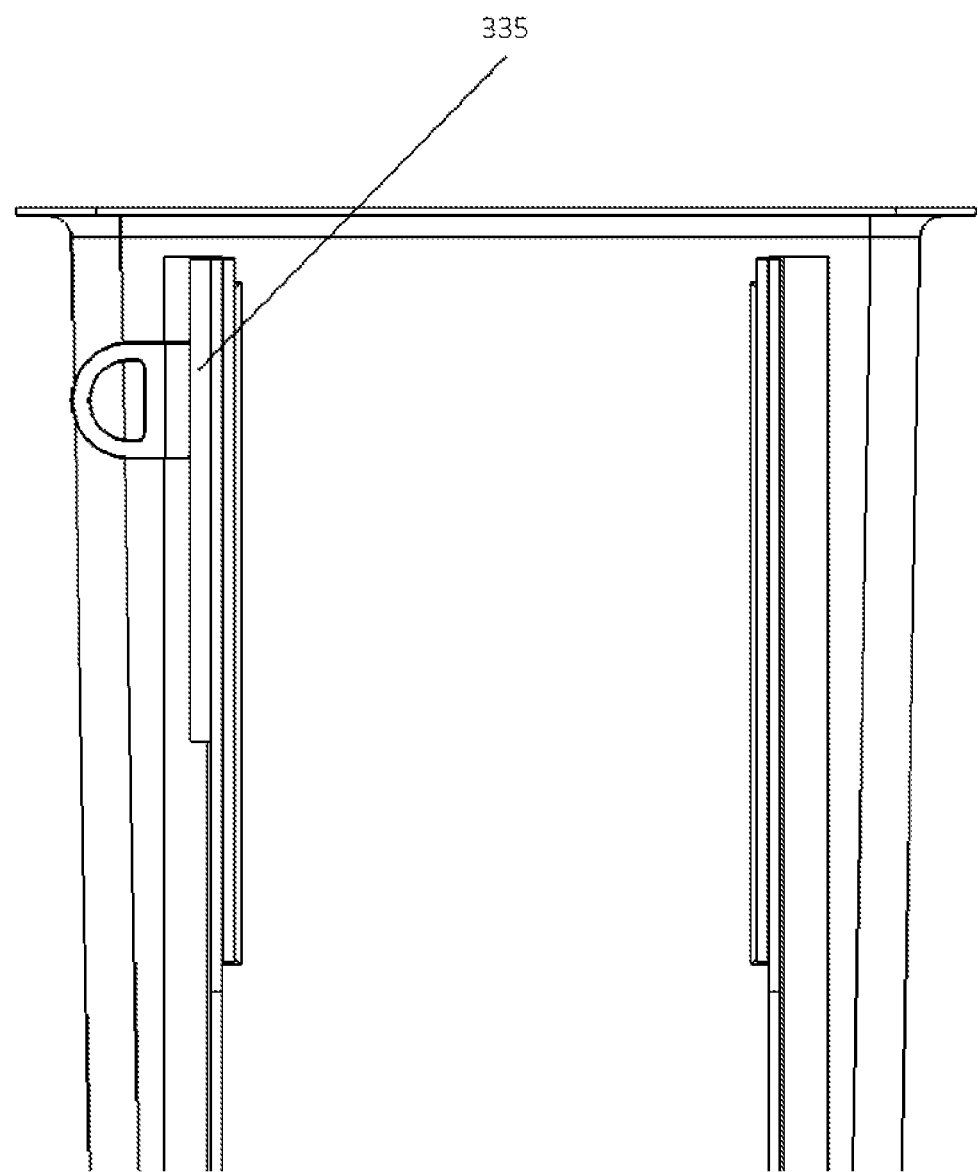
FIG. 31 shows a 0.75" thick urethane bar affixed as a lanyard bracket support.

FIG. 31 shows a 0.75" thick urethane bar 335 affixed as a lanyard bracket support.

In yet another embodiment, the present invention is directed a T-and-L-shaped rib including a T-shaped portion that has a T-shaped cross-section with an arm and a stem and an L-shaped portion that has an L-shaped cross-section with an arm and a stem; the arm of the T-shaped portion is positioned inside the elevating platform and contacts an inner surface of the sidewall of the platform; the arm of the L-shaped portion is positioned outside the elevating platform and contacts an outer surface of the sidewall; the stem of the T-shaped portion extends through the sidewall slot and the stem of the L-shaped portion is external to the sidewall and extends beyond the top and bottom of the sidewall slot; and the stems of the T-shaped and L-shape portions are adhered to each other. In one embodiment, this rib further including a notch in the top of the rib in the stem of the T-shape portion at the conjunction of the stem and the arm; the notch configured such that the arm and the stem of the T-shape slide over the sidewall via the notch. Preferably, the arm of the T-shaped portion extends vertically beyond the sidewall slot at both ends when installed in the elevating platform and the L-shaped portion extends between about 1 and about 13 inches beyond the bottom of the slot. The rib is preferably formed of fiber-reinforced thermosets, unreinforced thermosets, fiber-reinforced thermoplastics, and/or unreinforced thermoplastics.

Another rib according to the present invention is a double-L-shaped rib including a first L-shaped portion and a second L-shaped portion, both portions having an L-shaped cross-section with an arm and a stem; the arm of the first L-shaped portion contacts an outer surface of the sidewall of the platform and the arm of the second L-shaped portion contacts an inner surface of the sidewall; the arm of the second L-shaped portion extends vertically beyond the sidewall slot at both ends; the stem of the second L-shaped portion extends through the sidewall slot and the stem of the second portion is external to the sidewall; and the stems of the portions are adhered to each other or the rib is pultruded. In one embodiment, the arm of the second L-shaped portion extends vertically beyond the sidewall slot at both ends when installed in the elevating platform. The rib preferably includes a notch in the top of the rib in the stem of the second L-shaped portion at the conjunction of the stem and the arm; the notch is configured such that the second L-shape portion slides over the sidewall via the notch. In another embodiment, the stem of the second L-shape portion at the top of the rib extends above the sidewall slot. The first L-shaped portion extends between about 1 and about 13 inches beyond the bottom of the slot. The rib is preferably formed of fiber-reinforced thermosets, unreinforced thermosets, fiber-reinforced thermoplastics, and/or unreinforced thermoplastics.

Mount System

Figure 32A:
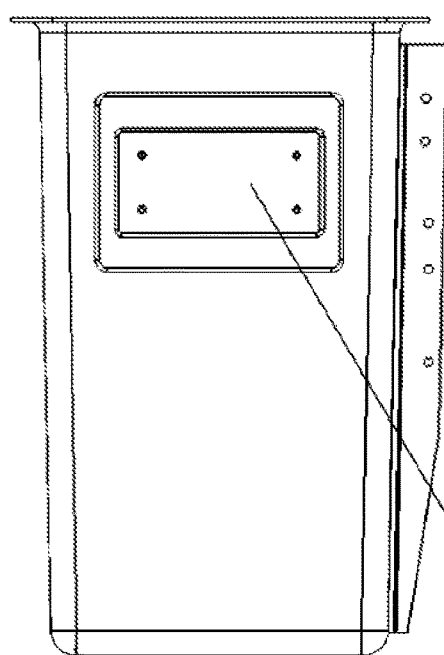
FIG. 32A-C show different views of a PRIOR ART mounting plate.
Figure 32B:
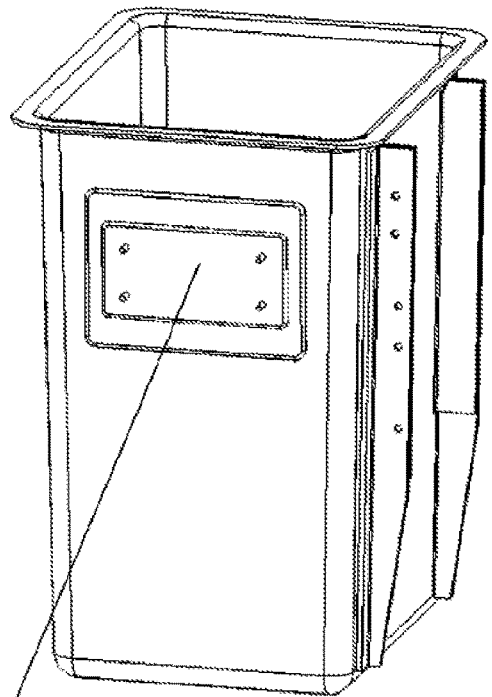
Figure 32C:
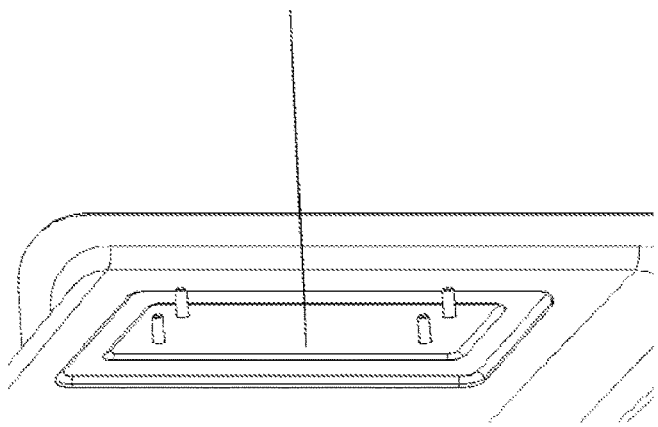

The present invention further provides for a mounting plate, system and method. Current mounting plates (FIG. 32) consist of flat fiberglass plates that have metal reinforcement encapsulated inside of the fiberglass with studs protruding from the fiberglass plate. These mounting plates are typically bonded to the exterior of platforms. When a load is applied to the mounting plate the adhesive at the top is in tension and the adhesive at the bottom is in compression. There is a greater potential for a traditional mounting plate to separate from a platform near the top of the plate where the adhesive is in tension. Other reasons why relying on adhesive as a primary joining mechanism is not preferred pertain to quality risks such as improper adhesive application, improper adhesive mixing, and improper adhesive mix ratios.

The present invention is directed to a system and method to mount components to a platform wall utilizing a joining mechanism that relies on the structural strength of the platform and the component instead of adhesive or other fasteners. The attachment method is applicable to any component that needs to be attached to a platform. An example embodiment is a valve mounting plate. The purpose of a valve mounting plate is to provide a mounting location on a platform wall for a controller assembly. The controller assembly is used by the operator to direct the movement of the platform while the operator is inside of the platform.

A common feature among the mounting systems of the present invention is that some portion of the mounting system is located inside and another portion is located outside of the platform via an opening in the platform wall. This is the design feature that allows the mounting system to be mechanically locked into a platform wall without adhesive.

Another benefit of the new mounting systems are their reduced size and weight. The reduced size also allows less adhesive to be used due to the reduced bonding surface area that is now allowed due to the redirection of stress into the platform wall and mounting plate.

Thus the present invention relies on the structural strength of the platform wall and the mounting plate to hold the two together. Adhesive is not the primary joining mechanism in this invention.

Figure 33:
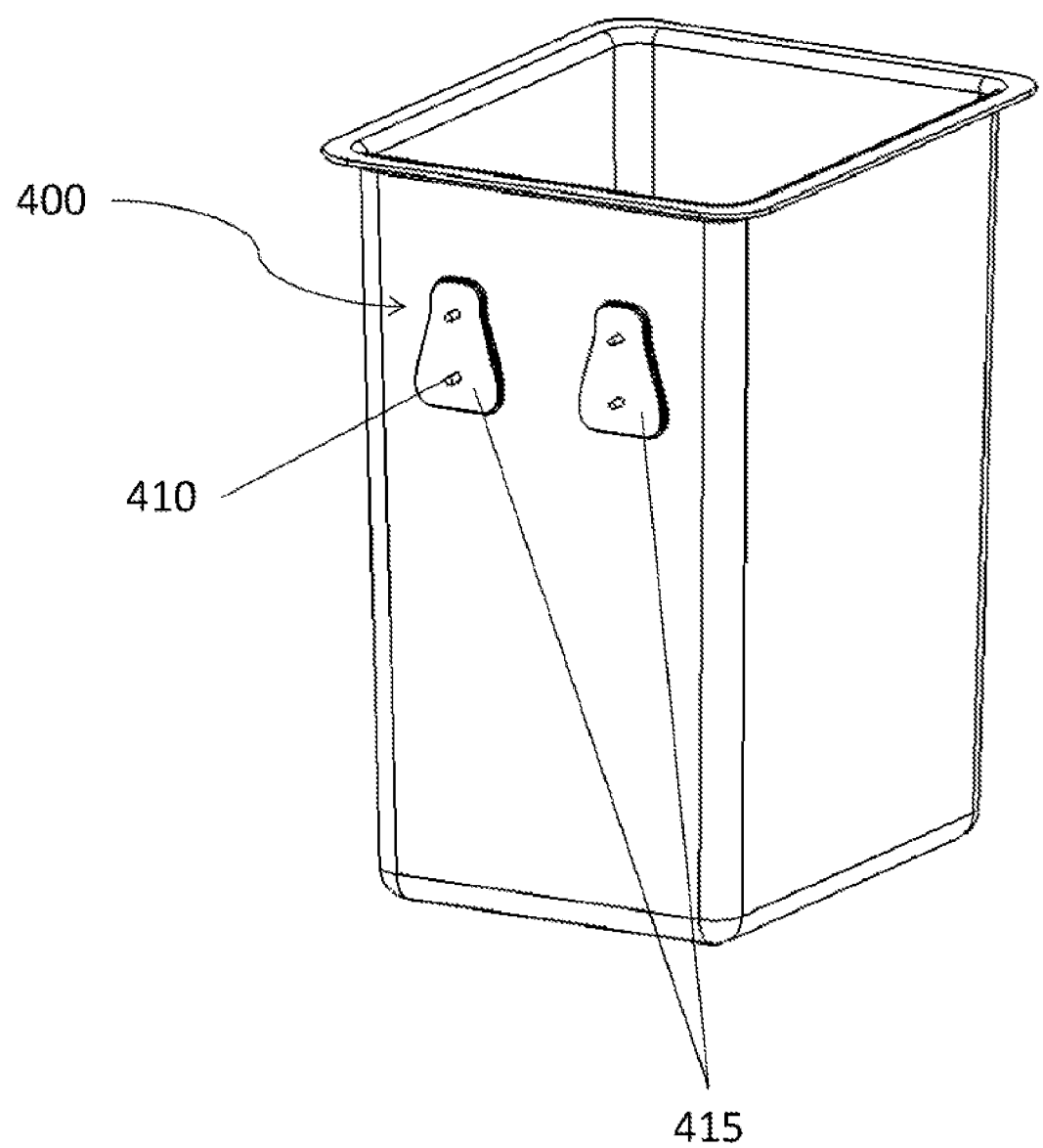
FIG. 33 is an exterior view of a mounting plate according to the present invention.
Figure 34:
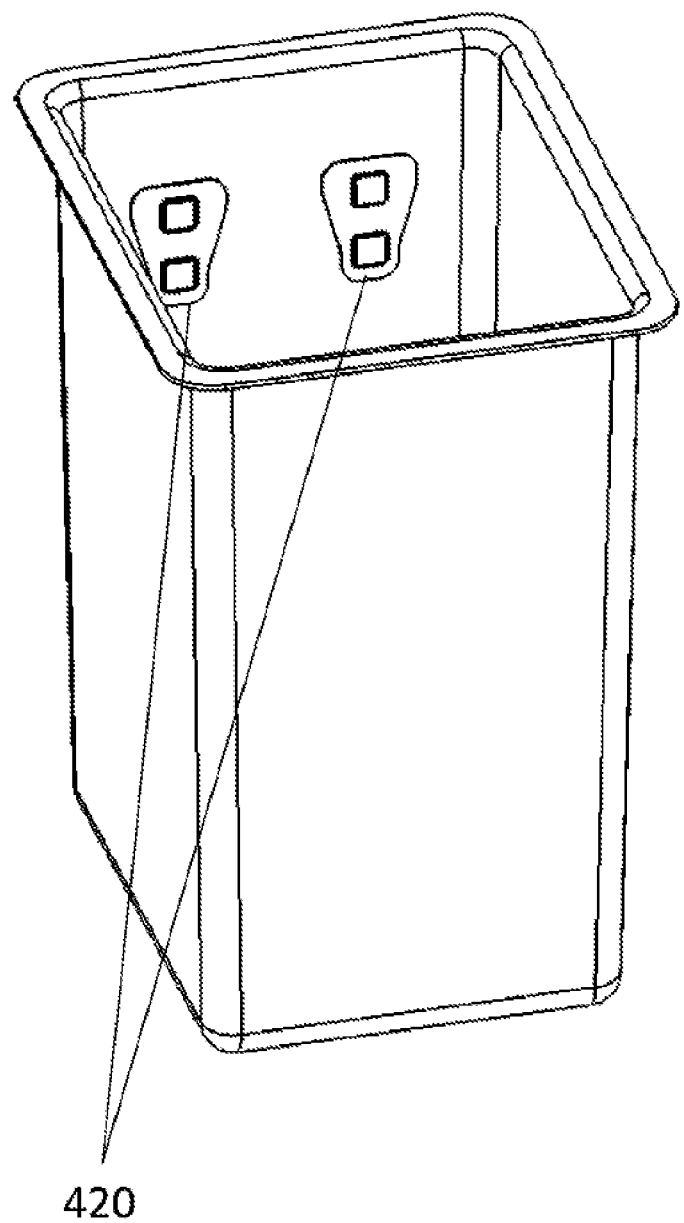
FIG. 34 is an interior view of a mounting plate according to the present invention.
Figure 36A:
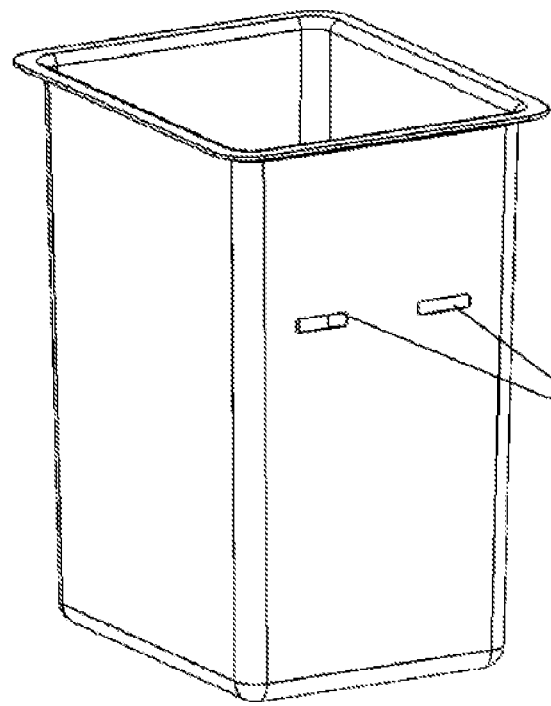
FIG. 36A shows a platform with two slots for mounting a mounting plate according to the present invention.
Figure 36B:
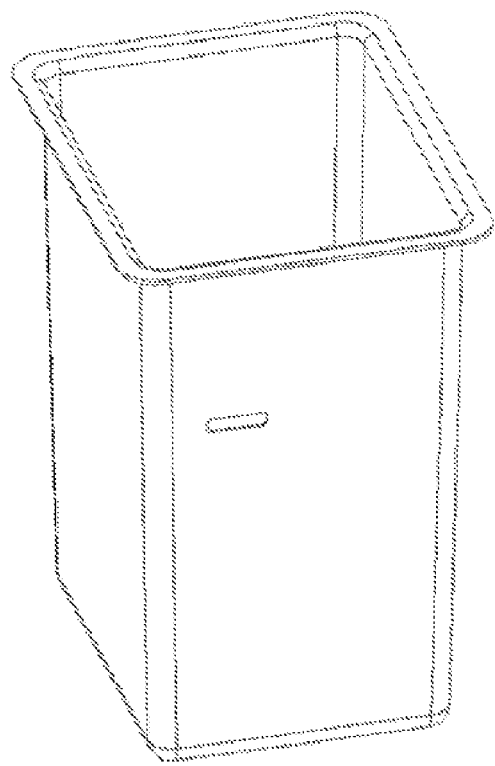
FIG. 36B shows a platform with one slot for mounting a mounting plate according to the present invention.
Figure 37A:
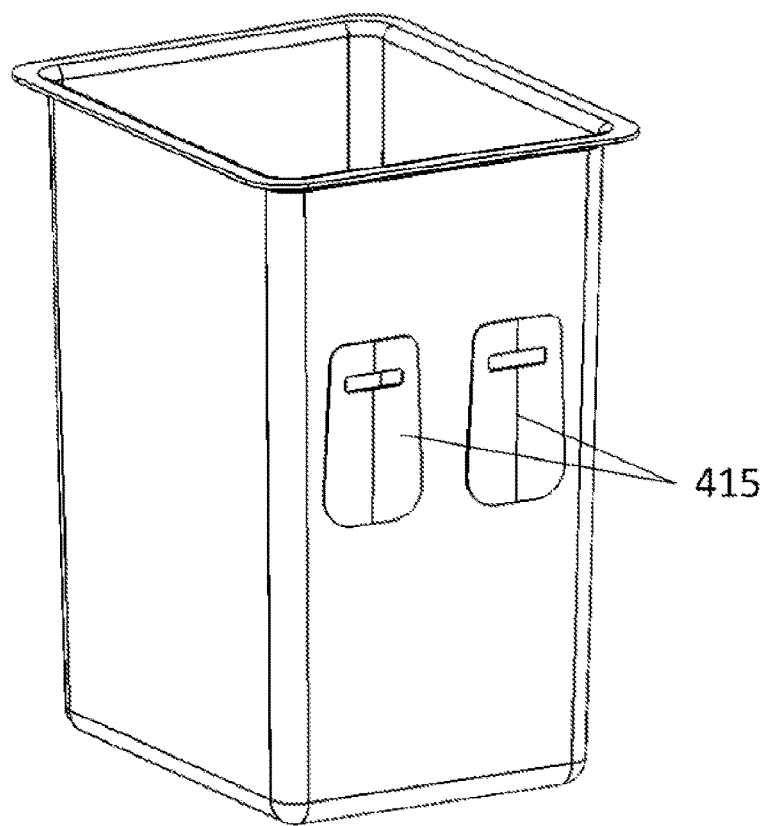
FIG. 37A shows a platform with one slot with reinforcing pads for mounting a mounting plate according to the present invention.
Figure 37B:
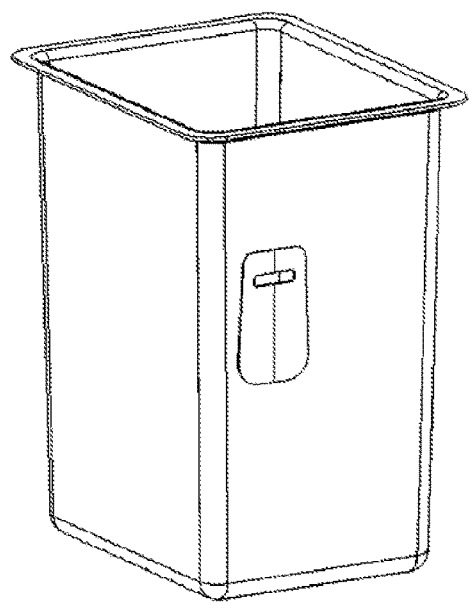
FIG. 37B shows a platform with one slot for mounting a mounting plate according to the present invention.

A first mounting plate example, generally described as 400, is shown in FIG. 33. This embodiment includes four studs 410 that protrude perpendicularly through the platform wall. These four studs are used to secure the controller mounting bracket to the mounting plate. The embodiment includes exterior reinforcement 415, which is wider at the bottom in order to spread out the compression load. Preferably, the bottom of the external reinforcement is between about 50% and about 100% wider than the top and the ratio of the height to the width of the wide end between about 1.4 and 2.33. Internal reinforcement 420, shown in FIG. 34, is wider at the top and the ratio of the height to the width of the wide end between about 1.4 and 2.33, also to spread out the compression load. Preferably, the top of the internal reinforcement is between about 50% and about 100% wider than the bottom. FIGS. 35A and B show cross-sectional views of the embodiment. FIG. 35B is a magnification of section A in FIG. 35A. The figures include the studs 410, the internal reinforcement 420, the external reinforcement 415, platform sidewall 215. Additionally, a spacer 430 and a dielectric cover 435 are included. The spacer is preferably silicone and the dielectric cover is preferably a non-conductive thermoplastic, such as polycarbonate.

FIGS. 36-43 show an alternative embodiment of the present mounting system. In this embodiment, one or more slots 440 are created in the platform sidewall (FIGS. 36A and B). External reinforcement 415 is attached (FIGS. 37A and B) and a mounting plate 445 is inserted through the slots (FIGS. 38A-O, with transparent platform) and rotated into position. The mounting plate 445 includes a top section 446, a bottom section 447 and a transition 448 (FIGS. 39A-O).

Figure 38A:
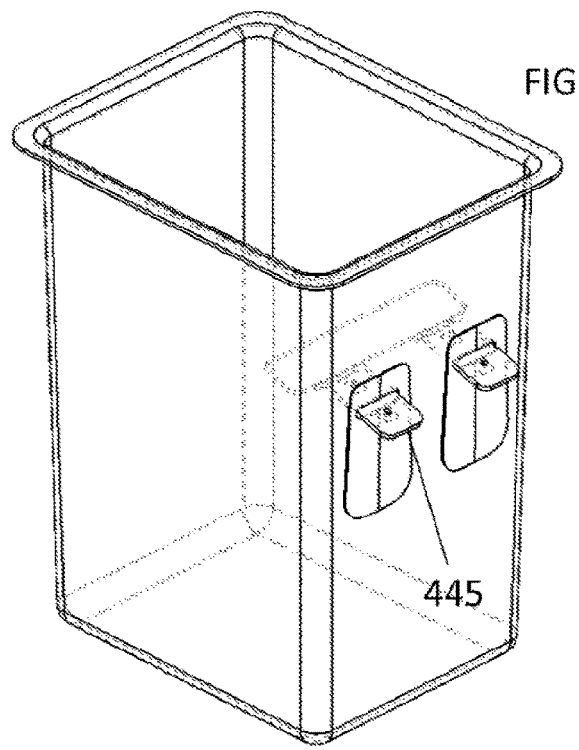
FIGS. 38A and B are perspective views of the installation of a double mounting plate according to the present invention.

FIG. 39A is a front view of the plate of FIGS. 38A and B.

FIG. 39B is a side view of the plate of FIGS. 38A and B.

FIG. 39C is a rear view of the plate of FIGS. 38A and B.

Figure 38C:
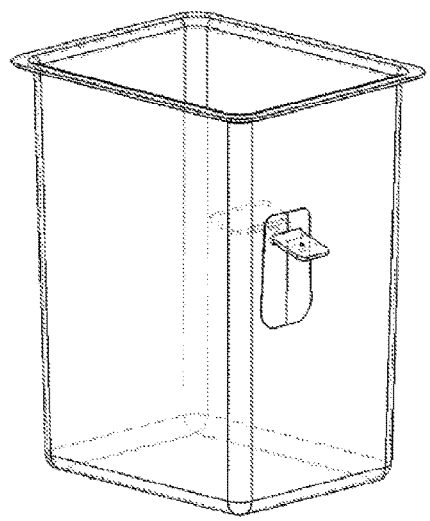
FIGS. 38C and D are perspective views of the installation of a single mounting plate according to the present invention.
Figure 38D:
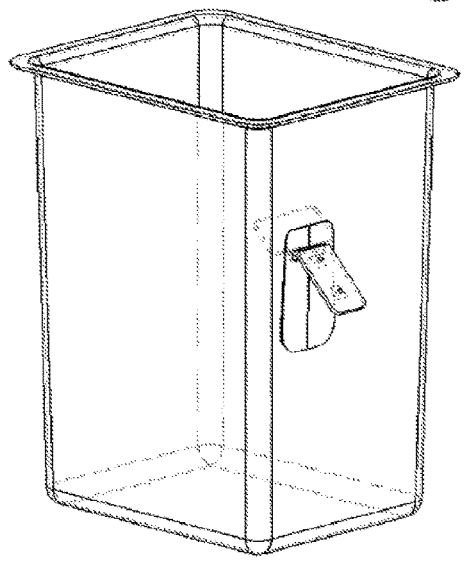
FIG. 38D shows the single mounting plate fully inserted.
Figure 38B:
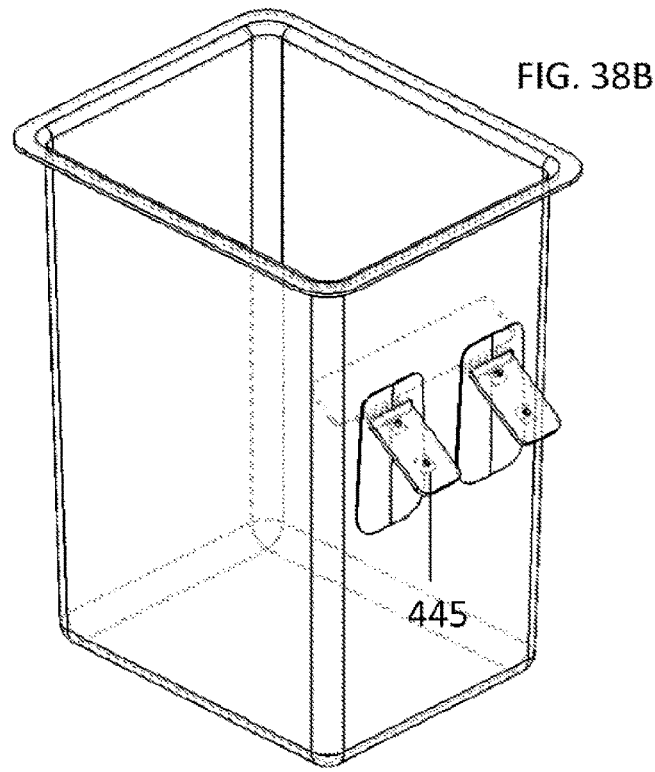
FIG. 38B shows the double mounting plate fully inserted.

FIG. 39D is a front view of the plate of FIGS. 38C and D.

FIG. 39E is a rear view of the plate of FIGS. 38C and D.

Figure 39F:
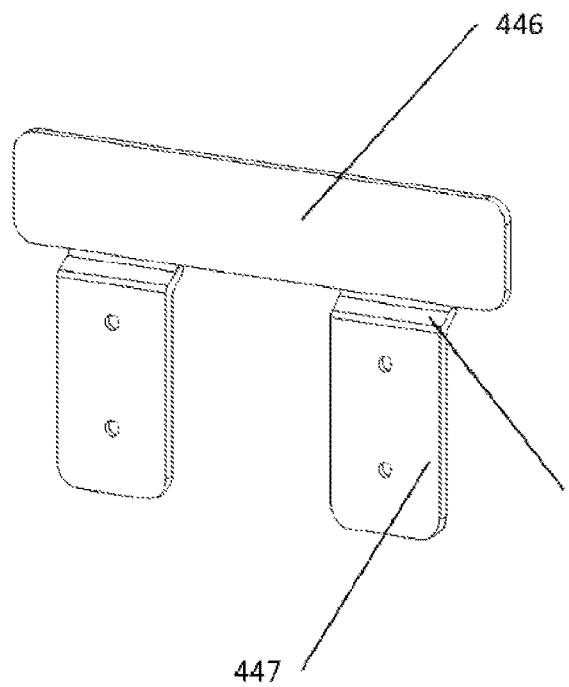
FIG. 39F is a front perspective view of the plate of FIGS. 38A and B.

FIG. 39F is a front perspective view of the plate of FIGS. 38A and B.

Figure 39H:
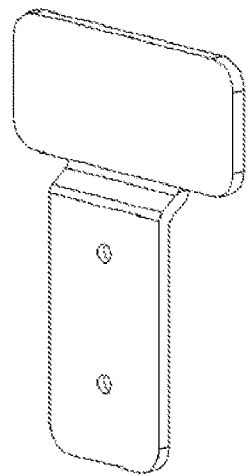
FIG. 39H is a front perspective view of the plate of FIGS. 38C and D.
Figure 39G:
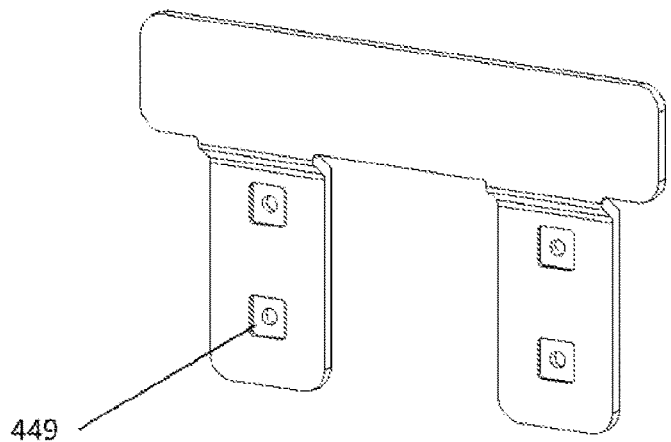
FIG. 39G is a rear perspective view of the plate of FIGS. 38A and B.

FIG. 39G is a rear perspective view of the plate of FIGS. 38A and B.

FIG. 39H is a front perspective view of the plate of FIGS. 38C and D.

Figure 39I:
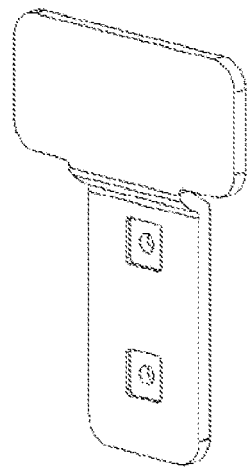
FIG. 39I is a rear perspective view of the plate of FIGS. 38C and D.

FIG. 39I is a rear perspective view of the plate of FIGS. 38C and D.

Figure 39J:
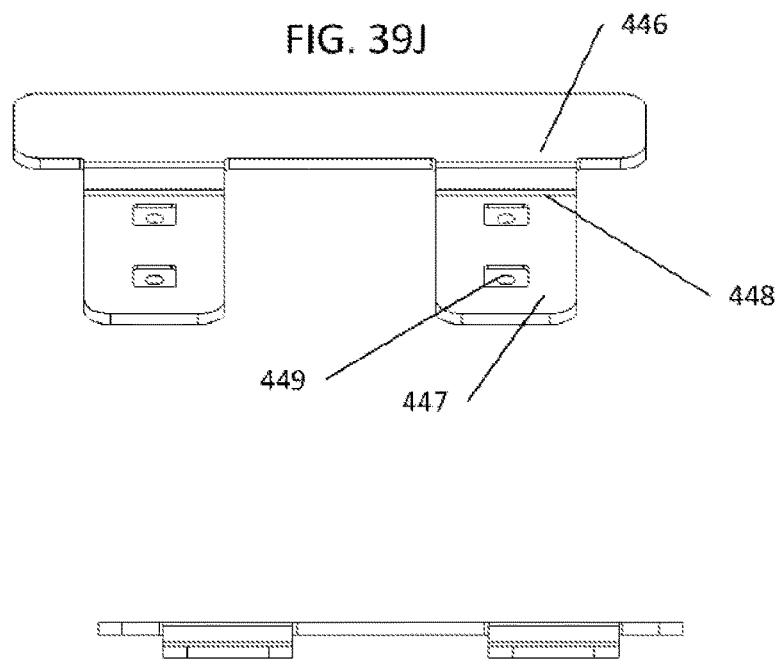
FIG. 39J is a rear bottom perspective view of the plate of FIGS. 38A and B.

FIG. 39J is a rear bottom perspective view of the plate of FIGS. 38A and B.

Figure 39M:
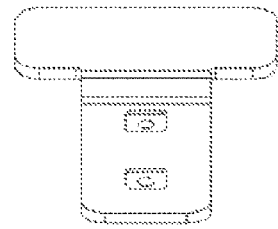
FIG. 39M is a rear bottom perspective view of the plate of FIGS. 38C and D.
Figure 39K:
FIG. 39K is a bottom view of the plate of FIGS. 38A and B.

FIG. 39K is a bottom view of the plate of FIGS. 38A and B.

Figure 39N:
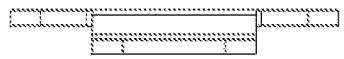
FIG. 39N is a bottom view of the plate of FIGS. 38C and D.
Figure 39L:
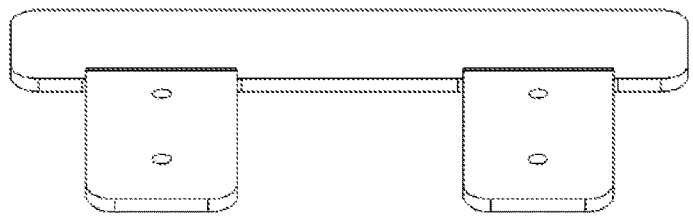
FIG. 39L is a front bottom perspective view of the plate of FIGS. 38A and B.

FIG. 39L is a front bottom perspective view of the plate of FIGS. 38A and B.

FIG. 39M is a rear bottom perspective view of the plate of FIGS. 38C and D.

FIG. 39N is a bottom view of the plate of FIGS. 38C and D.

Figure 39O:
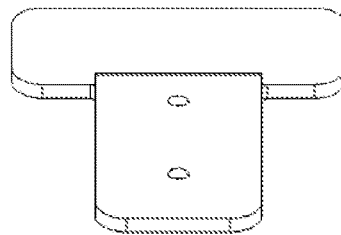
FIG. 39O is a front bottom perspective view of the plate of FIGS. 38C and D.
Figure 40A:
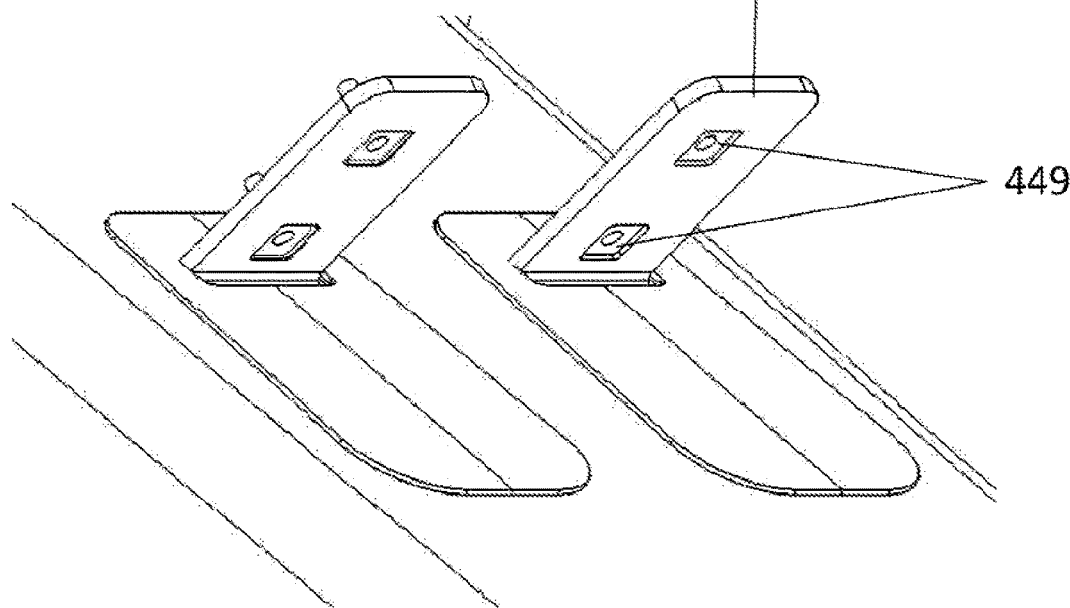
FIG. 40A is a perspective view of the rear of the lower section of the mounting plate of FIGS. 38A and B.
Figure 40C:
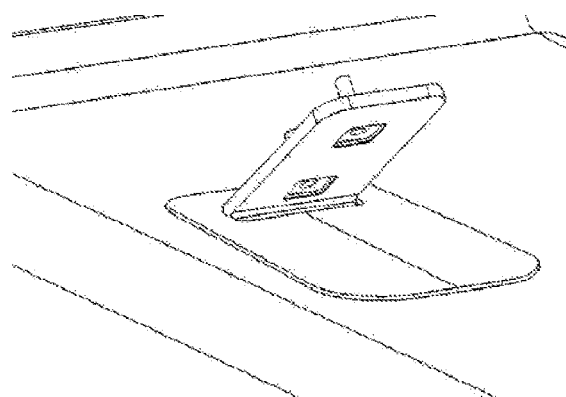
FIG. 40C is another perspective views of the rear of the lower section of the mounting plate of FIGS. 38C and D with studs inserted.
Figure 40B:
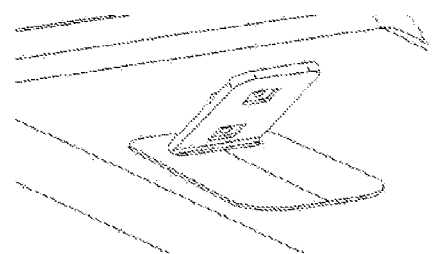
FIG. 40B is a perspective view of the rear of the lower section of the mounting plate of FIGS. 38C and D.

FIG. 39O is a front bottom perspective view of the plate of FIGS. 38C and D.

Figure 41A:
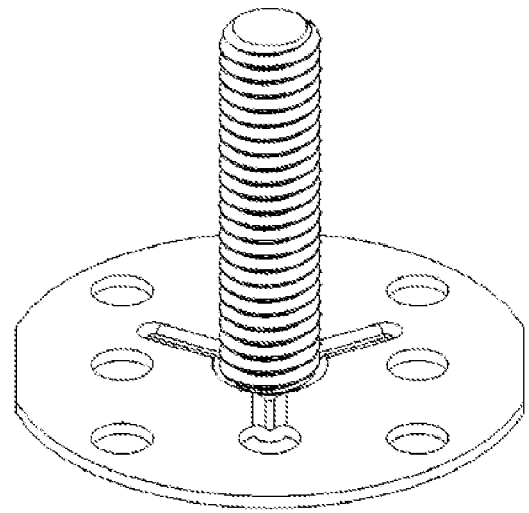
FIG. 41A-C are various views of a PRIOR ART exemplary stud used with the present invention.
Figure 41B:
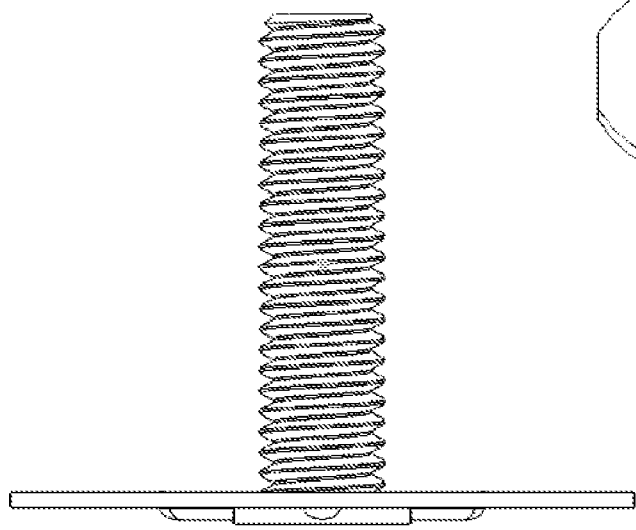
Figure 41C:
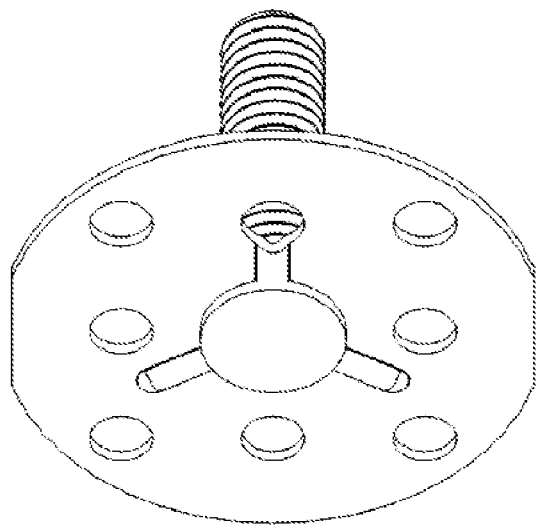
Figure 42A:
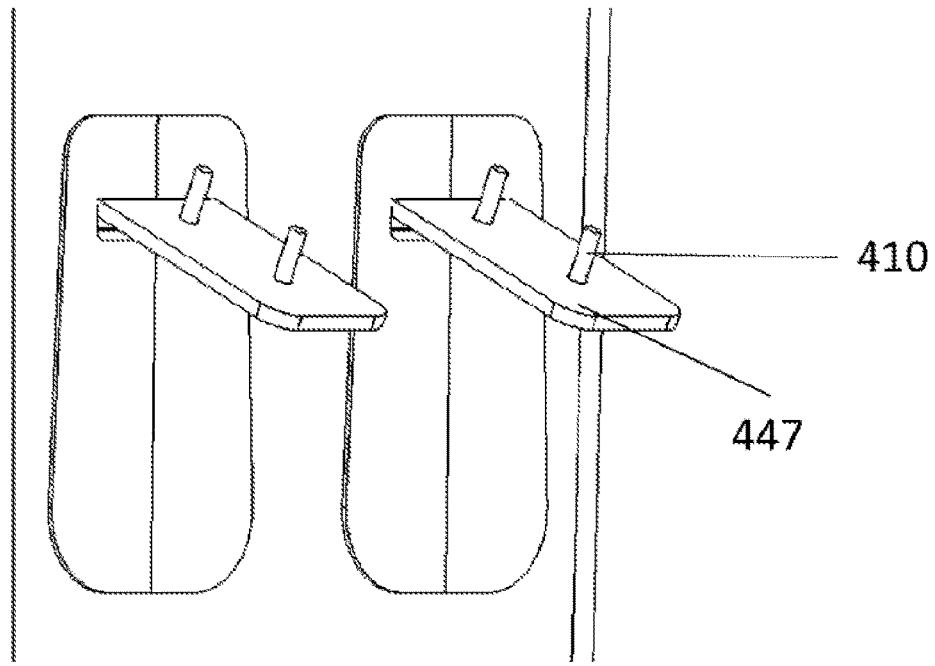
FIG. 42A is a perspective view of the lower section of the mounting plate of FIGS. 38A and B with studs installed.
Figure 42B:
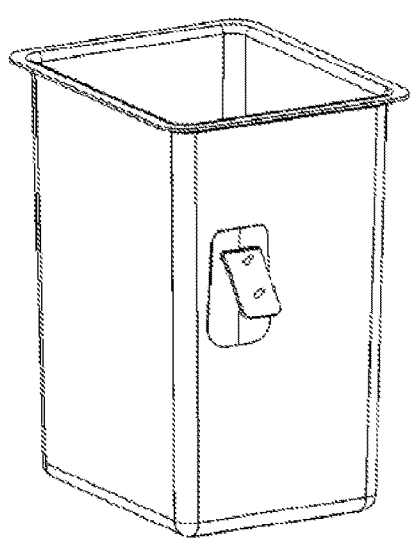
FIG. 42B is a perspective view of the lower section of the mounting plate of FIGS. 38C and D installed in a platform and with studs installed.
Figure 42C:
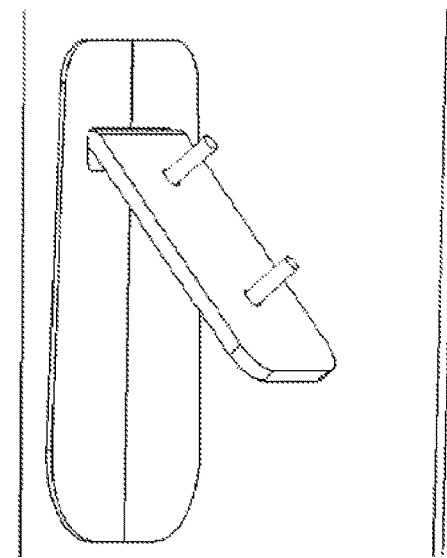
FIG. 42C is a close-up perspective view of the lower section of the mounting plate of FIGS. 38C and D installed in a platform and with studs installed.
Figure 43A:
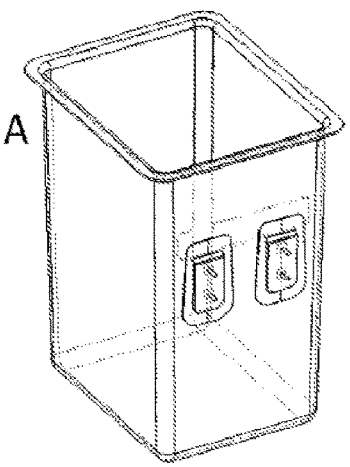
FIG. 43A is a perspective exterior view of the mounting plate of FIGS. 38A and B installed in a transparent platform.
Figure 43B:
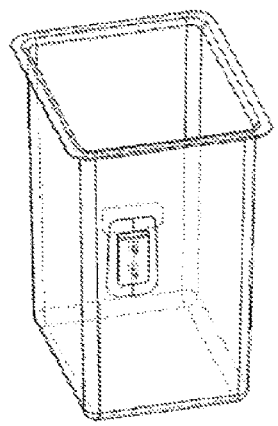
FIG. 43B is a perspective exterior view of the mounting plate of FIGS. 38C and D installed in a transparent platform.
Figure 43D:
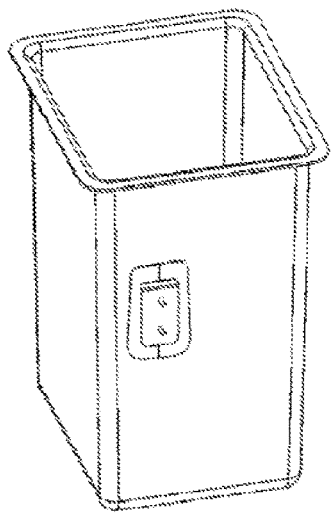
FIG. 43D is a perspective exterior view of the mounting plate of FIGS. 38C and D installed in an opaque platform.
Figure 43C:
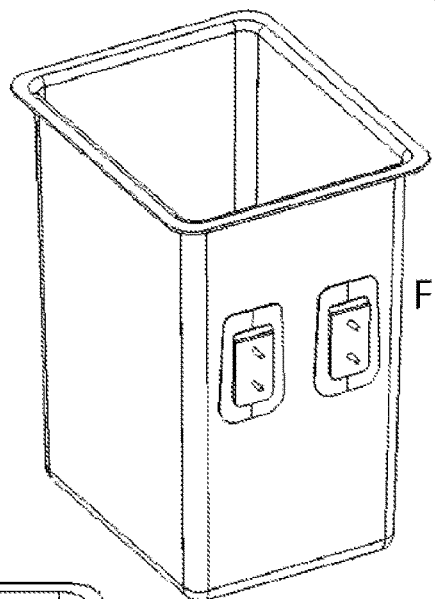
FIG. 43C is a perspective exterior view of the mounting plate of FIGS. 38A and B installed in an opaque platform.
Figure 43E:
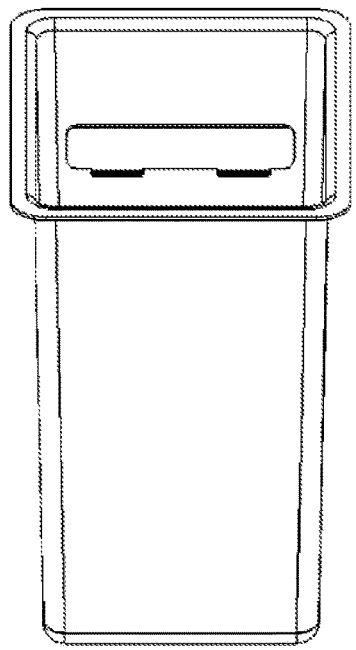
FIG. 43E is a perspective interior view of the mounting plate of FIGS. 38A and B installed in an opaque platform.
Figure 43F:
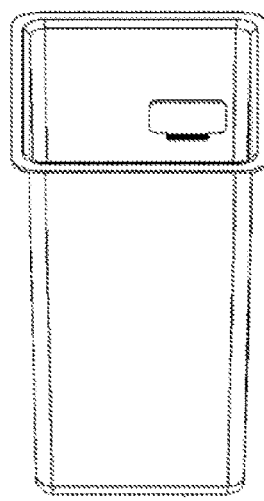
FIG. 43F is a perspective interior view of the mounting plate of FIGS. 38C and D installed in an opaque platform.

The bottom section 446 includes recesses 449 for stud heads (FIGS. 39C, 39E, 39G, 39I, 39J, 39M and 40A-C). In a preferred embodiment, the studs 410 are stud fasteners with large, flat heads (large-and-flat-headed stud fastener), such as stud anchor studs (FIGS. 41A-C). Preferably, the stud is formed from a bolt inserted through a large washer and welded to the washer to form the stud. Designs where the stud is formed by welding a threaded rod to a flat head, although acceptable, did not provide as much strength. The flat sides of the head help to prevent the stud from twisting. The heads are preferable perforated and non-circular so that when embedded in composite resin they do not turn when a nut or other fastener is being applied and tightened. The studs 410 are inserted through the holes in the bottom section 447 (FIGS. 42A-C) and the mounting plate is rotated into position (FIGS. 43A-F). FIGS. 43A and B show a transparent platform with the double- and single-mounting plates, respectively, in position. FIGS. 43C and D show an opaque platform with the single and double-mounting plate, respectively, in position. FIGS. 43E and F are interior views of the platform with double and single-mounting plates, respectively.

FIG. 44A-K shows a design that consists of vertically elongated rectangular reinforcement pieces with rounded corners 450 (the shape is also called stadium, discorectangle, or obrund) on the inside and outside of the platform wall. Big head studs penetrate the reinforcement pieces and platform wall and affix the reinforcement pieces to the wall. The elongated rectangular reinforcement pieces are oval in an alternative embodiment.

The reinforcement pieces 450 are bonded to the platform wall with an adhesive. The big head stud is inserted through a reinforcement piece on the inside of the platform, through the platform wall, and through a reinforcement on the outside of the platform. A non-conductive insulating cap 455 is placed over the stud heads on the inside of the platform to prevent any current from leaking through the platform wall. The insulating cap 455 is adhesively bonded in place or is connected via mechanical means. For example, the insulating cap is designed so it "snaps" into place over the stud heads when pressure is applied. The top and bottom of the reinforcement sections are rounded to reduce stress concentrations that is produced by sharp corners. The reinforcement sections on the inside of the platform extend up, past the reinforcement sections on the outside of the platform, by an inch or so. This further reduces stress concentrations by transferring more stress into the flange of the platform. All of the same materials proposed for previous designs are also used with this design.

The reinforcement sections preferably have a height-to-width ratio between about 3 and about 6. Whereas most prior art mounting plates have a height-to-width ratio between approximately 1 and 2, it was discovered that a greater height-to-width ratio was needed to prevent separation over time of the plate from the sidewall along the top and/or bottom edges.

In an example embodiment, the width of the plate 450 in FIG. 44A is about 3.5 inches wide and about 20 inches tall (area=70 square inches). The bolt head shown in FIG. 41 is 2 inches in diameter and the mounting stud is centered in the 3.5-inch-wide portion shown in FIG. 44A. Two plates with an approximately 8-inch margin above and below the top and bottom bolts do not separate when under a 175 lbs load on a 6.5-inch moment arm. Thus, the example embodiment was able to support about 95 ft-lbs with two of the plates, with a combined area of 140 square inches, without separation, giving a separation support factor of about 0.68 ft-lbs/square inch. In contrast, a prior art mounting plate that was rated to support 40 lbs with an 8" moment arm (26.66 ft-lbs) had dimensions of about 11.5×16 inches (area=184 square inches), giving a separation support factor of 0.144 ft-lbs/square inch. By increasing the height to width ratio, the plate is able to withstand several times more load without separation along the top or bottom edges.

Figure 44E:
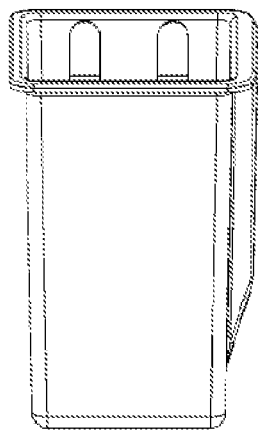
Figure 44F:
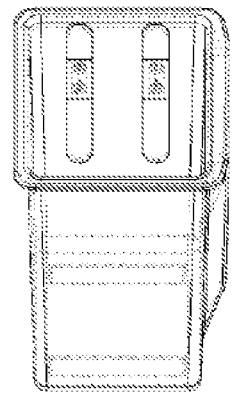
Figure 44G:
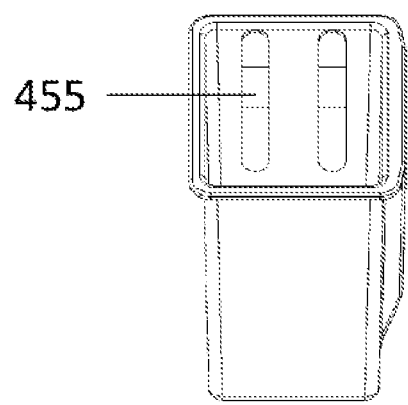
Figure 44H:
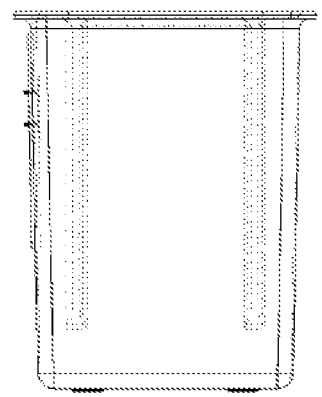
Figure 44I:
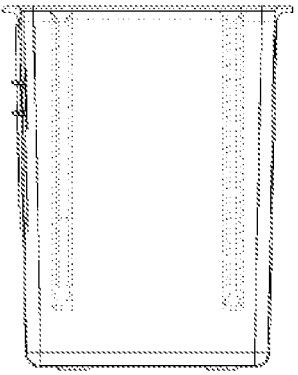
Figure 44J:
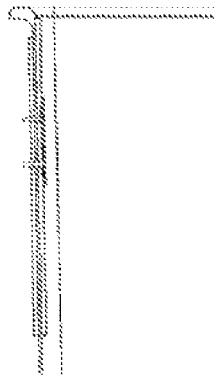
Figure 44K:

FIG. 44A is a front view of the design. FIG. 44B is a transparent front view showing the reinforcement sections and the studs. FIG. 44C is a front perspective, transparent view. FIG. 44D is a rear perspective transparent view. FIG. 44E is a rear perspective solid view. FIG. 44F is a top rear perspective transparent view. FIG. 44G is a top rear solid perspective view. FIG. 44H is a side transparent view. FIG. 44I is a cross sectional view. FIG. 44J is a side, cut-away detailed view of the design. FIG. 44K is a closer detailed of FIG. 44J.

Figure 45:
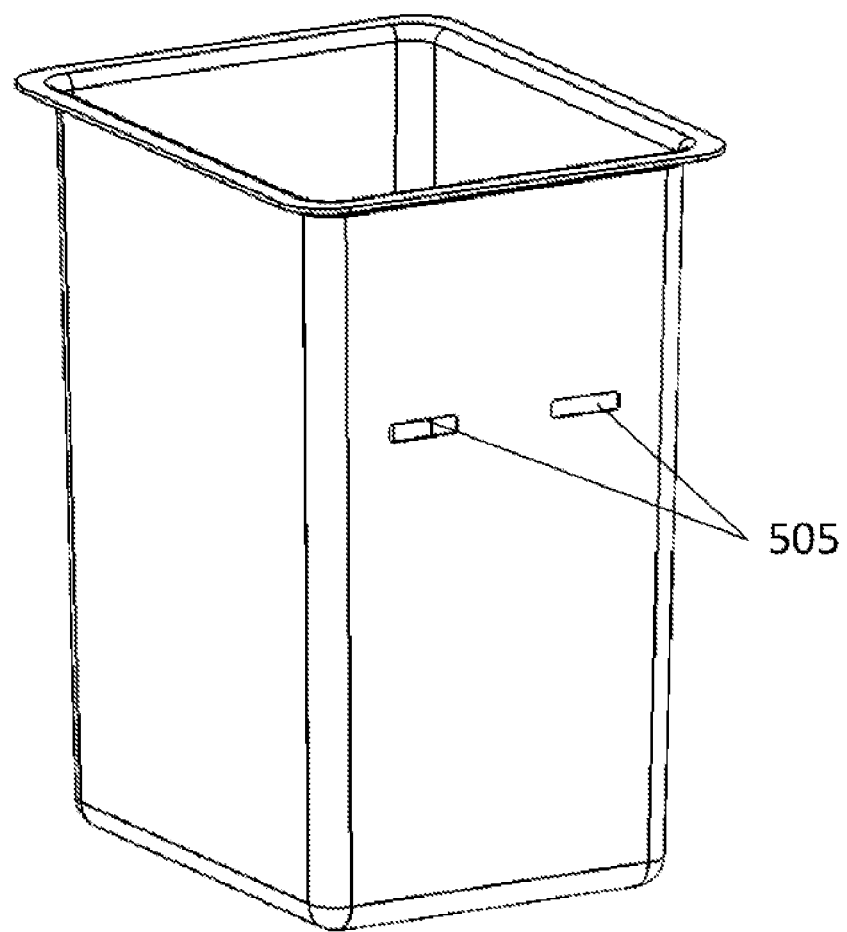
FIG. 45 is a perspective view of a platform with slots for mounting a mounting plate according to the present invention.
Figure 47A:
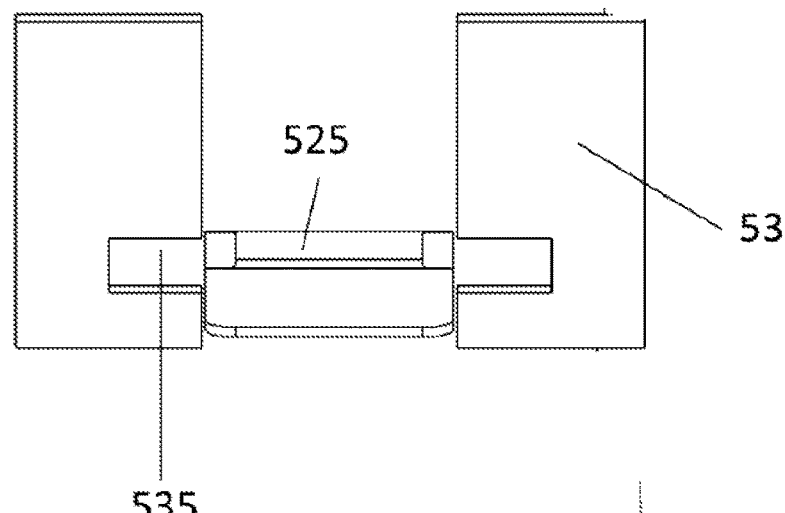
FIG. 47A is an interior view of a single-upper-section mounting plate with interior reinforcement components positioned for installment.
Figure 47B:
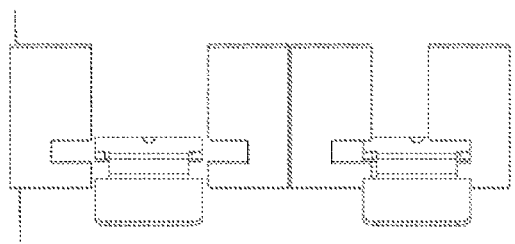
FIG. 47B is an interior view of a double-upper-section mounting plate with interior reinforcement components positioned for installment.
Figure 47C:
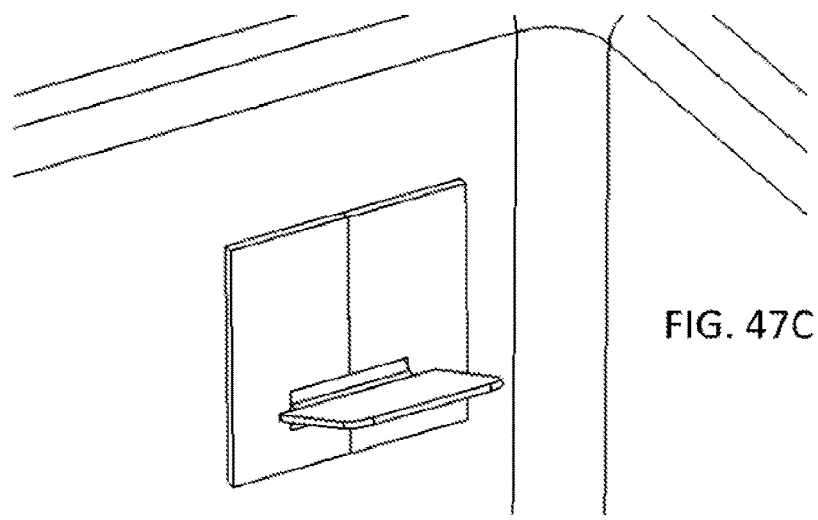
FIG. 47C is an interior view of a single-upper-section mounting plate with interior reinforcement components installed.
Figure 47D:
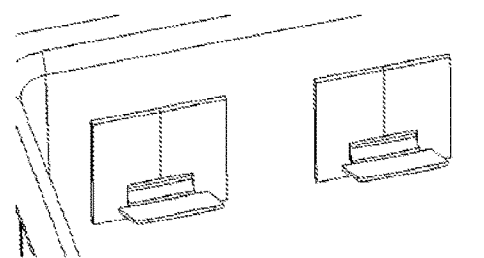
FIG. 47D is an interior view of a double-upper-section mounting plate with interior reinforcement components installed.

Yet another mounting system example embodiment is shown in FIGS. 45-48. In this system, slots 505 are created in the platform sidewall (FIG. 45). A plate 510, with at least one upper section 515 and a lower section 520 is provided (FIGS. 46A and B). The lower section has a horizontal dimension that is greater than the length of the slot, such that the platform cannot slide beyond the transition area 525. The lower section includes holes for studs 410. The plate is shown being inserted into a slot 505 in a transparent platform.

Figure 48A:
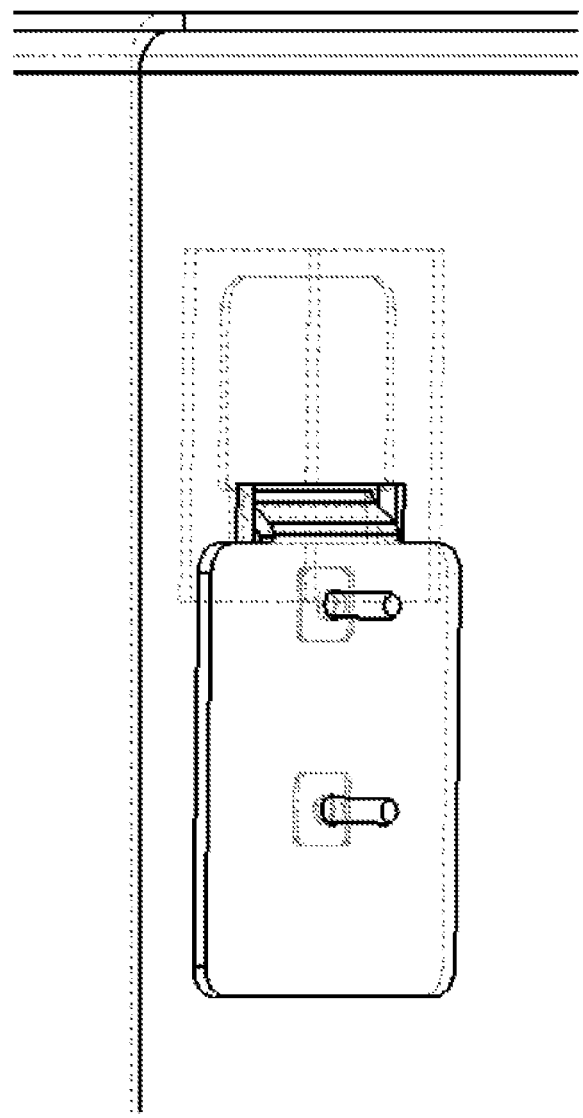
FIG. 48A is a perspective exterior view of the mounting plate of single-upper-section mounting plate installed in a transparent platform.
Figure 48B:
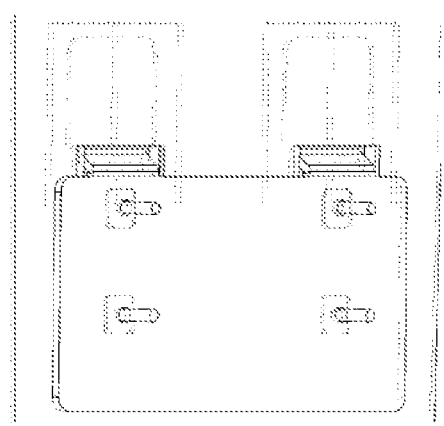
FIG. 48B is a perspective exterior view of the mounting plate of double-upper-section mounting plate installed in a transparent platform.
Figure 49A:
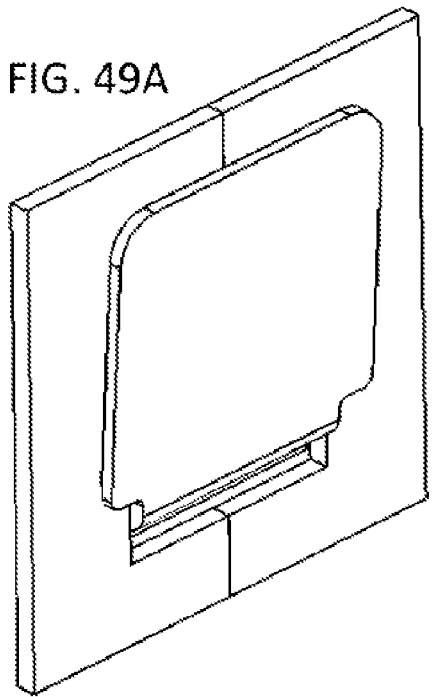
FIG. 49A is a perspective interior view of the single-upper-section mounting plate of FIGS. 45-48 installed in an opaque platform.
Figure 49B:
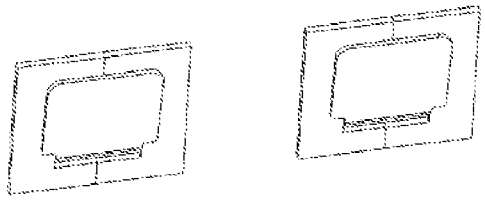
FIG. 49B is a perspective exterior view of the single-upper-section mounting plate of FIGS. 45-48 installed in an opaque platform.
Figure 49C:
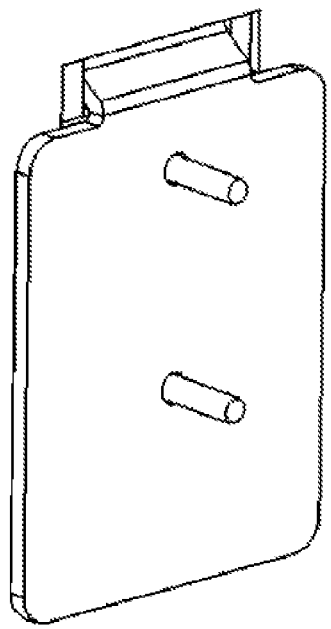
FIG. 49C is a perspective interior view of the double-upper-section mounting plate of FIGS. 45-48 installed in an opaque platform.
Figure 49D:
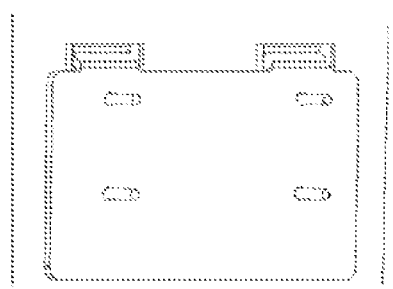
FIG. 49D is a perspective exterior view of the double-upper-section mounting plate of FIGS. 45-48 installed in an opaque platform.

On the inside of the platform, two inner reinforcement components 530 are positioned between the upper section 515 and the platform. The reinforcement components are slotted 535 to receive the transition 525 (FIGS. 47A-D), so that the two reinforcement components contact one another when slid together and provide a reinforcement for the entire area of the upper section. FIGS. 48A and B show an exterior perspective view of the plate rotated into position in a transparent platform. FIGS. 49A and B show interior views, respectively, for a plate installed in an opaque platform. FIGS. 49C and D show exterior views, respectively, for a plate installed in an opaque platform.

Advantageously, these valve mounting systems eliminate the risk associated with using adhesives to mount the mounting plate to the platform. In particular, a tension force that is created at the top of the plate when the plate is loaded has the potential to separate the mounting plate from a platform wall. Mechanically interlocking the platform wall via a slot or cutout in the platform wall eliminates the risk of separation of the mounting plate from the platform wall. However, in some scenarios it is undesirable to cut slots or holes in the wall of the platform and/or for the platform to include interior components because a platform liner, used for dielectric insulation, may not fit in a platform that has extra mounting plate components taking up space inside of the platform. In these scenarios, it is desirable for the entirety of the mounting plate to remain on the outside of the platform.

Such a mounting system according to the present invention includes a mounting plate that wraps around the sides of the platform and around the underside of the platform flange. FIGS. 50-52 show a valve mounting plate design, generally described as 600, with side tabs 605 that wrap around the sides of the platform, a top tab 610 that wraps against the underside of the platform flange, and a main support component 615 that substantially or matingly contacts and is adhered to the planar side of the platform. The tabs are non-parallel to the main support component. They are orthogonal to the main support component or at another angle and substantially or matingly contact the sidewall of the platform and/or the top flange of the sidewall. These tabs allow tension stress, which could induce peeling at the outer edges of the mounting plate, to be transformed into shear stresses. In the preferred embodiment, the top and side edges are tabbed. In an alternative embodiment, only the top edge is tabbed. Surprisingly, this mounting system configuration supports about four times the load of prior art mounting plates when a similar moment arm is used. Studs 410 (see FIG. 41) are inserted through the plate and other components affixed to the platform with them. FIGS. 51A-D show detailed views of the embedded big-head studs. FIGS.

52A-D show this embodiment mounted on a platform. FIG. 52A is a front view; FIG. 52B is a side view, FIGS. 52C&D are top and bottom perspective views, respectively The plate is made out of fiber-reinforced thermosets, unreinforced thermosets, fiber-reinforced thermoplastics, or unreinforced thermoplastics. The studs are adhesively or mechanically joined with the mounting plate. Alternatively, the studs are embedded in the mounting plate when it is manufactured.

Figures 53A, 53B, 53C, 53D, 53E, 53F:
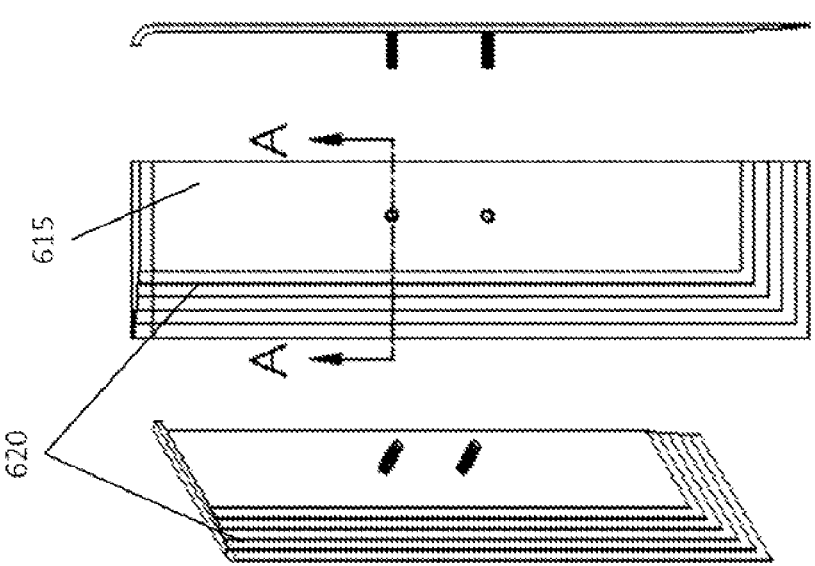
FIGS. 53A-F show another mounting plate embodiment that utilizes tabs.
Figure 54C:
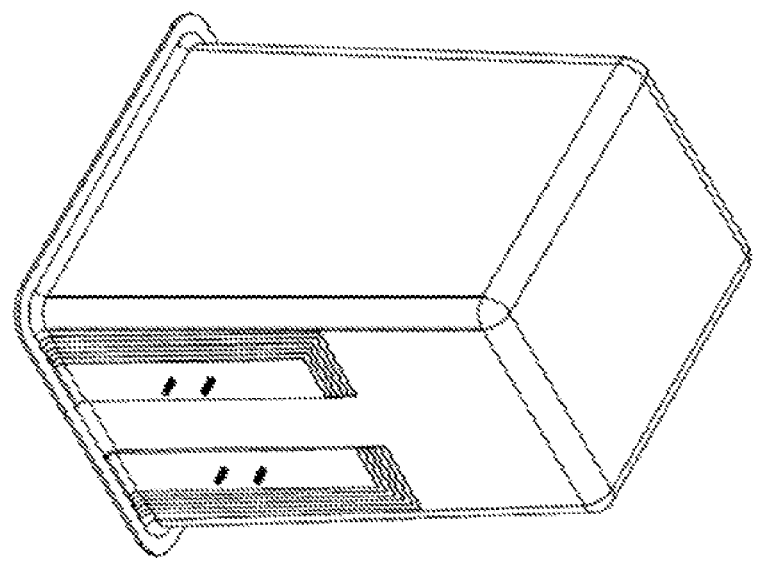
FIGS. 54A-C show the embodiment of FIGS. 53A-C mounted on a platform.
Figure 54B:
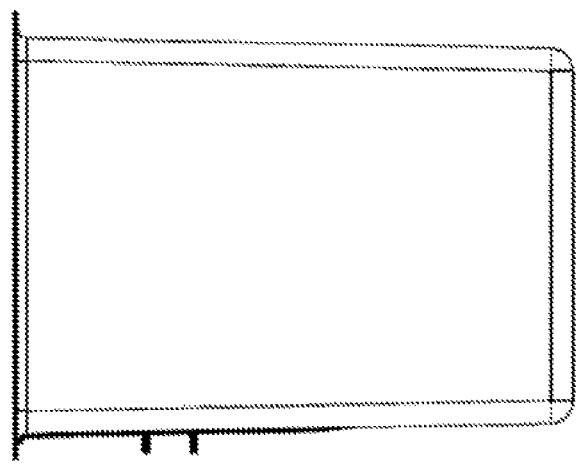
Figure 54A:
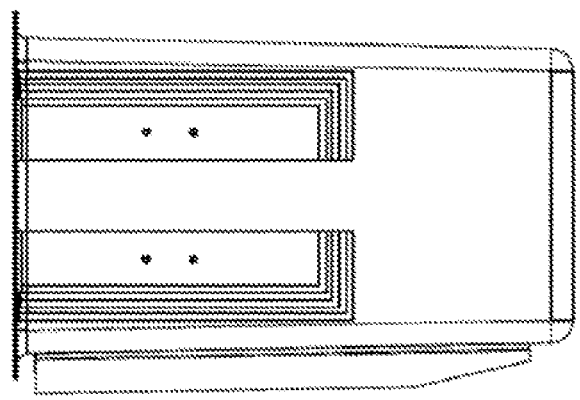

FIGS. 53A-C show another embodiment that utilizes edge modifications to change the tension stress at the edges into shear stress. In this embodiment the vertical sides are tapered or stepped 620 in order to transition the load to the platform wall more gradually and reduce stress concentrations. This design is lighter than the previous design due to its smaller size and reduced bonding area. This design uses the same materials and joining techniques as previously described. FIGS. 54A-C show the embodiment of FIGS. 53A-C mounted on a platform.

The present invention is thus directed to a mounting plate for an elevating platform. The mounting plate includes an interior reinforcement piece, an exterior reinforcement piece, and at least one fastener. The interior and exterior reinforcement pieces are vertically elongated with rounded corners, and positioned on the interior and exterior of the platform sidewall, respectively. The at least one fastener is inserted through the interior reinforcement piece on the inside of the platform, through the sidewall, and through the exterior reinforcement piece on the outside of the platform. The height-to-width ratio of the reinforcement pieces is between about 3 and about 6. The fastener is a mounting stud embedded in the interior reinforcement piece. In one embodiment, the interior reinforcement piece extends above the exterior reinforcement piece. In another embodiment, the exterior reinforcement piece is wider at the bottom than the top; and the interior reinforcement piece is wider at the top than the bottom. The bottom of the exterior reinforcement piece is between about 50% and about 100% wider than the top and the top of the interior reinforcement piece is between about 50% and about 100% wider than the bottom. The plate preferably includes a spacer positioned between the exterior reinforcement piece and the sidewall and a dielectric cover positioned over the interior reinforcement piece and a head of the at least one fastener; the spacer is silicone and the dielectric cover is a non-conductive thermoplastic. The mounting plate is made from fiber-reinforced thermosets, unreinforced thermosets, fiber-reinforced thermoplastics, and/or unreinforced thermoplastics.

Another mounting plate according to the present invention includes a wide planar section, narrow planar section and a transition. The wide and narrow planar sections are in parallel planes and not coplanar and the connects the wide and narrow planar sections. The narrow planar section is inserted through a slot in the sidewall. The wide planar section has a horizontal dimension that is greater than the length of the slot, such that the plate cannot slide through the slot beyond the transition area. The wide and narrow planar sections are parallel with and juxtaposed to the sidewall, providing a top planar section and a bottom planar section. At least one of the planar sections including at least one hole and at least one fastener, preferably a mounting stud, inserted through the hole to the platform exterior. In one embodiment, the mounting plate includes two inner reinforcement components positioned between the top planar section and the platform. The reinforcement components are slotted to receive the transition, such that the two reinforcement components contact one another when in position and seal the slot. The mounting plate is made from fiber-reinforced thermosets, unreinforced thermosets, fiber-reinforced thermoplastics, and/or unreinforced thermoplastics.

The present invention is also directed to a support for mounting components to a container. The support has a front, a back, a bottom edge, at least two side edges, a main support component, a top edge with a tab, and means for attaching components to the main support component, preferably mounting studs embedded in the main support component. The main support component is substantially parallel to the main planar surface of a first wall of the container and configured to substantially contact the main planar surface of the first wall of the container. The tab on the top edge is configured to substantially contact the projection of the container, thereby transforming the tension stress along the top edge of the mounting plate into shear stress. Preferably, at least one side edge and/or the bottom edge is tapered or stepped. In one embodiment, the support includes a first side tab along a first side edge of the support; the first side tab is configured to substantially contact the exterior of a second wall of the container that is non-coplanar with the first wall, thereby transforming the tension stress to shear stress along the at least one side edge of the support. Another embodiment includes a second side tab along a second side edge of the support, wherein the second side tab is configured to substantially contact the exterior of a third wall of the container that is non-coplanar with the first and/or second walls; thereby transforming the tension stress to shear stress along the second side edge of the support. In one embodiment, the support is a mounting plate, the container is an elevating platform with sidewalls, a top flange and a bottom, and the projection is the top flange. The support is preferably made from fiber-reinforced thermosets, unreinforced thermosets, fiber-reinforced thermoplastics, and/or unreinforced thermoplastics.

In another embodiment, the present invention is directed to an anti-peel stress mounting apparatus. The mounting apparatus includes both an internal subassembly and an external plate, wherein the internal sub assembly includes two internal plates, and wherein the internal plate and the external plate are mounted on opposite sides of a platform wall.

Figure 55:
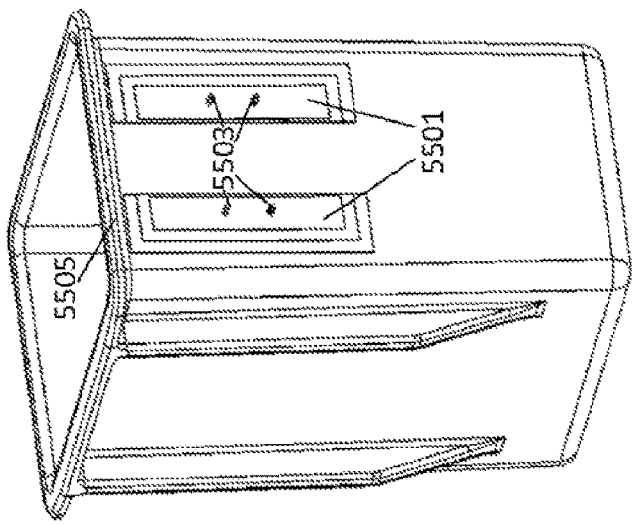
FIG. 55 illustrates a perspective view of an anti-peel stress mounting apparatus according to one embodiment of the present invention.

FIG. 55 illustrates an external view of one embodiment of the anti-peel stress mounting apparatus, wherein external plates 5501 are mounted to the platform wall and wherein the four bolt ends 5503 are operable to attach to an external component. Preferably, the external plates are positioned with a top of the plate approximately 1 or more inches (2.54 or more centimeters) from a lip of the platform wall 5505. Advantageously, the anti-peel stress mounting apparatus reduces cleavage stress between the platform wall and the mounting system when secured to an external component, since the tapered or "stepped" construction of the external plate 5501 allows the stress to be redirected into shear stress normal to the plate. The stepped construction further contributes to the reduction of peel stress on the external plate 5501, since a maximum stress is applied along the stepped area, converting the peel stress into shear stress. Preferably, the stepped construction includes a series of rectangular raised thicknesses (layers) that extend away from a mounted surface (e.g., the surface of a platform wall). The layers are preferably solid, wherein the plate is constructed as a single part from uniform material. Each subsequent step of the stepped layers away from a mounted surface decreases in perimeter size, wherein dimensions of each of the rectangular perimeters of the steps are smaller in each layer further from the mounted surface. This stepped feature is similar to the tapered and stepped construction illustrated in FIGS. 53A-54C. In another embodiment, the stepped construction provides a series of raised thicknesses (layers) that have the shape of rounded rectangles, squares, ellipses, triangles, or rounded triangles, hexagons, octagons, or any other shape known in the art, including those illustrated in FIG. 66.

Figure 56B:
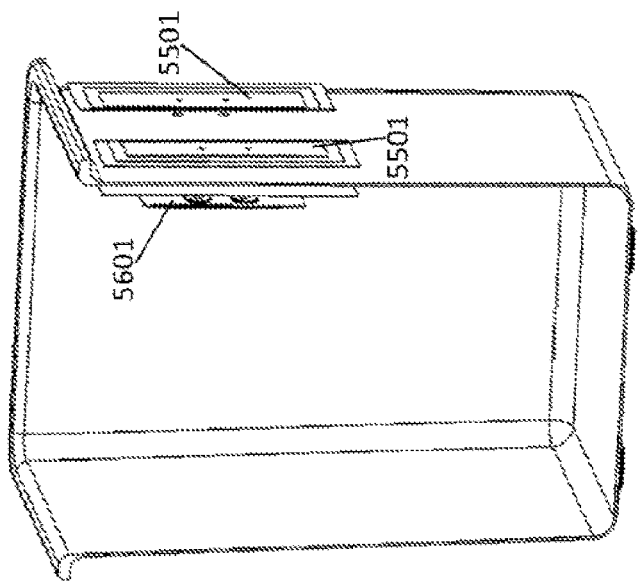
FIG. 56B illustrates a perspective exploded view of an anti-peel stress mounting apparatus according to one embodiment of the present invention.
Figure 56A:
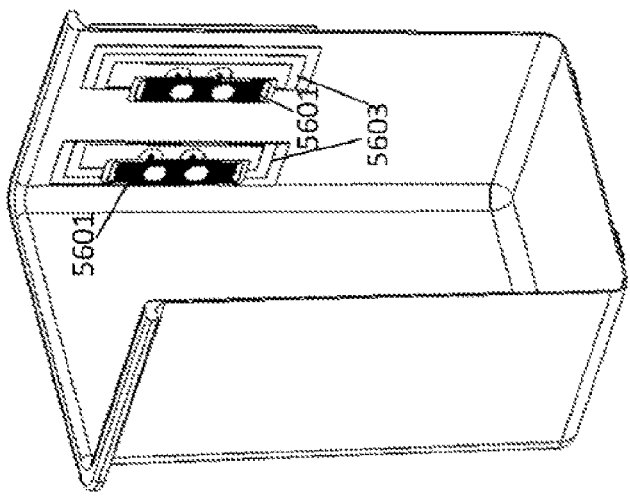
FIG. 56A illustrates an internal exploded view of an anti-peel stress mounting apparatus according to one embodiment of the present invention.

FIG. 56A illustrates a cutaway view of the platform with an exploded view of the internal subassembly. The internal subassembly includes two pairs of two plates, wherein each includes a first internal plate 5601 and a second internal plate 5603. The first internal plate is preferably constructed with injection molded ribs to provide structural support to the part. The second internal plate 5603 is constructed with a stepped construction similar to the external plate illustrated in FIG. 55. A bolt end is encapsulated on a rear side of the first internal plate 5601 and extends within a tubular nub (not visible) from the first internal plate 5601, through the second internal plate 5603, through bored holes in the platform wall, and to a rear face of the external plate. FIG. 56B illustrates a cutaway view of the platform with an exploded view of the anti-peel stress assembly.

In a preferred embodiment, the internal assembly is injection molded as one piece, wherein the first internal plate 5601 is overmolded onto the second internal plate 5603. The material of the first internal plate 5601 is, in one embodiment, approximately 30% glass by weight with randomly distributed, short fibers. The second internal plate 5603 is preferably constructed using fiberglass reinforced polyethylene terephthalate (PET), which includes long, continuous fibers that are oriented in an alternating 0°/90°/0° pattern, which provides high strength and stiffness characteristics. The first internal plate, the second internal plate, or the external plate are, in one embodiment, constructed from unreinforced thermosets, reinforced thermosets, unreinforced thermoplastics, and/or reinforced thermoplastics. In the overmolded embodiment, it is advantageous for fiber matrices of the first internal plate 5601 and the second internal plate 5603 to have compatible matrices so that the internal subassembly can be injection overmolded. In an alternative embodiment, the internal plates are connected by way of an adhesive or welding, including plastic welding methods such as induction welding, ultrasonic welding, resistance welding, laser welding, and friction welding.

The illustrated embodiment includes elongated second internal plates an external plates with similar dimensions to previously described embodiments (e.g., FIGS. 44A-44D). However, in one embodiment, the first internal plate is constructed with dimensions that are approximately half of the dimensions of the second internal plate but with similar length/width ratios. Further, though two bolt attachment points are provided per plate subassembly, in a further embodiment, the anti-peel stress attachment apparatus includes three or more connection points per plate subassembly. In one embodiment, the steps of the stepped shape of both the second internal plate and the external plate are oblique relative to the normal axis of the platform wall. Preferably, each step of the stepped shape is constructed closer to a midline between a first plate and a second plate. For example, in FIG. 55, as each step of the external plates are constructed further from the platform wall, a centroid of each step's shape is located closer to a vertical midline of the platform wall than the previous step.

Figure 57B:
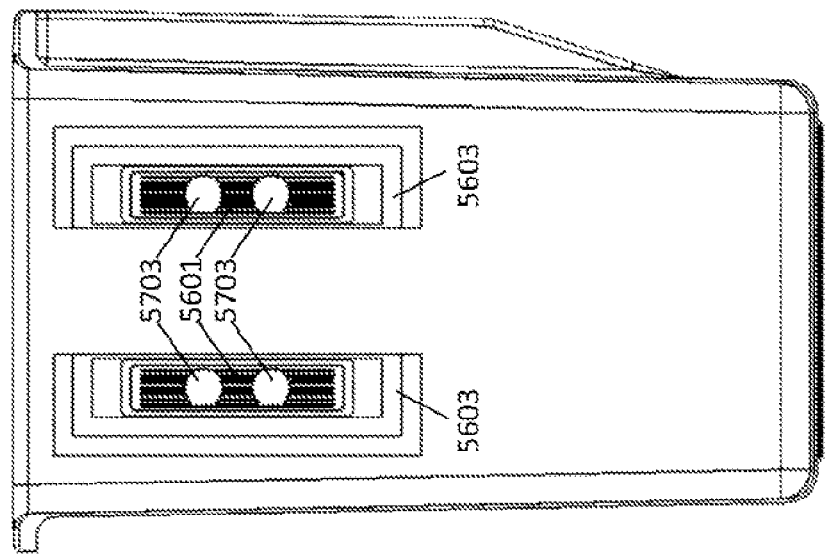
FIG. 57B illustrates an internal cutaway rear view of an anti-peel stress mounting apparatus according to one embodiment of the present invention.
Figure 57A:
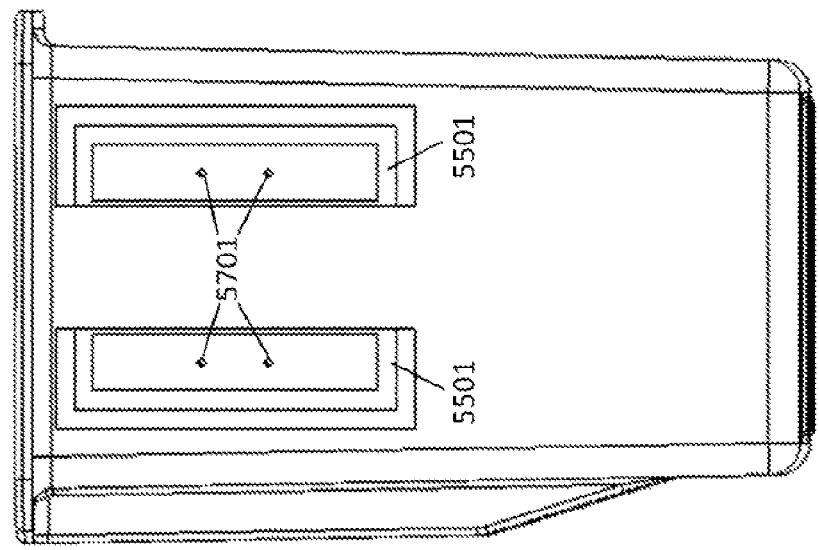
FIG. 57A illustrates an external front view of an anti-peel stress mounting apparatus according to one embodiment of the present invention.

FIG. 57A illustrates a front view of the external plates 5501. Bored holes 5701 in the external plates 5501 are preferably smaller than the holes bored in the internal plate subassembly. In one embodiment, the holes in the external plates 5501 provide a free running fit for a bolt. In an alternative embodiment, the holes are equal in size to the holes of the internal plates and/or provide a loose-running fit. FIG. 57B illustrates an internal cutaway view of the platform including a front view of the internal plate subassembly. A first internal plate 5601 includes bolt encapsulation areas 5703 that are each constructed to secure an embedded or integrated bolt, wherein the bolt extends from the first internal plate 5601 through a hole in the second internal plate 5603. The hole in the second internal plate 5603 is preferably smaller than a hole of the first internal plate 5601 but larger than a hole of the external plate.

In an alternative embodiment, the bolt is secured to an internal plate by any bonding means, such as an adhesive, and is not embedded within an internal plate. In this embodiment, an insulating cover is operable to be secured over the bolt by way welding or use of an adhesive. Alternatively, the bolt is reversibly or irreversibly attached to an internal plate, e.g., via a screw mechanism, latch mechanism, rivet mechanism, or any other mechanical or chemical attachment means known in the art.

FIGS. 58A, 58B, and 58C illustrate a front view, a perspective view, and a rear view of the first internal plate 5601, respectively. FIG. 58A further illustrates an external side of a bolt encapsulation area 5703. Support ribs 5801 on the front of the internal plate are positioned around the bolt encapsulation area 5801. The perspective view of FIG. 58B illustrates the first internal plate 5601 with a hidden view of an encapsulated bolt, which is attached to an inside of the first internal plate 5601. The bolt is encapsulated (e.g., embedded or integrated) within the first internal plate 5601 and is prevented from rotating. The bolt head consists of multiple holes, which are filled with plastic material during injection molding to secure the bolt to the rest of the body of the first internal plate 5601. FIG. 58C illustrates an inside of the bolt encapsulation area 5703, which extends from the first internal plate 5601 with a thickness equal to the second internal plate 5603 and a diameter equal to the hole 5907 of the second internal plate 5603. A nub 5901 within the bolt encapsulation area 5703 is constructed to surround part of an encapsulated bolt between the internal plate subassembly and the external plate in order to increase dielectric performance of the system and reduce the risk of electrical fault occurrence. The nub 5901 extends from an internal face of the first internal plate 5601, through a wall of the platform, and to an internal surface of the external plate. FIGS. 59A and 59B illustrate a front view and a rear view, respectively, of the second internal plate 5603. Preferably, an internal diameter of the nub 5901 is slightly smaller than a diameter of a corresponding aligned hole 6001 on the external plate 5501, wherein the aligned hole 6001 provides a free running fit for the bolt. In one embodiment, the bolt head and a non-threaded shoulder of the bolt is encapsulated in the first internal plate 5601, whereupon the rest of the screw is threaded and extends through the nub 5901. In an alternative embodiment, the nub 5901 is threaded and constructed to receive a bolt via a screw mechanism. The second internal plate 5603 preferably includes holes 5907 that are approximately 0.5 inches (12.7 millimeters) larger than a bolt head to provide dielectric protection. The nub 5901 is, in one embodiment, tubular with a circular cross section and conical in construction. In another embodiment, the cross section is any other shape operable to insulate the bolt, including a rectangle (such as a square), ellipse, or triangle, and is conical, pyramidal, cylindrical, or prismatic. In a further embodiment, the bolt contains or is fully constructed from insulating material, such as a plastic or rubber. In one embodiment, the screw is completely constructed from insulating material. In another embodiment, the screw includes a coating or covering of the insulating material. FIGS. 60A and 60B illustrate a front view and a rear view, respectively, of the external plate 5501, wherein bored holes on the external plate 5501 provide a free running fit for a chosen bolt.

In a preferred embodiment, the second internal plate 5603 and the external plate 5501 are constructed with a tapering thickness from rear face of the plate to a front face of the plate. For example, in one embodiment, the material thickness is greatest on a first step of the platform-interfacing side of the plate (5905 FIG. 59A, 6005 FIG. 60A), and each of the other steps are less thick than the first (5903 FIG. 59A, 6003 FIG. 60A). In one embodiment, the thicknesses of the steps are non-uniform. For example, in one embodiment, a first step is 0.060 inches (1.524 millimeters) thick, and a second and third step are each 0.030 inches (0.762 millimeters) thick, resulting in a 0.120 inch (3.048 millimeter) total thickness of the stepped portion of the plate. In one embodiment, a ratio of the thickness of the first layer to at least one of the subsequent layers is 2:1.

In another embodiment, the nub 5901 of the first internal plate 5601 has an internal diameter that is at least 0.5 inches (12.7 millimeters) larger than a diameter of a head of a bolt, which provides at least a 0.25 inch (6.35 millimeter) clearance distance for dielectric protection. Similarly, the nub 5901 is at least 0.5 inches (12.7 millimeters) larger than an outer diameter of a threaded portion of the bolt. A hole 5907 in the second internal plate 5603 is preferably constructed with a diameter equal to a diameter of the bolt encapsulation area 5703. The hole 6001 of the external plate is, in one embodiment, constructed with a diameter operable to accept an end of the bolt and is approximately equal to outer diameter of the threaded bolt.

Figure 61A:
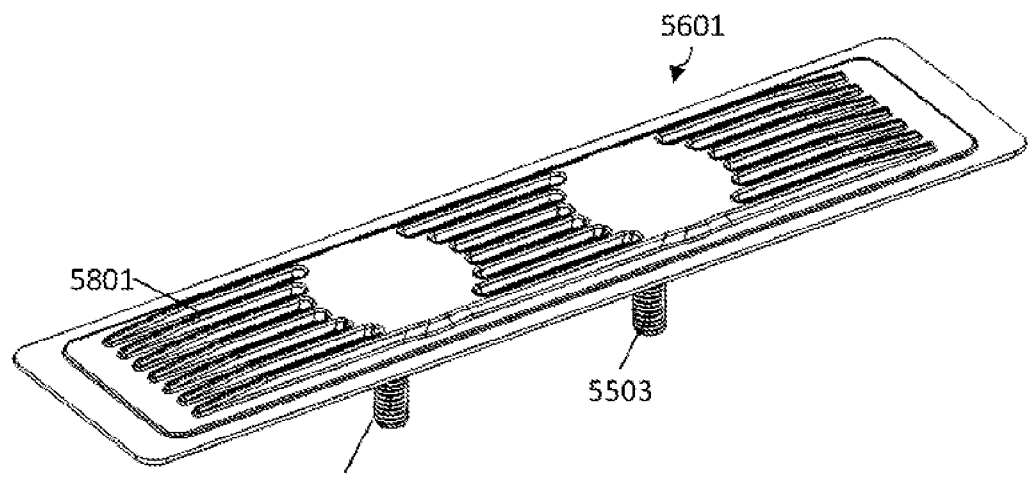
FIG. 61A illustrates a front perspective view of a first internal plate with mounting bolts of an anti-peel stress mounting apparatus according to one embodiment the present invention.
Figure 61B:
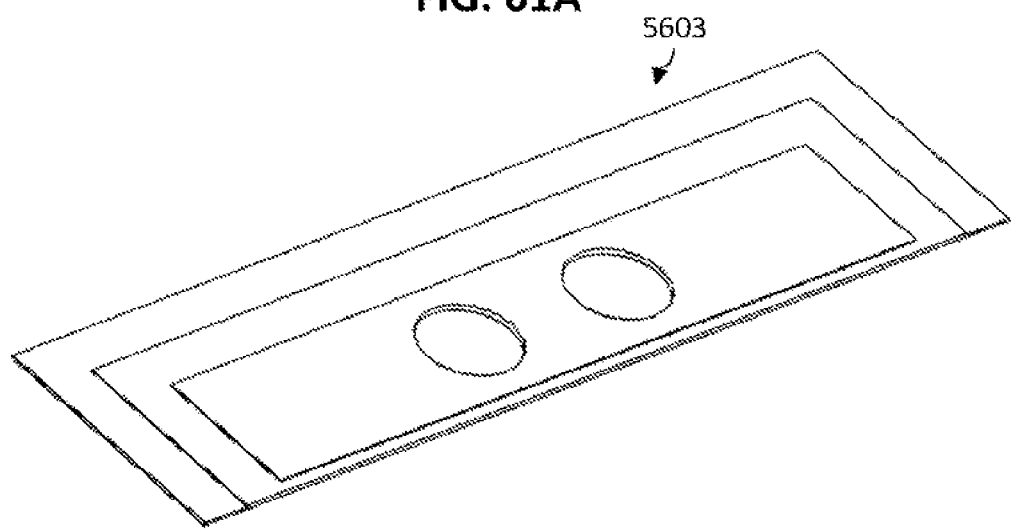
FIG. 61B illustrates a front perspective view of a second internal plate of an anti-peel stress mounting apparatus according to one embodiment of the present invention.
Figure 61C:
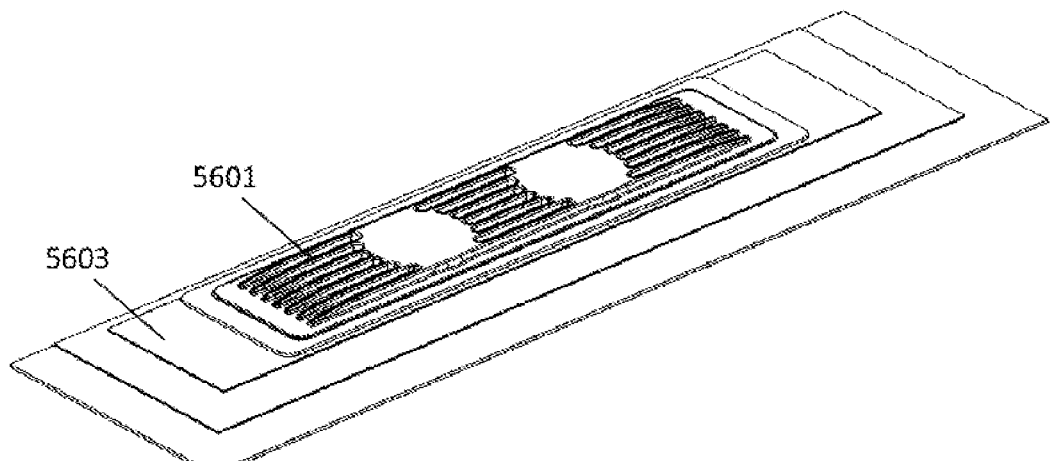
FIG. 61C illustrates a front perspective view of an internal plate subassembly of an anti-peel stress mounting apparatus according to one embodiment of the present invention.

FIGS. 61A, 61B, and 61C illustrate views of the first internal plate 5601, second internal plate 5603, and internal plate subassembly, respectively. FIG. 61A illustrates one embodiment of the first internal plate 5601 with encapsulated bolts 5503, which are constructed to extend through holes of the second internal plate.

Figure 64:
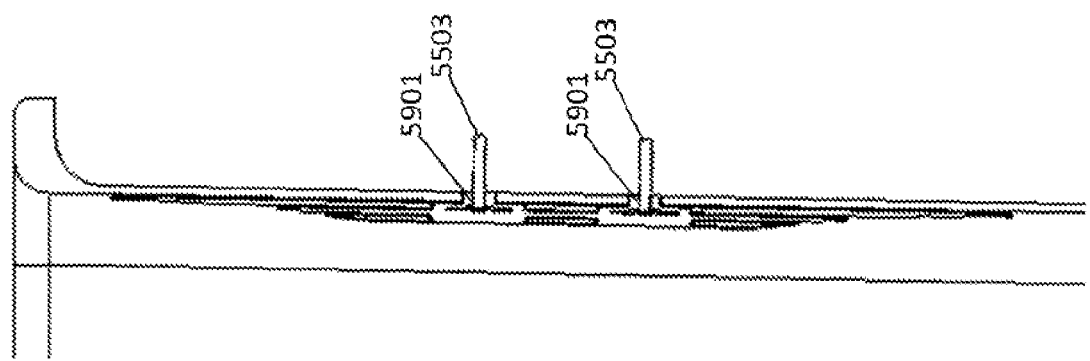
FIG. 64 illustrates a side cutaway view of an anti-peel stress mounting apparatus according to one embodiment of the present invention.
Figure 63:
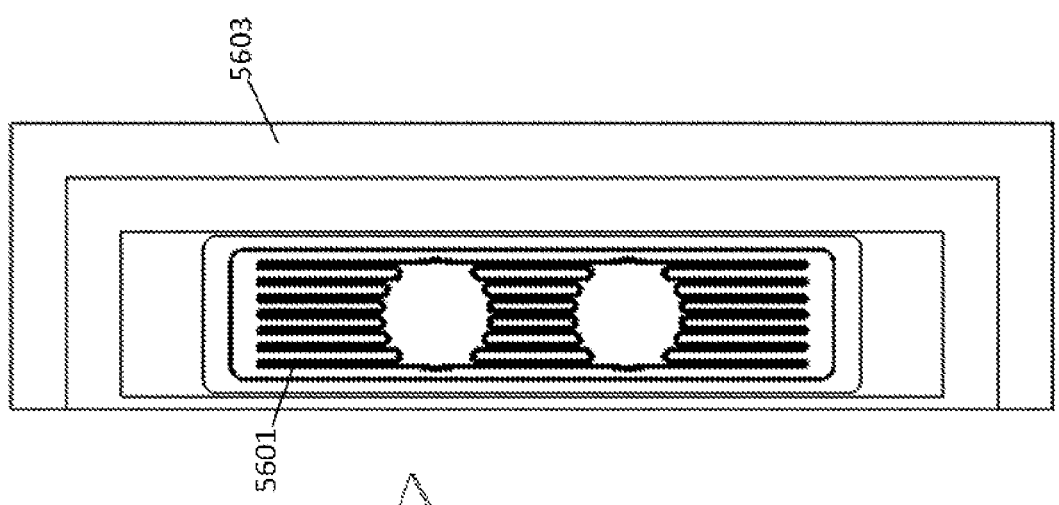
FIG. 63 illustrates a front view of an internal plate subassembly of an anti-peel stress mounting apparatus according to one embodiment of the present invention.
Figure 62:
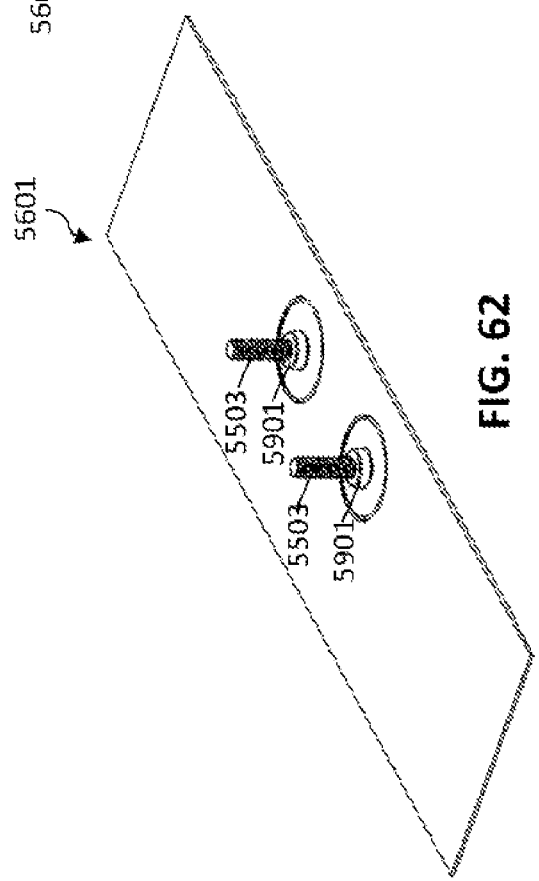
FIG. 62 illustrates a bottom perspective view of an internal plate subassembly of an anti-peel stress mounting apparatus according to one embodiment of the present invention.

FIG. 62 illustrates a rear perspective view of the first internal plate 5601 with encapsulated bolts 5503. A nub 5901 provides insulation and improves a dielectric constant of the system. FIG. 63 illustrates a front view of the internal plate subassembly, and FIG. 64 illustrates a cutaway view of the anti-peel stress mounting system attached to a wall of a platform.

FIG. 65A illustrates a partially exploded, cutaway side view of the anti-peel stress mounting apparatus, wherein the internal plate subassembly, including a first internal plate 5601 and a second internal plate 5603, are attached to a wall 6501 of the platform. An external plate 5501 is attached to an outside of the wall 6501. Each of the bolts 5503 extend from the first internal plate 5601, through a nub 5901, and through the external plate 5501. FIG. 65B illustrates a detailed cutaway side view of the anti-peel stress mounting apparatus attached to the platform wall.

In an alternative embodiment, a spacer is placed between the exterior plate and a wall of the platform, wherein the spacer is constructed from a material that provides high dielectric insulation, such as silicone.

Figure 66:
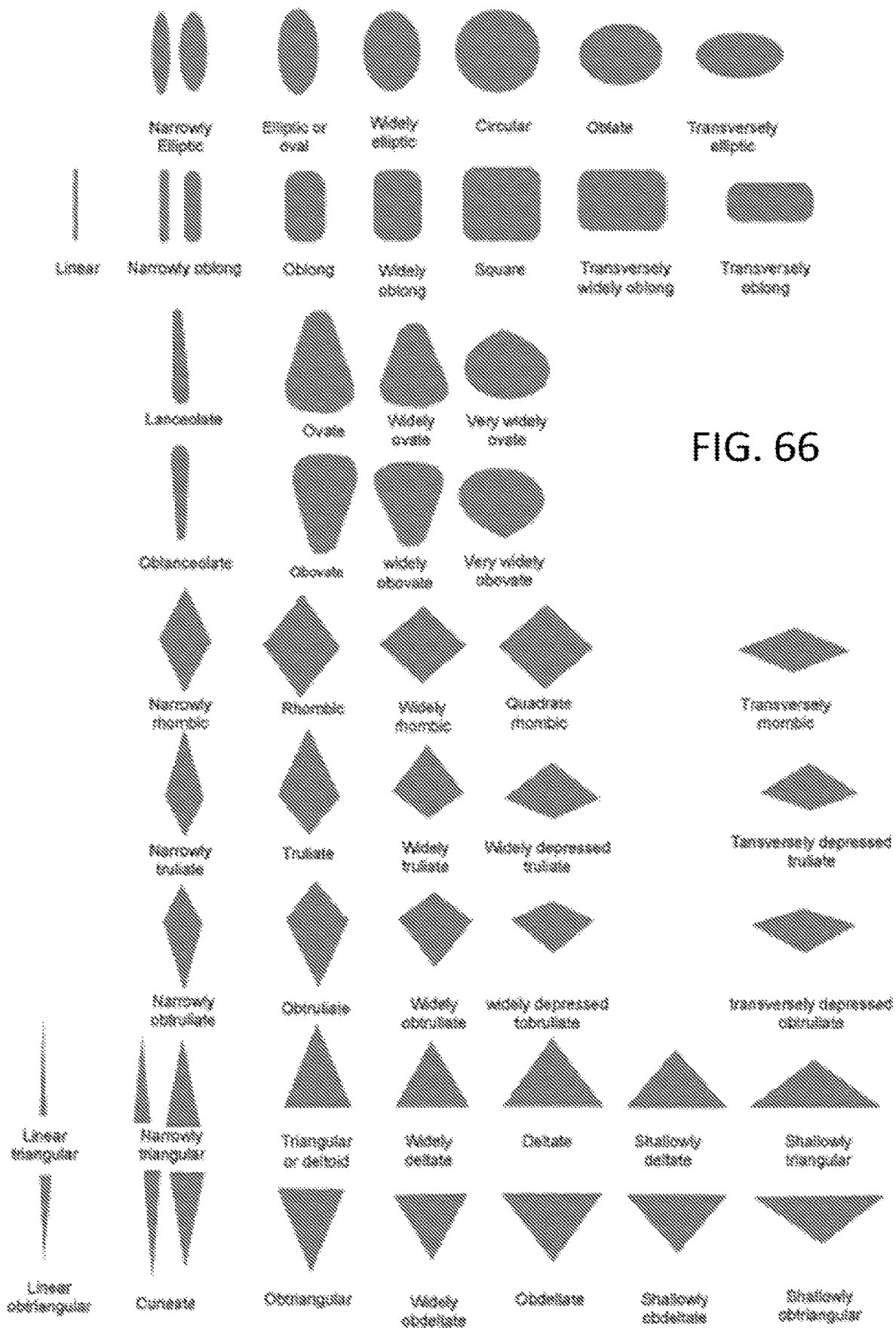
FIG. 66 illustrates embodiments of different shapes corresponding to each of the construction of the stepped layers of internal or external plates and/or assemblies.

FIG. 66 illustrates embodiments of different shapes corresponding to each of the construction of the stepped layers of internal or external plates and/or assemblies.

Notably, the components recited in the present invention, including but not limited to an anti-peel stress assembly, a mounting apparatus, and any parts therein, including an internal assembly, an external plate, and any other component which is attachable to any part of a vehicle, elevating platforms or splicer platforms including platform doors, platform walls, and platform floors are operable to be constructed out of reinforced and/or unreinforced thermoplastics and/or thermosets, including filled and/or unfilled thermoplastics and/or thermosets. Alternatively, these components are operable to be manufactured out of nylon and/or fiberglass, including pultruded fiberglass. The components are operable to include any core including a honeycomb core, an aramid honeycomb core, a thermoplastic honeycomb core, a metal honeycomb core, a wood core, a balsa core, a glass fabric core including a 3D woven sandwich glass fabric core, a fiberglass core, a fabric core including laminate bulkers, a carbon core, a thermoplastic foam core, a polyurethane foam core, a syntactic foam core, a polymethacrylimide (PMI) foam core, a Polyethylene Teraphalate (PET) foam core, a cross linked polyvinyl chloride (PVC) foam core, a linear PVC foam core, and/or a polyester foam core. Additionally, the components are operable to be manufactured via any of the techniques recited herein, including any type of thermoforming process or other thermoplastic manufacturing process, such as injection molding, rotational molding, compression molding, compression molding using unidirectional tape, compression molding using sheet molding compound, compression molding using bulk molding compound, compression molding using thick molding, compression molding using wet molding, chop spray, gravity fed casting, low pressure casting, high pressure casting, resin transfer molding including light resin transfer molding, 3D printing, extrusion, Digital Light Synthesis (DLS) including Continuous Light Interface Production (CLIP), vacuum forming, infusion including vacuum infusion, hand layup, flex molding, lamination, squish molding, etc. Furthermore, the components of the present invention are operable to be manufactured integrally (i.e. manufactured at the same time or around the same time such that the components are integrally formed) or manufactured separately and then attached to other components or identical components via physical bonding, chemical bonding, mechanical attachment, mechanical interlocking, magnetism, reversible adhesive, irreversible adhesive, welding including plastic welding, and/or vacuum attachment. In particular, unreinforced thermosets, reinforced thermosets, unfilled thermosets, and/or filled thermosets are operable to be manufactured via injection molding, rotational molding, compression molding, compression molding using sheet molding compound, compression molding using fiber reinforced thermoset, compression molding using bulk molding compound, compression molding using thick molding, compression molding using wet molding, gravity fed casting, low pressure casting, high pressure casting, resin transfer molding, light resin transfer molding, 3D printing, extrusion, Digital Light Synthesis (DLS), Continuous Light Interface Production (CLIP), vacuum forming, infusion, vacuum infusion, hand layup, infusion, flex molding, lamination, squish molding, chop spray, and/or pultrusion. Unreinforced thermoplastics, reinforced thermoplastics, unfilled thermoplastics, and/or filled thermoplastics are operable to be manufactured via injection molding, rotational molding, compression molding, compression molding using fiber reinforced thermoplastic, compression molding using bulk molding compound, compression molding using thick molding, compression molding using wet molding, gravity fed casting, low pressure casting, high pressure casting, resin transfer molding, light resin transfer molding, 3D printing, extrusion, Digital Light Synthesis (DLS), Continuous Light Interface Production (CLIP), vacuum forming, infusion, vacuum infusion, hand layup, infusion, flex molding, lamination, squish molding, chop spray, and/or pultrusion.

In one embodiment, the first internal plate assembly and the external plate assembly are mechanically fastened to a wall of the platform. Mechanical fasteners include bolts, screws, rivets, snap fits, mechanical interlocking, and/or any other mechanical means of securing the mounting mechanism to structures of the platform.

In one embodiment, terms such as "insulating," "dielectric insulation," "dielectric rating," and similar terms relating to insulation are not intended to imply that materials are necessarily completely insulating or non-conductive. Instead, these terms convey a decreased conductivity within safe operational boundaries. For example, in one embodiment, the platform, the platform walls, the doors, the attachment mechanisms, or any other attached pieces are constructed with a dielectric rating of 70 kV. Alternatively, the dielectric rating is 50 kV. Preferably, the dielectric rating of 50 kV conforms to ANSI 92.2 Section 5.4.2.5 published in 2015, which is hereby incorporated by reference in its entirety. This standard requires the following test for a dielectric rating of 50 kV: "Platform liners used for insulation shall be tested in a conductive liquid. The liquid level around both the inner and outer surfaces of the liner shall be within 6 inches (152 mm) of the top of the liner. The liner shall withstand a minimum of 50 kV ac for 1 minute without breakdown through the material."

Additionally, the platform and associated elements are constructed from corrosion and/or impact resistant materials. In one embodiment, the thermoset material and/or thermoplastic material is reinforced or unreinforced.

Certain modifications and improvements will occur to those skilled in the art upon a reading of the foregoing description. All modifications and improvements have been deleted herein for the sake of conciseness and readability but are properly within the scope of the following claims.

The invention claimed is:

1. A mounting component for a utility platform, the mounting component comprising:
    an internal portion comprising at least one surface configured to matingly interface with an internal surface of the utility platform; and
    a rib portion oriented perpendicular to the internal portion and integral with the internal portion, the rib portion configured to extend through a slot disposed in a sidewall of the utility platform,
    wherein the rib portion comprises one or more holes disposed therethrough, the one or more holes configured to receive at least one mounting fastener.

2. The mounting component of claim 1, wherein the mounting component is configured to support the utility platform at least in part.

3. The mounting component of claim 2, wherein the internal portion is configured to receive a compressive load from the utility platform.

4. The mounting component of claim 3, further comprising:
    adhesive disposed on the internal portion between an inner surface of the internal portion and the internal surface of the utility platform.

5. The mounting component of claim 1, wherein the mounting component is configured to be attached to a distal end of a boom assembly via the at least one mounting fastener such that the utility platform is supported by the boom assembly.

6. The mounting component of claim 1, further comprising:
    an electrically insulating spacer disposed between the utility platform and the rib portion.

7. The mounting component of claim 1, wherein the internal portion and the rib portion are oriented in a T-shaped configuration.

8. A platform assembly comprising:
    a utility platform comprising a sidewall having an internal surface and one or more slots disposed therethrough; and
    at least one mounting component configured to support the utility platform, the at least one mounting component comprising:
        an internal portion comprising at least one surface configured to matingly interface with the internal surface of the utility platform; and
        a rib portion oriented perpendicular to the internal portion and integral with the internal portion, the rib portion configured to extend through the one or more slots disposed in the sidewall of the utility platform.

9. The platform assembly of claim 8, wherein the rib portion comprises a plurality of holes disposed therethrough, at least a portion of the plurality of holes configured to receive mounting fasteners.

10. The platform assembly of claim 8, further comprising:
    a lanyard anchor bracket reinforcement section attached to the at least one mounting component.

11. The platform assembly of claim 10, further comprising:
    a brace configured to support the lanyard anchor bracket reinforcement section.

12. The platform assembly of claim 8, wherein the internal portion and the rib portion are oriented in a T-shaped configuration.

13. The platform assembly of claim 8, wherein the internal portion and the rib portion are oriented in an L-shaped configuration.

14. The platform assembly of claim 8, further comprising:
    an adhesive disposed between an internal surface of the internal portion and the internal surface of the utility platform.

15. A mounting assembly for supporting a utility platform, the mounting assembly comprising:
    a first mounting component, the first mounting component comprising:
        a first internal portion comprising at least one first surface configured to matingly interface with an internal surface of the utility platform; and
        a first rib portion integral with the first internal portion, the first rib portion configured to extend through a first slot disposed in a sidewall of the utility platform;
    a second mounting component, the second mounting component comprising:
        a second internal portion comprising at least one second surface configured to matingly interface with the internal surface of the utility platform; and
        a second rib portion integral with the second internal portion, the second rib portion configured to extend through a second slot disposed in the sidewall of the utility platform.

16. The mounting assembly of claim 15, wherein each of the first rib portion and the second rib portion comprise a plurality of holes configured to receive mounting fasteners.

17. The mounting assembly of claim 15, wherein the first internal portion and the second internal portion are configured to receive a compressive load from the utility platform.

18. The mounting assembly of claim 17, further comprising:
- an adhesive disposed between each of:
  - the first internal portion and the internal surface of the utility platform, and
  - the second internal portion and the internal surface of the utility platform.

19. The mounting assembly of claim 15, wherein the first rib portion is oriented perpendicular to the first internal portion and the second rib portion is oriented perpendicular to the second internal portion.

20. The mounting assembly of claim 15, wherein the first rib portion and the second rib portion are configured to attach to a distal end of a boom assembly such that the utility platform is supported by the boom assembly.

\* \* \* \* \*